US008179763B2

(12) United States Patent
Umezawa et al.

(10) Patent No.: US 8,179,763 B2
(45) Date of Patent: May 15, 2012

(54) OPTICAL DISC, INFORMATION RECORDING METHOD, AND INFORMATION REPRODUCING METHOD

(75) Inventors: Kazuyo Umezawa, Yokohama (JP); Seiji Morita, Yokohama (JP); Koji Takazawa, Tokyo (JP); Hideo Ando, Hino (JP); Yasuaki Ootera, Yokohama (JP); Naomasa Nakamura, Yokohama (JP); Naoki Morishita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 453 days.

(21) Appl. No.: 11/752,705

(22) Filed: May 23, 2007

(65) Prior Publication Data

US 2007/0281123 A1 Dec. 6, 2007

(30) Foreign Application Priority Data

May 31, 2006 (JP) .................................. 2006-151584

(51) Int. Cl.
*G11B 7/0045* (2006.01)
(52) U.S. Cl. .................................................... 369/59.11
(58) Field of Classification Search ........................ None
See application file for complete search history.

(56) References Cited

U.S. PATENT DOCUMENTS

| | | | |
|---|---|---|---|
| 5,075,147 A | 12/1991 | Usami et al. | |
| 5,441,848 A | 8/1995 | Aoi et al. | |
| 5,958,650 A * | 9/1999 | Wolleb et al. | 430/270.19 |
| 6,236,635 B1 * | 5/2001 | Miyamoto et al. | 369/116 |
| 6,387,467 B1 | 5/2002 | Wang et al. | |
| 2002/0075793 A1 * | 6/2002 | Tsukamoto | 369/275.4 |
| 2003/0142606 A1 * | 7/2003 | Ogawa et al. | 369/59.11 |
| 2003/0227846 A1 * | 12/2003 | Lee et al. | 369/53.21 |
| 2004/0114488 A1 * | 6/2004 | Sawada et al. | 369/59.11 |
| 2004/0125739 A1 * | 7/2004 | Usami et al. | 369/275.5 |
| 2004/0190431 A1 * | 9/2004 | Lee et al. | 369/275.1 |
| 2005/0058047 A1 * | 3/2005 | Fujita et al. | 369/59.11 |
| 2005/0063266 A1 | 3/2005 | Kim | |
| 2005/0063274 A1 | 3/2005 | Nagano et al. | |
| 2005/0100704 A1 | 5/2005 | Horai et al. | |
| 2005/0169140 A1 * | 8/2005 | Adachi et al. | 369/47.53 |
| 2005/0237891 A1 * | 10/2005 | Kando et al. | 369/59.11 |
| 2005/0243699 A1 * | 11/2005 | Noda et al. | 369/275.4 |

(Continued)

FOREIGN PATENT DOCUMENTS

CN 1691164 A 11/2005

(Continued)

OTHER PUBLICATIONS

Office Action issued Jan. 11, 2011, in Japanese Patent Application No. 2006-151584 with English translation.

(Continued)

*Primary Examiner* — Peter Vincent Agustin
*Assistant Examiner* — Emily Frank
(74) *Attorney, Agent, or Firm* — Oblon, Spivak, McClelland, Maier & Neustadt, L.L.P.

(57) ABSTRACT

According to one embodiment, a re-recordable write-once optical disc by which recording/reproducing can be properly done with a short-wavelength blue laser is provided. The disc has recording layers on which marks are recorded by the laser power of a modulated short wavelength, with a space formed between the recorded marks. The recording layer of the disc uses an organic dye material by which no physical modification or no physical change substantially occurs in an area of the recorded marks.

2 Claims, 31 Drawing Sheets

U.S. PATENT DOCUMENTS

| | | | |
|---|---|---|---|
| 2005/0254403 A1* | 11/2005 | Ishibashi et al. | 369/125 |
| 2006/0013111 A1 | 1/2006 | Inoue et al. | |
| 2006/0046012 A1 | 3/2006 | Tanabe et al. | |
| 2006/0077831 A1* | 4/2006 | Kim | 369/47.29 |
| 2006/0120241 A1* | 6/2006 | Watabe | 369/59.1 |
| 2006/0140096 A1* | 6/2006 | Tabata et al. | 369/59.11 |
| 2006/0215512 A1 | 9/2006 | Kim | |
| 2007/0165506 A1* | 7/2007 | Nakamura et al. | 369/59.11 |

FOREIGN PATENT DOCUMENTS

| | | |
|---|---|---|
| EP | 1 056 078 A1 | 11/2000 |
| EP | 1 349 159 A1 | 10/2003 |
| EP | 1 569 208 A1 | 8/2005 |
| EP | 1 587 093 A2 | 10/2005 |
| EP | 1 864 286 A0 | 12/2007 |
| JP | 9-282660 | 10/1997 |
| JP | 09-315002 | 12/1997 |
| JP | 10-340489 | 12/1998 |
| JP | 11-238310 | 8/1999 |
| JP | 2000-67463 | 3/2000 |
| JP | 2000-298874 | 10/2000 |
| JP | 2002-208227 | 7/2002 |
| JP | 2003-77127 | 3/2003 |
| JP | 2003-187443 | 7/2003 |
| JP | 2004-185796 | 7/2004 |
| JP | 2004-206849 | 7/2004 |
| JP | 2005-92942 | 4/2005 |
| JP | 2005-293773 | 10/2005 |
| JP | 2005-297406 | 10/2005 |
| TW | 200603142 | 1/2006 |
| WO | WO 2005/017879 A2 | 2/2005 |
| WO | WO 2005/017879 A3 | 2/2005 |
| WO | WO 2006/080572 A1 | 8/2006 |

OTHER PUBLICATIONS

Office Action issued Jan. 21, 2011, in European Patent Application No. 07109208.4-1232/1863026.

Office Action issued Oct. 21, 2010, in Taiwan Patent Application No. 096,119,181 (with English-language Translation).

Japanese Office Action issued May 24, 2011, in Patent Application No. 2010-113583 (with English-language translation).

Extended European Search Report issued Jun. 30, 2011, in Patent Application No. 11162907.7.

Anonymous: "Standard ECMA-364, Data interchange on 120 mm and 80 mm Optical Disk using +R DL Format—Capacity: 8,55 and 2,66 Gbytes per Side (Recording speed 2,4x)", ECMA International, $1^{st}$ Edition, XP 2639565, Jun. 2005, 158 pages.

Extended European Search Report issued Jun. 9, 2011, in European Patent Application No. 11162904.4.

Extended European Search Report issued Jun. 16, 2011, in European Patent Application No. 11162905.1.

Anonymous: "White Paper Blu-ray Disc Format 1.B Physical Format Specifications for BD-R", XP-002324152, Aug. 1, 2004, pp. 1-33.

* cited by examiner

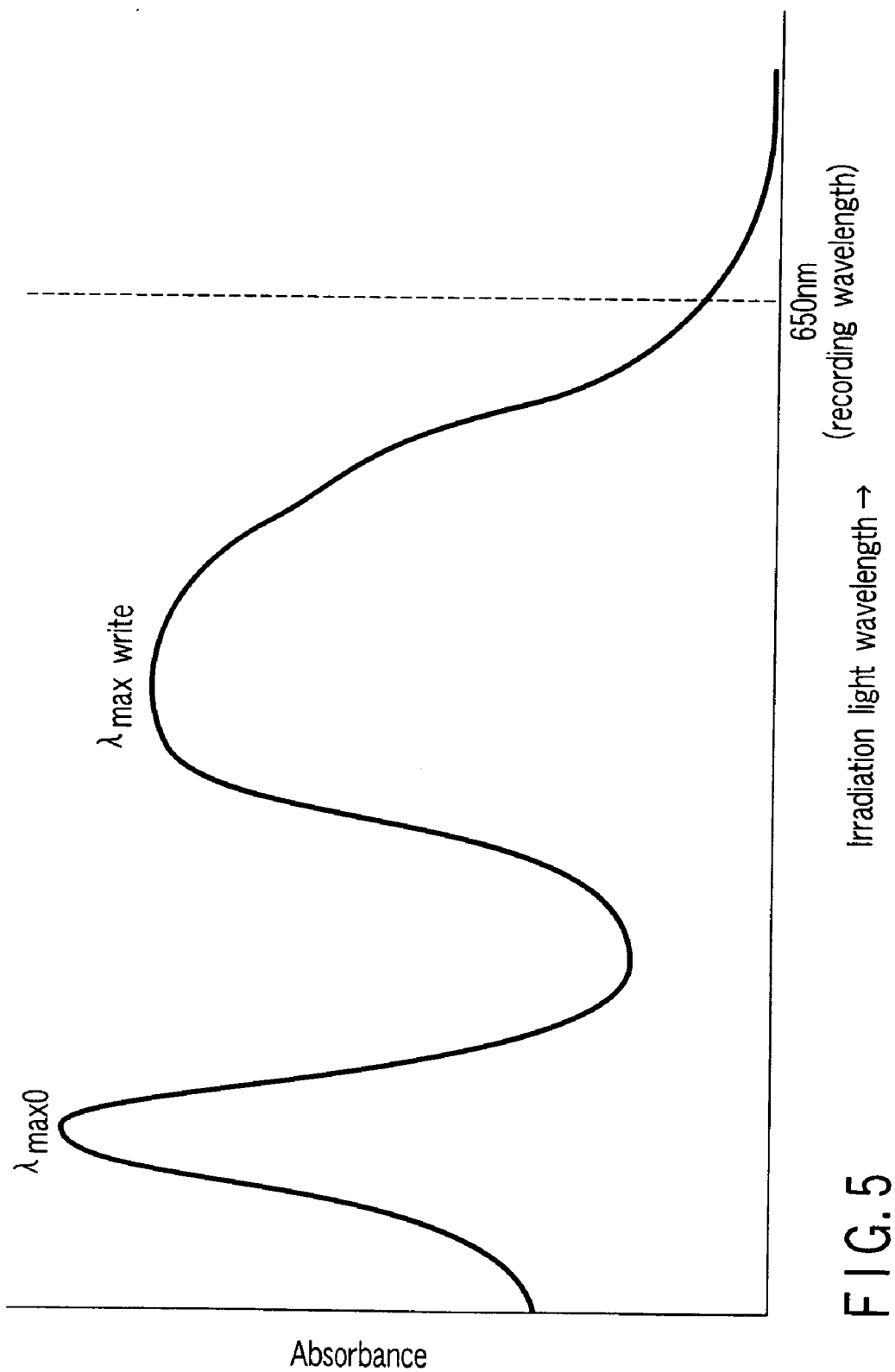
F I G. 5

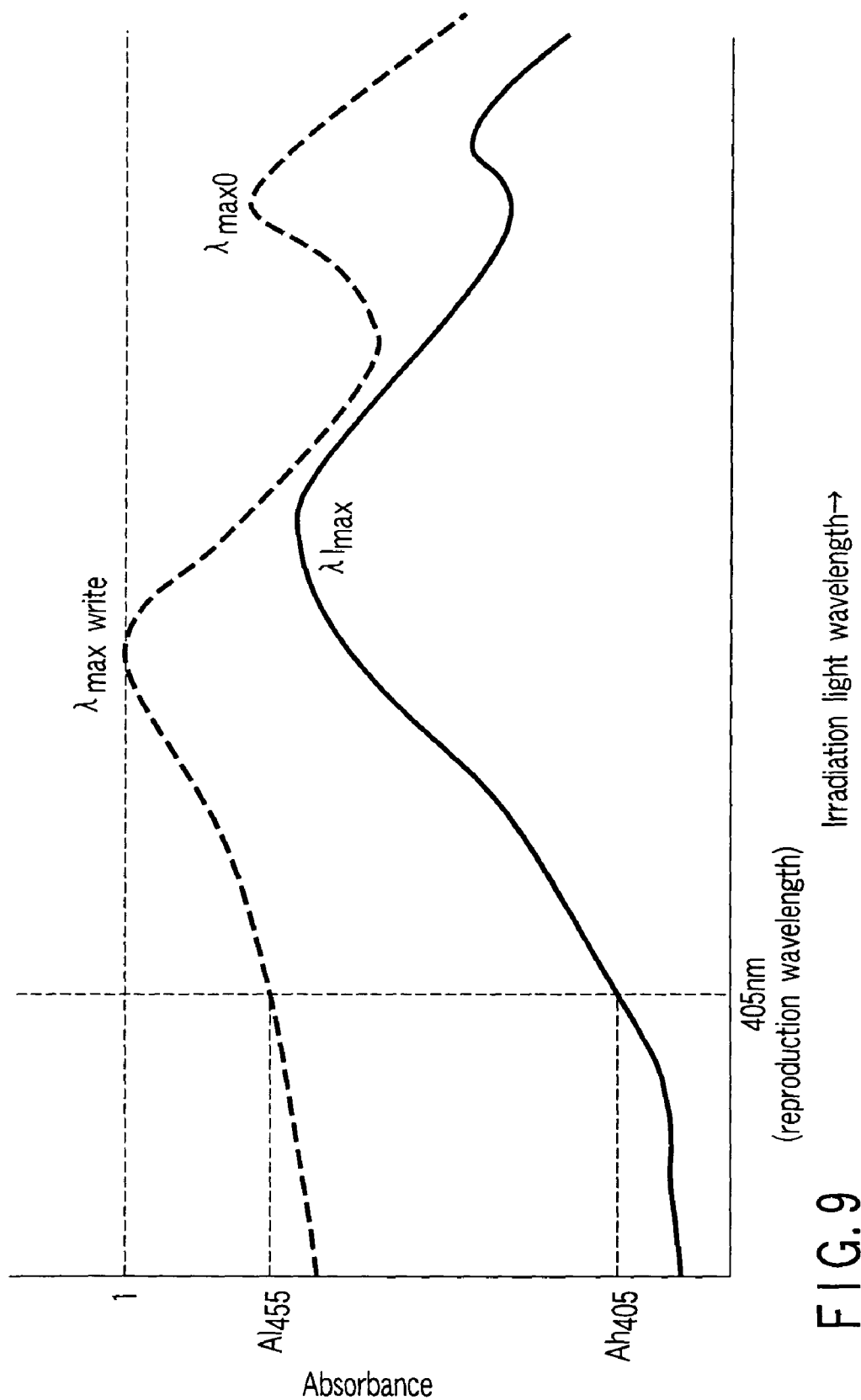
F I G. 9

FIG. 14

Explanatory diagram of a data structure of recording management data (a)

| System lead-in area SYLDI | | | | | Connection area CNA | Data lead-in area DTLDI | | | | | | | Data area DTA |
|---|---|---|---|---|---|---|---|---|---|---|---|---|---|
| Initial zone INZ | Buffer zone 1 BFZ1 | Control data zone CDZ | Buffer zone 2 BFZ2 | | Connection zone CNZ | Guard track zone 1 GTZ1 | Disk test zone DKTZ | Drive test zone DRTZ | Guard track zone 2 GTZ2 | RMD duplication zone RDZ | Recording position management zone RMZ | R physical information zone R-PFIZ | Reference code recording zone RCZ | |

(b)

| RMD duplication zone RDZ | | | | | | Recording position management zone RMZ corresponding to the first bordered area | | | |
|---|---|---|---|---|---|---|---|---|---|
| RDZ lead-in RDZLI | | Corresponding RMZ last recording management data RMD recording area | | | Reserved area | Recording management data RMD #1 corresponding to the first bordered area | Recording management data RMD #2 corresponding to the first bordered area | Recording management data RMD #3 corresponding to the first bordered area | Reserved area |
| System reserved area SRSF | Unique ID area UIDF | Corresponding RMZ last recording management data RMD #A | Corresponding RMZ last recording management data RMD #B | One physical segment block size (64KB) | | | | | |
| 48KB | 16KB | | | | | One physical segment block size | 64KB | 64KB | |

(c)

| RMD field name | Reserve | RMD field 0 | RMD field 1 | RMD field 2 | RMD field 3 | RMD fields 4 - 21 | Reserve |
|---|---|---|---|---|---|---|---|
| Contents of recording information | Reserved area | Disk state/ data area allocation | Test zone used/ recording waveform information | User usable area | Start position of border area/ extended RMZ position | Position information on R zone | Reserved area |
| RMD field Data size used (bytes) | 2048 | 2048 | 2048 | 2048 | 2048 | 36864 | 18432 |
| Relative physical sector number | 0 | 1 | 2 | 3 | 4 | 5 - 22 | 23 - 31 |

F I G. 15

| | | Present embodiment | Conventional DVD_R |
|---|---|---|---|
| Capacity | | 15GB | 4.7GB |
| Minimum recording capacity (in border closing) (recording width) | | 4080 PS blocks (1.0mm) | 4080 ECC blocks (1.65mm) |
| Size of lead-out area in finalization (width of lead-out area) | | 480 PS blocks maximum (>0.05mm) | Up to 3000 ECC blocks (>0.5mm) |
| The maximum number of Rzones | | 4606 | 2302 |
| The maximum number of bordered areas | | 128 | 512 |
| Capacity of test zone | Inner | 19200 sectors | 6832 sectors |
| | Outer | 14848 sectors | 7088 sectors |
| | Outer extended | 15360 sectors | – |
| The number of updates of RMD | Initial | 392 | 701 |
| | Extended | 16384max. | – |
| Recording mode | | Additional recording | Only once/ additional recording |

FIG. 17

Structure of Control Data Zone

Structure of Data Segement in Control Data Section

Physical Format Information

| BP | Contents |
|---|---|
| 0 | Book type and part version |
| 1 | Disc size and maximum transfer rate of the disc |
| 2 | Disc structure |
| 3 | Recording density |
| 4 to 15 | Data area allocation |
| 16 | BCA descriptor |
| 17 | Revision number of maximum recording speed |
| 18 | Revision number of minimum recording speed |
| 19 to 25 | Revision number table |
| 26 | Class |
| 27 | Extended part version |
| 28 to 31 | reserved |
| 32 | Actual number of maximum reading speed |
| 33 | Layer format table |
| 34 to 127 | reserved |
| 128 | Mark polarity descriptor |
| 129 | Velocity |
| 130 | Rim intensity in tangential direction |
| 131 | Rim intensity in radial direction |
| 132 | Read power |
| 133 | Actual number of minimum recording speed |
| 134 | Actual number of 2nd recording speed |
| 135 | Actual number of 3rd recording speed |
| 136 | Actual number of 4th recording speed |
| 137 | Actual number of 5th recording speed |
| 138 | Actual number of 6th recording speed |
| 139 | Actual number of 7th recording speed |
| 140 | Actual number of 8th recording speed |
| 141 | Actual number of 9th recording speed |
| 142 | Actual number of 10th recording speed |
| 143 | Actual number of 11th recording speed |
| 144 | Actual number of 12th recording speed |
| 145 | Actual number of 13th recording speed |
| 146 | Actual number of 14th recording speed |
| 147 | Actual number of 15th recording speed |
| 148 | Actual number of maximum recording speed |
| 149 | Reflectivity of data area for layer 0 |
| 150 | Push-pull signal for layer 0 |
| 151 | On track signal for layer 0 |
| 152 | Reflectivity of data area for layer 1 |
| 153 | Push-pull signal for layer 1 |
| 154 | On track signal for layer 1 |
| 155 to 2047 | reserved |

FIG. 30  Note: BP 0 to BP 31 comprise the common data used for the DVD family.
BP 32 to BP 2047 area used for unique information for each book.

Data Area Allocation

| BP | Contents |
|---|---|
| 4 | 00h |
| 5 to 7 | Start PSN of the data area (04 0000h) |
| 8 | 00h |
| 9 to 11 | Maximum PSN of data recordable area (FB CCFFh) |
| 12 | 00h |
| 13 to 15 | End PSN on Layer 0 (73 DBFFh) |

F I G. 31

Physical Format Information (L0)

| BP | Contents |
|---|---|
| 0 to 511 | |
| 512 | Peak power for layer 0 |
| 513 | Bias power1 for layer 0 |
| 514 | Bias power2 for layer 0 |
| 515 | Bias power3 for layer 0 |
| 516 | First pulse end time for layer 0 |
| 517 | Multi pulse duration for layer 0 |
| 518 | Last pulse duration for layer 0 |
| 519 | Bias power2 duration for layer 0, 2T mark |
| 520 | Bias power2 duration for layer 0, 3T mark |
| 521 | Bias power2 duration for layer 0, $\geq$4T mark |
| 522 | First pulse start time for layer 0, 2T mark, leading 2T space |
| 523 | First pulse start time for layer 0, 3T mark, leading 2T space |
| 524 | First pulse start time for layer 0, $\geq$4T mark, leading 2T space |
| 525 | First pulse start time for layer 0, 2T mark, leading 3T space |
| 526 | First pulse start time for layer 0, 3T mark, leading 3T space |
| 527 | First pulse start time for layer 0, $\geq$4T mark, leading 3T space |
| 528 | First pulse start time for layer 0, 2T mark, leading $\geq$4T space |
| 529 | First pulse start time for layer 0, 3T mark, leading $\geq$4T space |
| 530 | First pulse start time for layer 0, $\geq$4T mark, leading $\geq$4T space |
| 531 | Last pulse end time for layer 0, 2T mark, trailing 2T space |
| 532 | Last pulse end time for layer 0, 3T mark, trailing 2T space |
| 533 | Last pulse end time for layer 0, $\geq$4T mark, trailing 2T space |
| 534 | Last pulse end time for layer 0, 2T mark, trailing 3T space |
| 535 | Last pulse end time for layer 0, 3T mark, trailing 3T space |
| 536 | Last pulse end time for layer 0, $\geq$4T mark, trailing 3T space |
| 537 | Last pulse end time for layer 0, 2T mark, trailing $\geq$4T space |
| 538 | Last pulse end time for layer 0, 3T mark, trailing $\geq$4T space |
| 539 | Last pulse end time for layer 0, $\geq$4T mark, trailing $\geq$4T space |
| 540 to 543 | reserved |

FIG. 32

Physical Format Information (L1)

| BP | Contents |
|---|---|
| 544 | Peak power for layer 1 |
| 545 | Bias power1 for layer 1 |
| 546 | Bias power2 for layer 1 |
| 547 | Bias power3 for layer 1 |
| 548 | First pulse end time for layer 1 |
| 549 | Multi pulse duration for layer 1 |
| 550 | Last pulse start time for layer 1 |
| 551 | Bias power2 duration for layer 1, 2T mark |
| 552 | Bias power2 duration for layer 1, 3T mark |
| 553 | Bias power2 duration for layer 1, $\geq$4T mark |
| 554 | First pulse start time for layer 1, 2T mark, leading 2T space |
| 555 | First pulse start time for layer 1, 3T mark, leading 2T space |
| 556 | First pulse start time for layer 1, $\geq$4T mark, leading 2T space |
| 557 | First pulse start time for layer 1, 2T mark, leading 3T space |
| 558 | First pulse start time for layer 1, 3T mark, leading 3T space |
| 559 | First pulse start time for layer 1, $\geq$4T mark, leading 3T space |
| 560 | First pulse start time for layer 1, 2T mark, leading $\geq$4T space |
| 561 | First pulse start time for layer 1, 3T mark, leading $\geq$4T space |
| 562 | First pulse start time for layer 1, $\geq$4T mark, leading $\geq$4T space |
| 563 | Last pulse end time for layer 1, 2T mark, trailing 2T space |
| 564 | Last pulse end time for layer 1, 3T mark, trailing 2T space |
| 565 | Last pulse end time for layer 1, $\geq$4T mark, trailing 2T space |
| 566 | Last pulse end time for layer 1, 2T mark, trailing 3T space |
| 567 | Last pulse end time for layer 1, 3T mark, trailing 3T space |
| 568 | Last pulse end time for layer 1, $\geq$4T mark, trailing 3T space |
| 569 | Last pulse end time for layer 1, 2T mark, trailing $\geq$4T space |
| 570 | Last pulse end time for layer 1, 3T mark, trailing $\geq$4T space |
| 571 | Last pulse end time for layer 1, $\geq$4T mark, trailing $\geq$4T space |
| 572 to 2047 | reserved |

Note : BP 0 to BP 31 comprise the common data used for the DVD family.
BP 32 to BP 2047 area used for unique information for each book.
T denotes the channel clock period.

FIG. 33

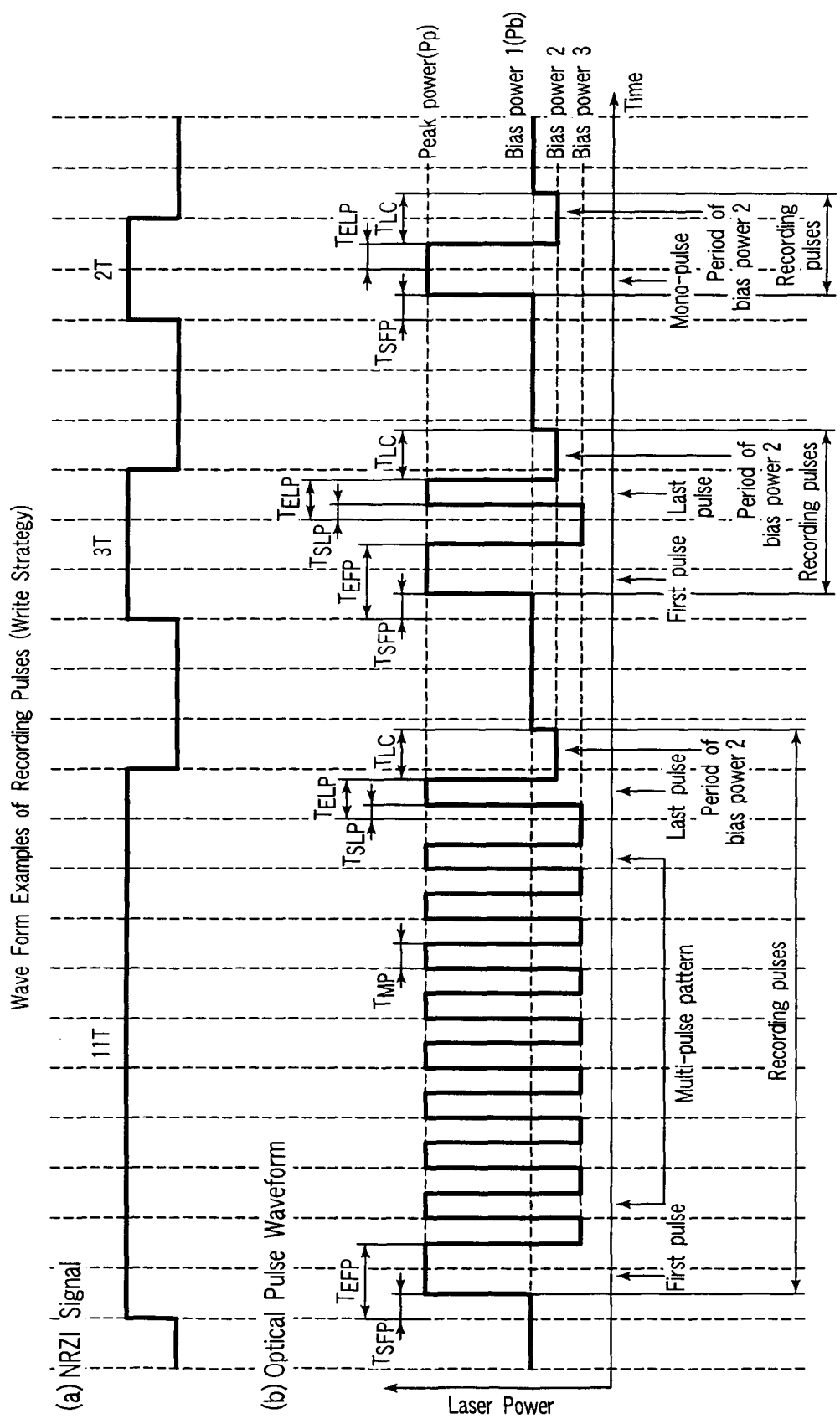
F I G. 34

OPTICAL DISC, INFORMATION RECORDING METHOD, AND INFORMATION REPRODUCING METHOD

CROSS-REFERENCE TO RELATED APPLICATIONS

This application is based upon and claims the benefit of priority from Japanese Patent Application No. 2006-151584, filed May 31, 2006, the entire contents of which are incorporated herein by reference.

BACKGROUND

1. Field

One embodiment of the invention relates to an information recording medium such as a re-recordable write-once optical disc on which information can be recorded and from which information can be reproduced.

2. Description of the Related Art

As an optical disc, in general, there are a read-only ROM disc, a recordable or re-recordable R disc, and a rewritable RW or RAM disc. As information becomes bulky, further-large capacity is demanded for an optical disc. For the purpose of increasing the capacity of an optical disc, some technique has been proposed in which a recording capacity is increased by narrowing down a beam spot, for example, in such a manner that a wavelength of a laser beam is shortened, or a numerical aperture NA is enlarged (for example, refer to Jpn. Pat. Appln. KOKAI Publication No. 2004-206849, paragraphs 0036 to 0041, FIG. 1).

As multi-layered optical discs, dual-layer ROM discs are conventionally available in the market. Recently, dual-layer recordable discs (DVD-R:DL) each using a laser of 650 nm wavelength are reduced to practice. In a manner of recording and reproducing an optical disc (such as a DVD-R) using an organic dye material for the recording layer, recording marks in which the reflectivity of the dye has been changed are formed by modulating the power of a laser light. Thus, the information recording is performed utilizing the difference between the reflectivity of recording marks and that of unrecorded portions. As a manner of modulating the laser power, multi-pulses are used for DVD-R, for example (cf. Jpn. Pat. Appln. KOKAI Publication No. 9-282660).

For a dye allowing the blue-laser recording with a wavelength of about 405 nm, there are two kinds: one is a dye whose maximum absorption wavelength is shorter than the laser wavelength of 405 nm, and the other is a dye whose maximum absorption wavelength is longer than 405 nm. When the dye whose maximum absorption wavelength is longer than 405 nm is used, a so-called "L to H" disc is obtained in which a low reflectivity of a unrecorded state will change to a high reflectivity of a recorded state.

In a single-recording-layer recordable optical disc of the "L to H" type, good characteristics can be obtained. However, when characteristics of a single-sided dual-recording-layer recordable optical disc are investigated or examined, it is found that the characteristics are very poor. In particular, the poor characteristics are prominent at the recording layer (L0 layer) close to the laser reception face.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary view illustrating an example of optical absorption spectrum characteristics of an organic dye recording material for use in a current DVD-R disc;

FIG. 9 is an exemplary view showing a change of light absorption spectrum characteristics in a recorded state and an unrecorded state of the "L-H" recording film;

FIG. 14 is an exemplary view showing a detailed structure of an ECC block after PO interleaving;

FIG. 15 is an exemplary view showing a data structure of recording management data RMD;

FIG. 17 is an exemplary diagram illustrating a comparison between the embodiment and a current DVD-R;

FIG. 30 is an exemplary view showing contents of the physical format information shown in FIG. 29;

FIG. 31 is an exemplary view showing a data area allocation of the physical format information shown in FIG. 30;

FIG. 32 is an exemplary view showing a part (regarding L0) of the physical format information shown in FIG. 29;

FIG. 33 is an exemplary view showing another part (regarding L1) of the physical format information shown in FIG. 29; and FIG. 34 is an exemplary view showing a waveform (Write Strategy) of a recording pulse.

DETAILED DESCRIPTION

Figure 1:
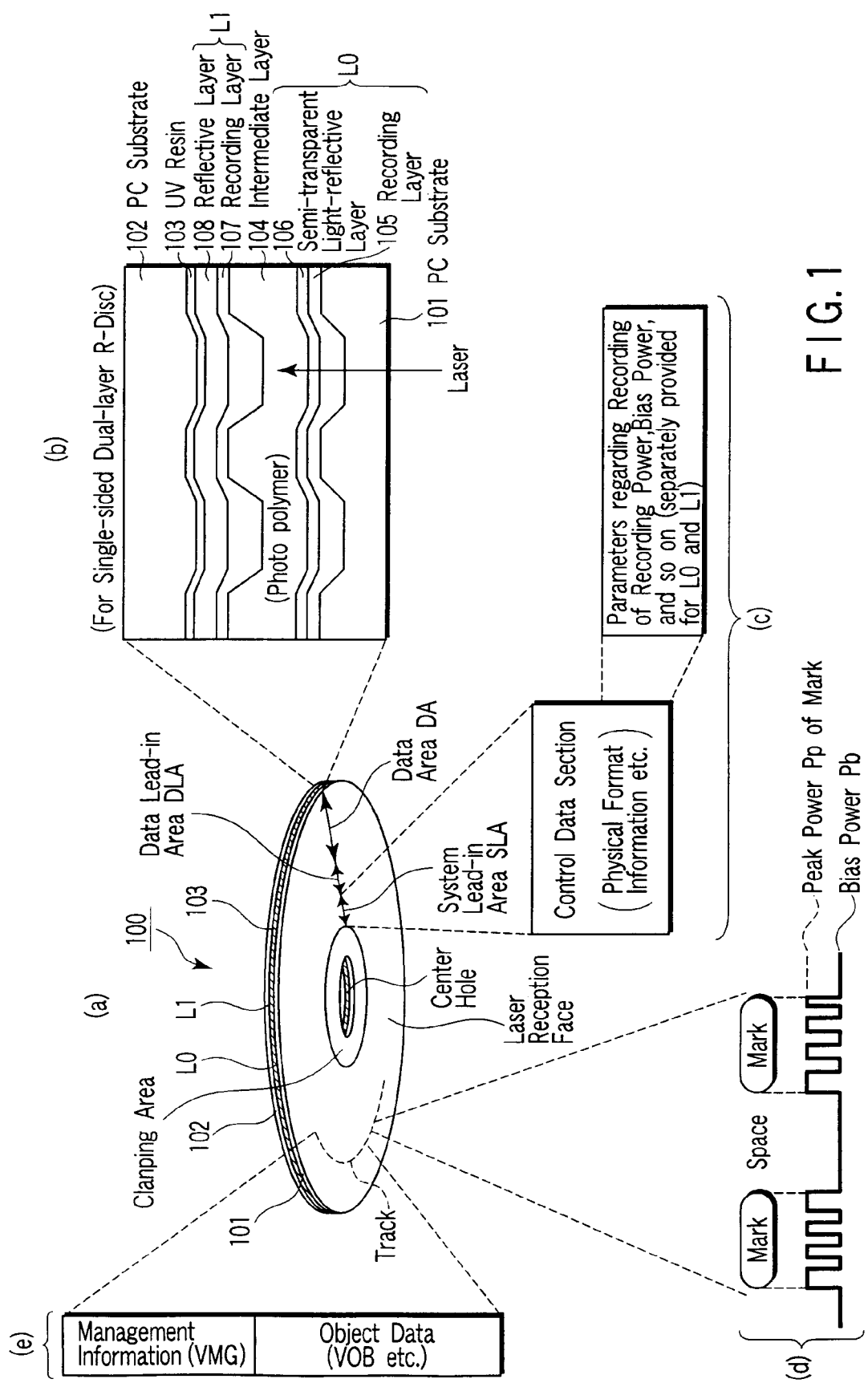
FIG. 1 is an exemplary view illustrating a configuration of a multi-layered optical disc according to an embodiment of the invention.

Various embodiments according to the invention will be described hereinafter with reference to the accompanying drawings.

One of tasks of the embodiments is to provide an information recording medium (such as a recordable optical disc) using an organic dye material which allows excellent recording/reproducing performance for both single- and multi-recording layers, particularly wherein the recording is done with a wavelength shorter than 620 nm.

An optical disc according to the embodiment comprises one or more recording layers (L0, L1, etc.) on which a plurality of marks are recorded with a space between the marks, using a modulated laser power. The recording layer uses an organic dye material (cf. FIGS. 2-4, etc.) by which no physical modification or no physical change (change in the volume or in the sectional area) substantially occurs in an area of the recorded marks (practically, the rate of modification or change is equal to or less than 10%, for example).

According to the embodiment, good recording and reproducing performance can be obtained for both single- and multi-layer type recordable optical discs.

Various investigations have been made to solve the above task. The result is that the characteristic of a dual-layer disc is wrong if using a dye with which some mark distortions are observed from the electrical signal obtained when recording/reproducing are done for a single-layer disc. However, the characteristic of the dual-layer disc is also good if using another dye with which almost no mark distortions are observed.

The reason of degrading the characteristic of a dual-layer disc with a dye causing mark distortions may be as follows. Namely, in the dual-layer structure, reflection or reflective film 106 of the L0 layer has to be a semi-transparent reflection or reflective film, resulting in disturbing sufficient heat-sinking, to thereby further enlarging the distortions.

The mark distortions caused with use of a semi-transparent film cannot be removed even if the light waveform of the recording laser is changed. The reflectivity at a space portion between mark portions is also enhanced. From this, at the trailing edge of the recorded mark, a physical change in the volume of a dye or in the surface state thereof may occur, resulting in generating the distortions. When the recording film surface of disc 100 is observed using SEM (scanning type electronic microscope), the surface after recording becomes more rough than that before recording. This may be caused by a change in the volume of the dye after recording.

Meanwhile, when the recording film surface of disc 100 using a mark-distortion-free dye is observed using SEM, the surface after recording is not ragged.

Analysis and comparison between samples of the mark-distortion-free dye are made using HPCL (High-Performance Liquid Chromatography): one sample being extracted from the disc after recording and the other sample being extracted from the disc before recording. There is no difference between the samples. Analyses using NMR (Nuclear Magnetic Resonance), IR (Infrared Radiation), and MS (Magnetic Scanning) are also done, but no difference between samples before and after recordings is found too. It is concluded that the recording is independent of chemical change.

To solve the task, therefore, for an information recording medium (a single- or multi-layer recordable optical disc) using an organic dye for the recording layer (L0 and/or L1), the information recording is performed with a laser-power modulation. Further, as the organic dye, it is sufficient to select an organic dye material with which almost no change at the recording mark area in the recording layer will occur with information recording.

Specifically, a specific dye material is used for the recording layer, wherein a change in the volume of or in the surface condition of the recording layer at the recording mark area is to be equal to or less than 10%. Or, a specific material is used for the dye material of the recording layer, said specific material having a property to substantially avoid a chemical change in the recorded layer. More specifically, at least part of an organic dye material to be used for the recording layer may include an azo metal complex whose center metal uses copper Cu or nickel Ni.

When a change in the volume of or in the surface condition of the recording layer at the recording mark area exists, it is liable to occur a distortion in the reproduction signal obtained when repetitive patterns of long marks/spaces (e.g., 11T patterns) are recorded. From this, the difference ([I11Lmax−I11Lmin]) between the maximum and minimum values of a signal level from a space portion is to be 10% of the minimum value (I11min) or less, where the signal is reproduced when long patterns are recorded, and both the mark and space lengths of the long patterns are longer than $1.2*\lambda/NA$ ($\lambda$ denotes the laser wavelength for recording, and NA denotes the numerical aperture).

Various embodiments will be described with reference to the accompanying drawings. FIG. 1 shows an example of the configuration of optical disc (a recordable or re-recordable single-sided dual-layer disc as a practical example) 100 according to one of the embodiments. As exemplified by (a) and (b) of FIG. 1, disc 100 comprises transparent resin substrate 101 having a disc-like figure and being formed of a synthetic resin material such as polycarbonate, for example. Grooves are coaxially or spirally formed on transparent resin substrate 101. Transparent resin substrate 101 may be manufactured by injection molding with a stamper.

On transparent resin substrate 101 with 0.59 mm thickness and made of polycarbonate or the like, organic dye recording layer 105 and semi-transparent light-reflection or light-reflective layer 106 are sequentially laminated or stacked for the first layer (L0). Photo Polymer (abbreviated as 2P resin) intermediate layer 104 is spin-coated on layer 106. Then, the groove pattern of the second layer (L1) is transferred to layer 104, and organic dye recording layer 107 and reflection or reflective film 108 of silver or silver alloy are sequentially laminated or stacked for the second layer (L1). To the body on which L0 and L1 recording layers are laminated or stacked, another transparent resin substrate (or dummy substrate) 102 with 0.59 mm thickness is pasted via UV curing resin (adhesive layer) 103. The organic dye recording films (recording layers 105 and 107) have a dual-layer configuration in which semi-transparent reflection or reflective layer 106 and intermediate layer 104 are sandwiched between the organic dye recording films. The total thickness of the resultant pasted optical disc is about 1.2 mm.

On transparent resin substrate 101, spiral grooves with the track pitch of 0.4 μm and the depth of 60 nm, for example, are formed (for respective layers L0 and L1). The grooves are wobbled so that address information is recorded on the wobble. Further, recording layers 105 and 107 each including an organic dye are formed on transparent resin substrate 101 so as to fill-up the grooves.

As the organic dye for forming recording layers 105 and 107, a dye material whose maximum absorption wavelength area is shifted to the longer wavelength side than the recording wavelength (e.g., 405 nm) may be used. Note that the dye material is designed to have a substantially large light absorption at the longer wavelength area (e.g., 450 nm to 600 nm), and the absorption does not disappear at the recording wavelength area.

The organic dye (practical examples will be described later) is dissolved in a solvent to provide a liquid material. The recording film thickness can be precisely managed by controlling the dilution rate of the solvent and/or the rotating speed of spin-coating.

A low light reflectivity may be met when a recording laser light is focused on or tracking over the track before recording of information. Thereafter, the dye is subjected to a resolving reaction by the laser light to reduce the optical absorption rate, so that the light reflectivity at the recording mark portion is enhanced. From this, a so-called "Low-to-High" (or "L to H") characteristic is obtained wherein the light reflectivity at the recording mark portion formed by irradiating the laser light becomes higher than the light reflectivity obtained before the laser light irradiation.

Incidentally, in transparent resin substrate 101, particularly at the groove bottom portion (of L0 or L1), some deformations may be caused by heat generated due to the irradiation of the recording laser. In this case, in a reproduction process after recording, a phase difference (compared with the case of no heat deformation) could occur in the reflected laser light. Problems due to the phase difference can be suppressed or avoided if deformations of the recording mark are prohibited or prevented by the embodiment.

According to the embodiment, a physical format that can be applied to the L0 and L1 layers on transparent resin substrate 101 and photo polymer (2P resin) 104 may be as follows: Namely, general parameters of a recordable single-sided dual-layer disc are almost the same as those of a single-layer disc, except for the following. That is, the user-available recording capacity is 30 GB, the inner radius of layer 0 (L0 layer) of the data area is 24.6 mm, the inner radius of layer 1 (L1 layer) thereof is 24.7 mm, and the outer radius (of each of layer 0 and layer 1) of the data area is 58.1 mm.

In optical disc 100 of FIG. 1(a), system lead-in area SLA includes a control data section as exemplified by FIG. 1(c). The control data section includes, as a part of physical format information, etc., recording-related parameters such as recording power (peak power), bias power, and the like, for each of L0 and L1.

On the track within data area DA of optical disc 100, as exemplified by FIG. 1(d), mark/space recording is done by the laser with a given recording power (peak power) and bias power. By this mark/space recording, as exemplified by FIG. 1(e), object data (such as VOB) and its management information (VMG) of a high-definition TV broadcasting program, for example, are recorded on the track (of L0 and/or L1) in data area DA.

A cyanine dye, styryl dye, azo dye, or the like may be used as an organic dye applicable to the embodiment. Particularly, the cyanine dye or the styryl dye is suitable because control of the absorption with respect to the recording wavelength is easy. The azo dye may be obtained as a single azo compound or as a complex of a metal and one or more molecules of an azo compound.

In the embodiment, cobalt, nickel, or copper may be used for the center metal M of the azo metal complex so as to enhance the optical stability. However, without being limited thereto, there may be used for the center metal M of the azo metal comprex: scandium, yttrium, titanium, zirconium, hafnium, vanadium, niobium, tantalum, chrome, molybdenum, tungsten, manganese, technetium, rhenium, iron, ruthenium, osmium, rhodium, iridium, palladium, platinum, silver, gold, zinc, cadmium, or mercury and the like.

An azo compound includes an aromatic ring. Not only by applying various structures to the aromatic ring, but by adopting or getting various substituents for the aromatic ring, it is possible to optimize the characteristics of recording, preserving, reproduction stability, etc. As the substituent becomes bulky, there is a tendency to improve the persistence to reproduction light. But at the same time, there is another tendency to lower the recording sensitivity. From this it is proposed to select a suitable substituent with which both characteristics of the persistence and the sensitivity are good. This substituent concerns the solubility of the solvent.

Differing from the recording mechanism of a dye-based information recording medium until now (whose recording laser wavelength is longer than 620 nm), in case of the invention relating to short wavelength laser recording (whose recording wavelength is 405 nm, for instance), the recording mechanism is independent of a physical change in the substrate and/or in the volume of the dye film. During reproducing, the dye is subjected to the irradiation of a feeble laser (weaker than the recording laser). Heat or light of this laser causes a gradual change in the arrangement or orientation of dye molecules in the recording layer, or in the spatial conformation or spatial arrangement of the dye molecules. However, bulky substituents in the dye molecules may disturb that change. In other words, the bulky substituent serves to improve the persistence to reproduction light.

The bulky substituent may be a substituent comprising three or more carbons for substituting an aromatic ring in dye molecule. Examples of the substituent include n-propyl group, isopropyl group, n-butyl group, 1-methylpropyl group, 2-methylpropyl group, n-pentyl group, 1-ethylpropyl group, 1-methylbutyl group, 2-methylbutyl group, 3-methylbutyl group, 1,1-dimethylpropyl group, 1,2-dimethylpropyl group, 2,2-dimethylpropyl group, cyclopentyl group, n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,2-dimethylbutyl group, 2,3-dimethylbutyl group, 3,3-dimethylbutyl group, 1-ethylbutyl group, 2-ethylbutyl group, cyclohexyl group, phenyl group, and the like. Incidentally, the substituent may include an atom other than carbon, such as oxygen, sulfur, nitrogen, silicon, fluorine, bromine, iodine, or the like.

Figure 2:
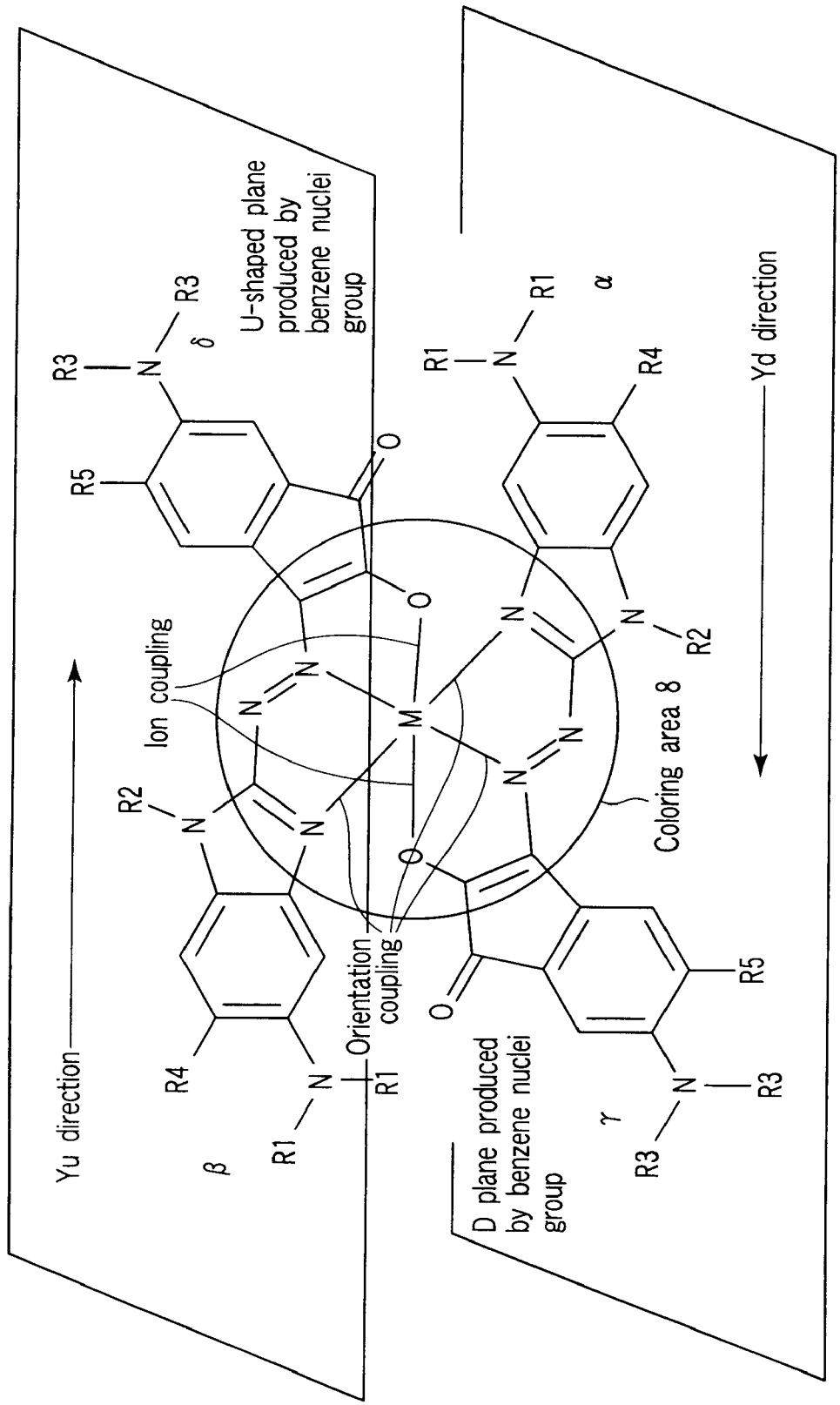
FIG. 2 is an exemplary view showing a metal complex portion of an organic material for a recording layer.

FIG. 2 shows an example of the metal complex portion of an organic dye material for the recording layer. A circular periphery area around center metal M of the azo metal complex shown in FIG. 2 is obtained as coloring area 8. When a laser light beam passes through coloring area 8, local electrons in coloring area 8 resonate to an electric field change of the laser light beam, and absorbs energy of the laser light beam. A value converted to a wavelength of the laser light beam with respect to a frequency of an electric field change at which these local electrons resonate most and easily absorbs the energy is called a maximum absorption wavelength, and is represented by max. As a range of coloring area 8 (resonation range) as shown in FIG. 2 increases, the maximum absorption wavelength λmax is shifted to the long wavelength side. In addition, the localization range of local electrons around the center metal M (how large the center metal M can attract the local electrons to the vicinity of the center) is changed by changing atoms of the center metal M, and the value of the maximum absorption wavelength λmax changes. When a material having a property that the λmax is about 405 nm is selected, an organic material having a sensitivity (optical absorption) at wavelength 405 nm can be obtained.

As the dye material for the recording layer (e.g., L0 or L1) having an optical absorption at wavelength 405 nm, it is possible to use an organic dye material having a structure corresponding to a combination of the organic metal complex portion whose general structural formula is shown by FIG. 2 and a dye material portion (not shown). The center metal M of the organic metal complex portion may generally be cobalt or nickel (or scandium, yttrium, titanium, zirconium, hafnium, vanadium, niobium, tantalum, chrome, molybdenum, tungsten, manganese, technetium, rhenium, iron, ruthenium, osmium, rhodium, iridium, palladium, platinum, copper, silver, gold, zinc, cadmium, mercury, etc.). The dye material portion may be cyanine dye, styril dye, or monomethine cyanine dye (not shown).

Here, a theory of recording in a current DVD-R will be explained. According to a current DVD-R disc, when laser light 7 is irradiated to the recording film, recording film 3-2 partly absorbs the energy of laser light 7, resulting in heating-up at the energy-absorbing portion. When the temperature at that portion goes over a specific temperature, transparent substrate 2-2 is partly deformed. Although a mechanism, which induces deformation of transparent substrate 2-2, is different depending on manufacturers of DVD-R discs, it is said that this mechanism is caused by:

(1) local plastic deformation of transparent substrate 2-2 due to gasification energy of recording layer 3-2; and (2) transmission of a heat from recording layer 3-2 to transparent substrate 2-2 and local plastic deformation of transparent substrate 2-2 due to the heat. If transparent substrate 2-2 is locally plastically deformed, there changes an optical distance of laser light beam 7 reflected in light reflection or reflective layer 4-2 through transparent substrate 2-2, the laser light beam 7 coming back through transparent substrate 2-2 again. A phase difference occurs between the laser light beam 7 from a recording mark, the laser light beam coming back through a portion of the locally plastically deformed transparent substrate 2-2, and the laser light beam 7 from the periphery of the recording mark, the laser light beam coming back through a portion of transparent substrate 2-2 which is not deformed, and thus, a light amount change of reflection light beam occurs due to interference between these light beams. In particular, in case where the above described mechanism of (1) has occurred, a change of a substantial refractive index n32 produced by cavitations of the inside of the recording mark in the recording layer 3-2 due to gasification (evaporation), or alternatively, a change of a refractive index n32 produced due to thermal decomposition of an organic dye recording material in the recording mark, also contributes to the above described occurrence of a phase difference. In the current DVD-R disc, until transparent substrate 2-2 is locally deformed, there is a need for recording layer 3-2 becoming hot (i.e., at a gasification temperature of recording layer 3-2 in the above described mechanism of (1) or at an internal temperature of recording layer 3-2 required for plastically reforming transparent substrate 2-2 in the mechanism of (2)) or there is a need for a part of recording layer 3-2 becoming hot in order to cause thermal decomposition or gasification (evaporation). In order to form a recording mark, there is a need for large amount of power of laser light beam 7.

In order to form the recording mark, there is a demand that recording layer 3-2 can absorb energy of laser light beam 7 at a first stage. The light absorption spectra in recording layer 3-2 influence the recording sensitivity of an organic dye recording film. A principle of light absorption in an organic dye recording material which forms recording layer 3-2 will be described with reference to (A3) of the embodiment.

FIG. 2 shows a specific structural formula of the specific contents "(A3) azo metal complex+Cu" of the constituent elements of the information storage medium. A circular periphery area around center metal M of the azo metal complex shown in FIG. 2 is obtained as coloring area 8. When laser light beam 7 passes through coloring area 8, local electrons in coloring area 8 resonate to an electric field change of laser light beam 7, and absorbs energy of laser light beam 7. A value converted to a wavelength of the laser light beam with respect to a frequency of an electric field change at which these local electrons resonate most and easily absorbs the energy is called a maximum absorption wavelength, and is represented by λmax. As a range of coloring area 8 (resonation range) as shown in FIG. 2 increases, the maximum absorption wavelength λmax is shifted to the long wavelength side. In addition, in FIG. 2, the localization range of local electrons around the center metal M (how large the center metal M can attract the local electrons to the vicinity of the center) is changed by changing atoms of center metal M, and the value of the maximum absorption wavelength λmax changes.

Although it can be predicted that the light absorption spectra of the organic dye recording material in the case where there exists only one coloring area 8 which is absolute 0 degree at a temperature and high in purity draws narrow linear spectra in close to a maximum absorption wavelength λmax, the light absorption spectra of a general organic recording material including impurities at a normal temperature, and further, including a plurality of light absorption areas exhibit a wide light absorption characteristic with respect to a wavelength of a light beam around the maximum absorption wavelength max. FIG. 5 shows an example of light absorption spectra of an organic dye recording material used for a current DVD-R disc. In FIG. 5, a wavelength of a light beam to be irradiated with respect to an organic dye recording film formed by coating an organic dye recording material is taken on a horizontal axis, and absorbance obtained when an organic dye recording film is irradiated with a light beam having a respective wavelength is taken on a vertical axis. The absorbance used here is a value obtained by entering a laser light beam having incident intensity Io from the side of transparent substrate 2-2 with respect to a state in which a recordable or write-once type information storage medium has been completed (or alternatively, a state in which recording layer 3-2 is merely formed on transparent substrate 2-2 (a state that precedes forming of an optical reflection or reflective layer)), and then, measuring reflected laser light intensity Ir (light intensity It of the laser light beam transmitted from the side of recording layer 3-2). The absorbance Ar (At) is represented by:

$$Ar=-\log 10(Ir/Io) \quad (A-1)$$

$$Ar=-\log 10(It/Io) \quad (A-2)$$

Unless otherwise specified, although a description will be given assuming that the absorbance denotes absorbance Ar of a reflection shape expressed by formula (A-1), it is possible to define absorbance At of a transmission shape expressed by formula (A-2) without being limited thereto in the embodiment. In the embodiment shown in FIG. 5, there exist a plurality of light absorption areas, each of which includes coloring area 8, and thus, there exist a plurality of positions at which the absorbance becomes maximal. In this case, there exist a plurality of maximum absorption wavelengths λmax when the absorbance takes a maximum value. A wavelength of the recording laser light in the current DVD-R disc is set to 650 nm. In the case where there exist a plurality of the maximum absorption wavelengths λmax in the embodiment, a value of the maximum absorption wavelength λmax which is the closest to the wavelength of the recording laser light beam becomes important. Therefore, only in the description of the embodiment, the value of the maximum absorption wavelength λmax set at a position which is the closest to the wavelength of the recording laser light beam is defined as "λmax write"; and is discriminated from other λmax (λmax 0).

Figure 6A:
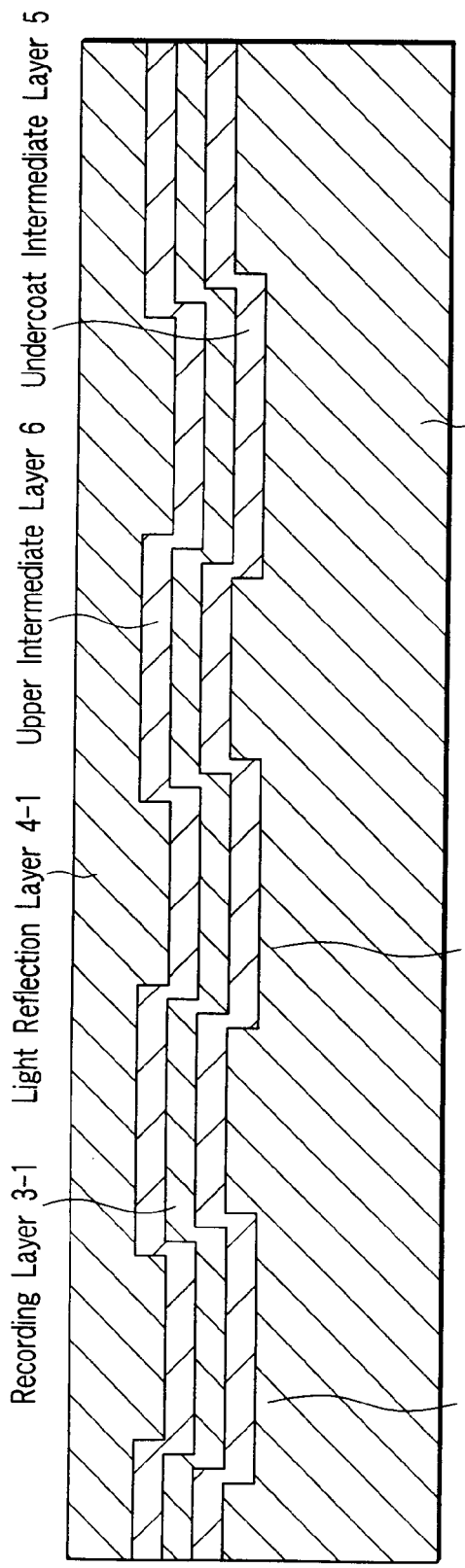
FIGS. 6A and 6B are exemplary views each showing comparison of shapes of recording films formed in a pre-pit area or a pre-groove area 10 in the phase shift recording film and the organic dye recording film.
Figure 6B:
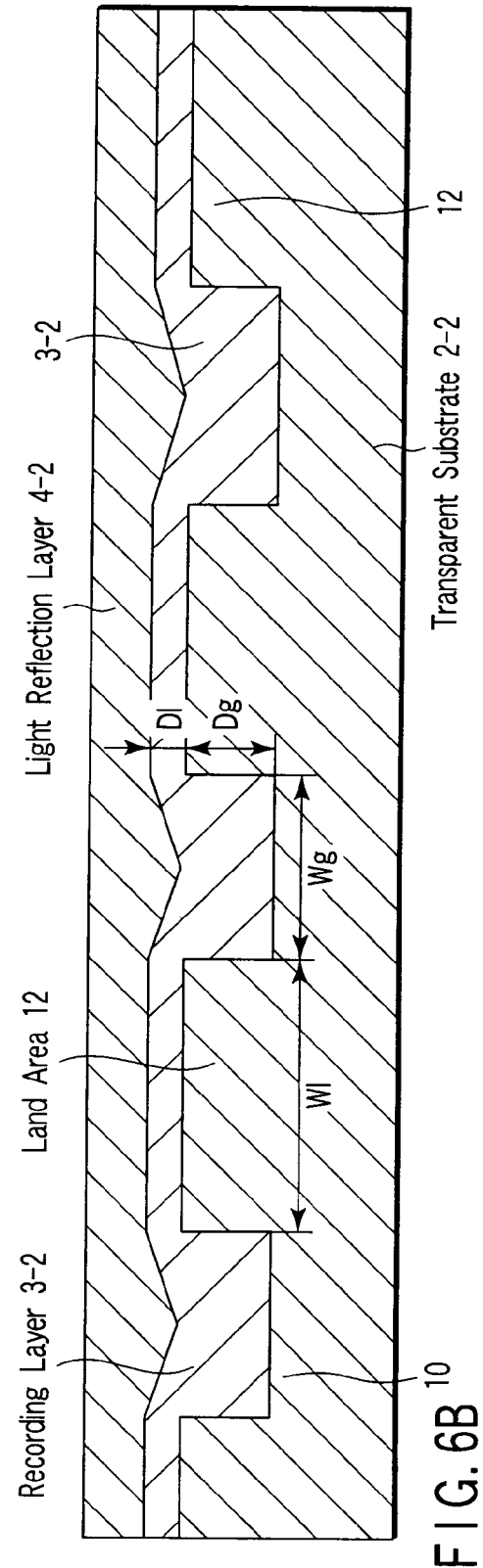

2-2) Difference of light reflection or reflective layer shape in pre-pit/pre-groove area . . . Influence on optical reflection or reflective layer shape (difference between spin-coating and sputtering deposition) and reproduction signal FIGS. 6A and 6B show a comparison in shape when a recording film is formed in a pre-pit area or pre-groove area 10. FIG. 6A shows a shape relevant to a phase change recording film. In the case of forming any of undercoat intermediate layer 5, recording layer 3-1, upper intermediate layer 6, and light reflection or reflective layer 4-1 as well, any of methods of sputtering vapor deposition, vacuum vapor deposition, or ion plating is used in vacuum. As a result, in all of the layers, irregularities of transparent substrate 2-1 are duplicated comparatively faithfully. For example, in the case where a sectional shape in the pre-pit area or pre-groove area 10 of transparent substrate 2-1 is rectangular or trapezoidal, the sectional shape of recording layer 3-1 and light reflection or reflective layer 4-1 each is also rectangular or trapezoidal.

FIG. 6B shows a general recording film sectional shape of a current DVD-R disc which is a conventional technique as a recording film in the case where an organic dye recording film is used. In this case, as a method for forming the recording film 3-2, there is used a method called spin coating (or spinner coating) which is completely different from that shown in FIG. 6A. The spin coating used here denotes a method for dissolving in an organic solvent an organic dye recording material which forms recording layer 3-2; applying a coating onto transparent substrate 2-2; followed by rotating transparent substrate 2-2 at a high speed to spread a coating agent to the outer periphery side of transparent substrate 2-2 by a centrifugal force; and gasifying the organic solvent, thereby forming the recording layer 3-2. Using this method, a process for coating the organic solvent is used, and thus, a surface of recording layer 3-2 (an interface with light reflection or reflective layer 2-2) is easily flattened. As a result, the sectional shape on the interface between light reflection or reflective layer 2-2 and recording layer 3-2 is obtained as a shape which is different from the shape of the surface of transparent substrate 2-2 (an interface between transparent substrate 2-2 and recording layer 3-2). For example, in a pre-groove area in which the sectional shape of the surface of transparent substrate 2-2 (an interface between transparent substrate 2-2 and recording layer 3-2) is rectangular or trapezoidal, the sectional shape on the interface between light reflection or reflective layer 2-2 and recording layer 3-2 is formed in a substantially V-shaped groove shape. In a pre-pit area, the above sectional shape is formed in a substantially conical side surface shape. Further, at the time of spin coating, an organic solvent is easily collected at a recessed portion, and thus, the thickness Dg of recording layer 3-2 in the pre-pit area or pre-groove area 10 (i.e., a distance from a bottom surface of the pre-pit area or pre-groove area to a position at which an interface relevant to light reflection or reflective layer 2-2 becomes the lowest) is larger than the thickness Dl in land area 12 (Dg>Dl). As a result, an amount of irregularities on an interface between transparent substrate 2-2 and recording area 3-2 in the pre-pit area or pre-groove area 10 becomes materially smaller than an amount of irregularities on transparent substrate 2-2 and recording layer 3-2.

As described above, the shape of irregularities on the interface between light reflection or reflective layer 2-2 and recording layer 3-2 becomes blunt and an amount of irregularities becomes significantly small. Thus, in the case where the shape and dimensions of irregularities on a surface of transparent substrate 2 (pre-pit area or pre-groove area 10) are equal to each other, depending on a difference in method for forming a recording film, the diffraction intensity of the reflection light beam from the organic dye recording film at the time of laser light irradiation is degraded more significantly than the diffraction intensity of the reflection light beam from the phase change recording film. As a result, in the case where the shape and dimensions of irregularities on the surface of transparent substrate 2 (pre-pit area or pre-groove area 10) are equal to each other, as compared with use of the phase change recording film, use of the conventional organic dye recording film is disadvantageously featured in that:

(1) a degree of modulation of a light reproduction signal from the pre-pit area is small, and signal reproduction reliability from the pre-pit area is poor;

(2) a sufficiently large track shift detecting signal is hardly obtained in accordance with a push-pull technique from the pre-groove area; and (3) a sufficient large wobble detecting signal is hardly obtained in the case where wobbling occurs in the pre-groove area.

In addition, in a DVD-R disc, specific information such as address information is recorded in a small irregular (pit) shape in a land area, and thus, width Wl of the land area 12 is larger than width Wg of the pre-pit area or pre-groove area 10 (Wg>Wl).

Figure 7A:
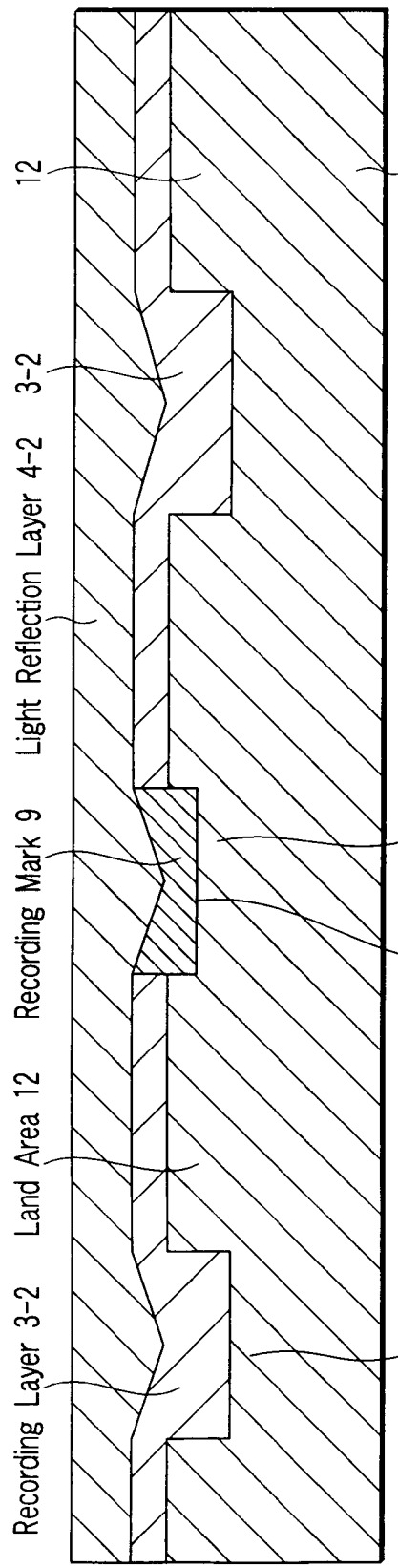
FIGS. 7A and 7B are exemplary views each showing a specific plastic deformation state of a transparent substrate 2-2 at a position of a recording mark 9 in a write-once type information storage medium using a conventional organic dye material.
Figure 7B:
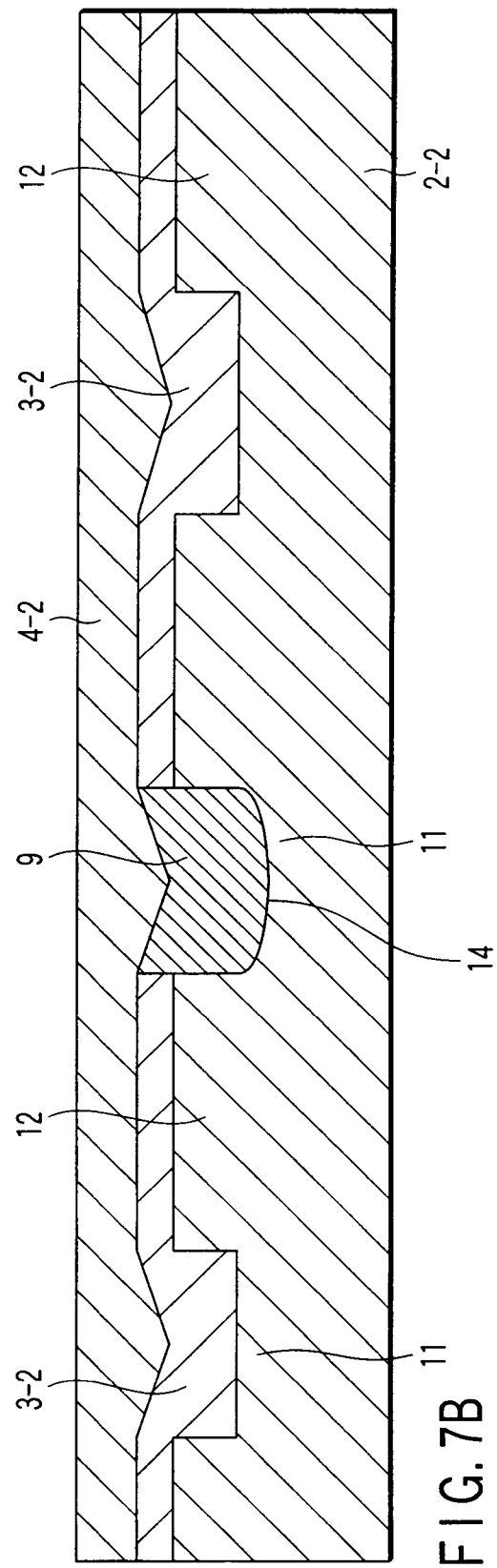

Chapter 3: Description of Characteristics of Organic Dye Recording Film in the Embodiment 3-1) Problem(s) Relevant to Achievement of High Density in Write-Once Type Recording Film (DVD-R) Using Conventional Organic Dye Material As has been described in "2-1) Difference in recording principle/recording film structure and difference in basic concept relating to generation of reproducing signal", a general principle of recording of a current DVD-R and CD-R, which is a recordable (write-once type) information storage medium using a conventional organic dye material includes "local plastic deformation of transparent substrate 2-2" or "local thermal decomposition or gasification in recording layer 3-2". FIGS. 7A and 7B show a plastic deformation state of a specific transparent substrate 2-2 at a position of a recording mark 9 in a write-once type information storage medium using a conventional organic dye material. There exist two types of typical plastic deformation states. There are two cases, i.e., a case in which, as shown in FIG. 7A, a depth of bottom surface 14 of a pre-groove area at the position of recording mark 9 (an amount of step relevant to adjacent land area 12) is different from a depth of a bottom surface of pre-groove area 11 in an unrecorded area (in the example shown in FIG. 7A, the depth of bottom surface 14 in the pre-groove area at the position of recording mark 9 is shallower than that in the unrecorded area); and a case in which, as shown in FIG. 7B, bottom surface 14 in a pre-groove area at the position of recording mark 9 is distorted and is slightly curved (the flatness of bottom surface 14 is distorted: In the example shown in FIG. 7B, bottom surface 14 in the pre-groove area at the position of recording mark 9 is slightly curved toward the lower side). Both of these cases are featured in that a plastic deformation range of transparent substrate 2-2 at the position of recording mark 9 covers a wide range. In the current DVD-R disc which is a conventional technique, a track pitch is 0.74 µm, and a channel bit length is 0.133 µm. In the case of a large value of this degree, even if the plastic deformation range of transparent substrate 2-2 at the position of recording mark 9 covers a wide range, comparatively stable recording and reproducing processes can be carried out.

However, if the track pitch is narrower than 0.74 µm described above, the plastic deformation range of transparent substrate 2-2 at the position of recording mark 9 covers a wide range, and thus, the adjacent tracks are adversely affected with "cross-write" or "cross-erase". In the "cross-write" the recording mark is widened to the adjacent tracks, and in the "cross-erase" the recording mark of the existing adjacent track is substantially erased (or cannot be reproduced) due to overwriting. In addition, in a direction (circumferential direction) along the tracks, if the channel bit length is narrower than 0.133 µm, there occurs a problem that inter-code interference appears; an error rate at the time of reproduction significantly increases; and the reliability of reproduction is lowered.

3-2) Description of Basic Characteristics Common to Organic Dye Recording Film in the Embodiment 3-2-A] Range Requiring Application of Technique According to the Embodiment As shown in FIGS. 7A and 7B, in a conventional recordable (write-once type) information storage medium including plastic deformation of transparent substrate 2-2 or local thermal decomposition or gasification phenomenon in recording film 3-2, a description will be given below with respect to what degree of track pitch is narrowed when an adverse affect appears or what degree of channel pit length is narrowed when an adverse effect appears and a result obtained after technical discussion has been carried out with respect to a reason for such an adverse effect. A range in which an adverse effect starts appearing in the case of utilizing the conventional principle of recording indicates a range (suitable for the achievement of high density) in which advantageous effect is attained due to a novel principle of recording shown in the embodiment.

1) Condition of Thickness Dg of Recording Layer 3-2

When an attempt is made to carry out thermal analysis in order to theoretically identify a lower limit value of an allowable channel bit length or a lower limit value of allowable track pitch, a range of the thickness Dg of recording layer 3-2 which can be substantially thermally analyzed becomes important. In a conventional recordable (write-once type) information storage medium (CD-R or DVD-R) including plastic deformation of transparent substrate 2-2 as shown in FIGS. 7A and 7B, with respect to a change of light reflection amount in the case where an information reproduction focusing spot is provided in recording mark 8 and in the case where the spot is in an unrecorded area of recording layer 3-2, the largest factor is "an interference effect due to a difference in optical distance in recording mark 9 and in unrecorded area". In addition, a difference in its optical difference is mainly caused by "a change of the thickness Dg of physical recording layer 3-2 due to plastic deformation of transparent substrate 2-2 (Dg: a physical distance from an interface between transparent substrate 2-2 and recording layer 3-2 to an interface between recording layer 3-2 and light reflection or reflective layer 4-2)" and "a change in refractive index n32 of recording layer 3-2 in recording mark 9". Therefore, in order to obtain a sufficient reproduction signal (change of light reflection amount) between the recording mark 9 and the unrecorded area, when a wavelength in vacuum of laser light beam is defined as λ, it is demanded that the value of thickness Dg of recording layer 3-2 in the unrecorded area has a size to some extent as compared with λ/n32. If not, a difference (phase difference) in optical distance between the recording mark 9 and the unrecorded area does not appear, and light interference effect becomes small. In practice, a minimum condition:

$$Dg \geq \lambda/8n32 \quad (1)$$

shall be met, and desirably, a condition that:

$$Dg \geq \lambda/4n32 \quad (2)$$

may be met.

At a time point of current discussion, the vicinity of λ=405 nm is assumed. A value of refractive index n32 of an organic dye recording material at 405 nm ranges from 1.3 to 2.0. Therefore, as a result of substituting n32=2.0 in formula (1), it is conditionally mandatory that the value of thickness Dg of recording layer 3-2 is:

$$Dg \geq 25 \text{ nm} \quad (3)$$

Here, discussion is made with respect to a condition when an organic dye recording layer of a conventional recordable (write-once type) information storage medium (CD-R or DVD-R) including plastic deformation of transparent substrate 2-2 is associated with a light beam of 405 nm. As described later, in the embodiment, although a description is given with respect to a case in which plastic deformation of transparent substrate 2-2 does not occur and a change of absorption coefficient k32 is a main factor of the principle of recording, it is demanded to carry out track shift detection by using, e.g., a DPD (Differential Phase Detection) technique from recording mark 9, and thus, in reality, the change of refractive index n32 is caused in recording mark 9. Therefore, the condition for formula (3) is considered to be met in the embodiment in which plastic deformation of transparent substrate 2-2 does not occur.

From another point of view as well, the range of thickness Dg can be specified. In the case of a phase change recording film shown in FIG. 6A, when a refractive index of the transparent substrate is n21, the step amount between a pre-pit area and a land area is λ/(8n21) when the largest track shift detection signal is obtained by using a push-pull technique. However, in the case of an organic dye recording film shown in FIG. 6B, as described previously, the shape on an interface between recording layer 3-2 and light reflection or reflective layer 4-2 becomes blunt, and the step amount becomes small. Thus, it is demanded to increase the step amount between the pre-pit area and the land area on transparent substrate 2-2 more significantly than $\lambda/(8n22)$. When polycarbonate is used as a material for transparent substrate 2-2, for example, the refractive index at 405 nm is $n22 \cong 1.62$. From this, it is demanded to increase a step amount between the pre-pit area and the land area more significantly than 31 nm. In the case of using a spin coating technique, if the thickness Dg of recording layer 3-2 in the pre-groove area is greater than the step amount between the pre-pit area and the land area on transparent substrate 2-2, there is a risk that the thickness D1 of recording layer 3-2 in land area 12 disappears. Therefore, from the above described discussion result, it is demanded to meet a condition that:

$$Dg \geq 31 \text{ nm} \quad (4)$$

The condition for formula (4) is also a condition, which should be met in the embodiment in which plastic deformation of transparent substrate 2-2 does not occur. Although conditions for the lower limit values have been shown in formulas (3) and (4), the value $Dg \cong 60$ nm obtained by substituting $n32=1.8$ for an equal sign portion in formula (2) is utilized as the thickness Dg of recording layer 3-2 used for thermal analysis.

Then, assuming polycarbonate used as a standard material of transparent substrate 2-2, 150° C. which is a glass transition temperature of polycarbonate is set as an estimate value of a thermal deformation temperature at the side of transparent substrate 2-2. For discussion using thermal analysis, a value of $k32=0.1$ to $0.2$ is assumed as a value of an absorption coefficient of organic dye recording film 3-2 at 405 nm. Further, for the case wherein NA=60 as the condition of a conventional DVD-R format and NA=0.65 as the H format, discussion has been made with respect to the NA value of a focusing objective lens and the incident light intensity distribution when the light passes through the objective lens.

(2) Condition for Lower Limit Value of Channel Bit Length

A check has been made for a lengthwise change in a direction along a track of an area reaching a thermal deformation temperature at the side of transparent substrate 2-2 which comes into contact with recording layer 3-2, when recording power is changed. Discussion has been made with respect to a lower limit value of an allowable channel bit length considering a window margin at the time of reproduction. As a result, if the channel bit length is lower than 105 nm, it is considered that a lengthwise change in a direction along a track in an area which reaches the thermal deformation temperature at the side of transparent substrate 2-2 occurs according to a slight change in the recording power, and a sufficient window margin cannot be obtained. On discussion of thermal analysis, an analogous tendency is shown in the case where the NA value is any one of 0.60, 0.65, and 0.85. Although a focusing spot size is changed by changing the NA value, a possibility cause is believed to be that a thermal spreading range is wide (a gradient of a temperature distribution at the side of transparent substrate 2-2 which comes into contact with recording layer 3-2 is comparatively gentle). In the above thermal analysis, the temperature distribution at the side of transparent substrate 2-2 which comes into contact with recording layer 3-2 is discussed, and thus, an effect of the thickness Dg of recording layer 3-2 does not appear.

Further, in the case where a shape change of transparent substrate 3-3 shown in FIGS. 7A and 7B occurs, a boundary position of a substrate deformation area blurs (is ambiguous), and thus, a window margin is lowered more significantly. When the sectional shape of an area in which recording mark 9 is formed is observed by an electron microscope, it is believed that a blurring amount of the boundary position of the substrate deformation area increases as the value of the thickness Dg of recording layer 3-2 increases. With respect to the effect of the thermal deformation area length due to the above recording power change, in consideration of the blurring of the boundary position of this substrate deformation area, it is demanded that the lower limit value of the channel bit length allowed for allocation of a sufficient window margin is in order of two times of the thickness Dg of recording layer 3-2, and it is desirable that the lower limit value is greater than 120 nm.

In the foregoing, a description has been principally given with respect to discussion using thermal analysis in the case where thermal deformation of transparent substrate 2-2 occurs. There also exists a case in which plastic deformation of transparent substrate 2-2 is very small as another principle of recording (mechanism of forming the recording mark 9) in a conventional write-once type information storage medium (CD-R or DVD-R) and thermal deformation or gasification (evaporation) of the organic dye recording material in recording layer 3-2 mainly occurs. Thus, an additional description will be given with respect to such a case. Although the gasification (evaporation) temperature of the organic dye recording material is different depending on the type of the organic dye material, in general, the temperature ranges 220° C. to 370° C., and a thermal decomposition temperature is lower than this range. Although a glass transition temperature 150° C. of a polycarbonate resin has been presumed as an arrival temperature at the time of substrate deformation in the above discussion, a temperature difference between 150° C. and 220° C. is small, and, when transparent substrate 2-2 reaches 150° C., the inside of recording layer 3-2 may exceed 220° C. Therefore, although there exists an exception depending on the type of the organic recording material, even in the case where plastic deformation of transparent substrate 2-2 is very small and thermal decomposition or gasification (evaporation) of the organic dye recording material in the recording layer mainly occurs, there is obtained a result which is substantially identical to the above discussion result.

When the discussion result relating to the above channel bit length is summarized, in the conventional write-once type information storage medium (CD-R or DVD-R) including plastic deformation of transparent substrate 2-2, it is considered that, when a channel bit length is narrower than 120 nm, the lowering of a window margin occurs, and further, if the length is smaller than 105 nm, stable reproduction becomes difficult. That is, when the channel bit is smaller than 120 nm (e.g., 105 nm), advantageous effect is attained by using a novel principle of recording shown in the embodiment.

(3) Condition for Lower Limit Value of Track Pitches

When recording layer 3-2 is exposed at recording power, energy is absorbed in recording layer 3-2, and a high temperature is obtained. In a conventional write-once type information storage medium (CD-R or DVD-R), it is demanded to absorb energy in recording layer 3-2 until transparent substrate 3-2 has reached a thermal deformation temperature. A temperature at which a structural change of the organic dye recording material occurs in recording layer 3-2 and a value of a refractive index n32 or an absorption coefficient k32 starts its change is much lower than an arrival temperature for transparent substrate 2-2 to start thermal deformation. Therefore, the value of refractive index n32 or absorption coefficient k32 changes in a comparatively wide range in recording layer 3-2 at the periphery of recording mark 9, which is thermal deformed at the side of transparent substrate 2-2, and this change seems to cause "cross-write" or "cross-erase" for the adjacent tracks. It is possible to set the lower limit value of track pitch in which "cross-write" or "cross-erase" does not occur with the width of an area which reaches a temperature that changes the refractive index n32 or absorption coefficient k32 in recording layer 3-2 when transparent substrate 2-2 exceeds a thermal deformation temperature. From the above point of view, it is considered that "cross-write" or "cross-erase" may occur in location in which the track pitch is equal to or smaller than 500 nm. Further, in consideration of an effect of warping or inclination of an information storage medium or a change of recording power (recording power margin), it can be concluded difficult to set the track pitch to 600 nm or less in the conventional write-once type information storage medium (CD-R or DVD-R) in which energy is absorbed in recording layer 3-2 until transparent substrate 2-2 has reached a thermal deformation temperature. As described above, even if the NA value is changed from 0.60, 0.65, and then, to 0.85, substantially similar tendency is shown because the gradient of the temperature distribution in the peripheral recording layer 3-2 when transparent substrate 2-2 has reached a thermal deformation temperature at a center part is comparatively gentle, and the thermal spread range is wide. In the case where plastic deformation of transparent substrate 2-2 is very small and thermal decomposition or gasification (evaporation) of the organic dye recording material in recording layer 3-2 mainly occurs as another principle of recording (mechanism of forming the recording mark 9) in the conventional write-once type information storage medium (CD-R or DVD-R), as has been described in the section "(2) Condition for lower limit value of channel bit", the value of track pitch at which "cross-write" or "cross-erase" starts is obtained as a substantially analogous result. For the above described reason, advantageous effect is attained by using a novel principle of recording shown in the embodiment when the track pitch is set to 600 nm (500 nm) or lower.

3-2-B] Basic Characteristics Common to Organic Dye Recording Material in the Invention As described above, in the case where plastic deformation of transparent substrate 2-2 is very small and thermal decomposition or gasification (evaporation) of the organic dye recording material in recording layer 3-2 mainly occurs as another principle of recording (mechanism of forming the recording mark 9) in the conventional write-once type information storage medium (CD-R or DVD-R), there occurs a problem that a channel bit length or track pitches cannot be narrowed because the inside of recording layer 3-2 or a surface of transparent substrate 2-2 reaches a high temperature at the time of forming the recording mark 9. In order to solve the above described problem, the embodiment is featured in "inventive organic dye material" in which "a local optical characteristic change in recording layer 3-2, which occurs at a comparatively low temperature, is a principle of recording" and "setting environment (recording film structure or shape) in which the above principle of recording easily occurs without causing a substrate deformation and gasification (evaporation) in recording layer 3-2. Specific characteristics of the embodiment can be listed below.

α] Optical characteristic changing method inside of recording layer 3-2

Chromogenic characteristic change

Change of light absorption sectional area due to qualitative change of coloring area 8 (FIG. 2) or change of molar molecule light absorption coefficient Coloring area 8 is partially destroyed or the size of coloring area 8 changes, whereby a substantial light absorption sectional area changes. In this manner, an amplitude (absorbance) at a position of max write changes in recording mark 9 while a profile (characteristics) of light absorption spectra (FIG. 5) itself is maintained.

Change of electronic structure (electron orbit) relevant to electrons which contribute to a chromogenic phenomenon Change of light absorption spectra (FIG. 5) based on discoloring action due to cutting of local electron orbit (dissociation of local molecular bonding) or change of dimensions or structure of coloring area 8 (FIG. 2)

Intra-molecular (inter-molecular) change of orientation or array

Optical characteristic change based on orientation change in azo metal complex shown in FIG. 2, for example Molecular structure change in molecule For example, discussion is made with respect to an organic dye material which causes either of dissociation between anion portion and cation portion, thermal decomposition of either of anion portion and cation portion, and a tar phenomenon that a molecular structure itself is destroyed, and carbon atoms are precipitated (denaturing to black coal tar). As a result, the refractive index n32 and/or absorption coefficient k32 in recording mark 9 is changed with respect to an unrecorded area, enabling optical reproduction.

β] Setting recording film structure or shape, making it easy to stably cause an optical characteristic change of [α] above:

The specific contents relating to this technique will be described in detail in the section "3-2-C) Ideal recording film structure which makes it easy to cause a principle of recording shown in the embodiment" and subsequent.

γ] Recording power is reduced in order to form recording mark in a state in which inside of recording layer or transparent substrate surface is comparatively low at temperature The optical characteristic change shown in [α] above occurs at a temperature lower than a deformation temperature of transparent substrate 2-2 or a gasification (evaporation) temperature in recording layer 3-2. Thus, the exposure amount (recording power) at the time of recording is reduced to prevent the deformation temperature from being exceeded on the surface of transparent substrate 2-2 or the gasification (evaporation) temperature from being exceeded in recording layer 3-2. The contents will be described later in detail in the section "3-3) Recording characteristics common to organic dye recording layer in the embodiment". In addition, in contrast, it becomes possible to determine whether or not the optical characteristic change shown in [α] above occurs by checking a value of the optimal power at the time of recording.

δ] Electron structure in a coloring area is stabilized, and structural decomposition relevant to ultraviolet ray or reproduction light irradiation is hardly generated When ultraviolet ray is irradiated to recording layer 3-2 or reproduction light is irradiated to recording layer 3-2 at the time of reproduction, a temperature size in recording layer 3-2 occurs. There is a demand for an apparently contradictory performance that characteristic degradation relevant to such a temperature rise is prevented and recording is carried out at a temperature lower than a substrate deformation temperature or a gasification (evaporation) temperature in recording layer 3-2. In the embodiment, the above described apparently contradictory performance is satisfied by "stabilizing an electron structure in a coloring area". The specific technical contents may be described in "Chapter 4 Specific Description of Embodiments of Organic Dye Recording Film in the embodiment".

ϵ] Reliability of reproduction information is improved for a case in which reproduction signal degradation due to ultraviolet ray or reproduction light irradiation occurs In the embodiment, although a technical contrivance is made for "stabilizing an electron structure in a coloring area", the reliability of recording mark 9 formed by a principle of recording shown in the embodiment may be principally lowered as compared with a local cavity in recording layer 3-2 generated due to plastic deformation or gasification (evaporation) of the surface of transparent substrate 2-2. As countermeasures against it, in the embodiment, advantageous effect that the high density and the reliability of recording information are achieved at the same time in combination with strong error correction capability (novel ECC block structure), as may be described in "Chapter 7: Description of H Format" and "Chapter 8: Description of B Format". Further, in the embodiment, PRML (Partial Response Maximum Likelihood) technique is employed in a reproduction method, as may be described in the section "4-2 Description of reproducing circuit in the embodiment". The high density and the reliability of recording information are achieved at the same time in combination with an error correction technique at the time of the ML demodulation.

5-2) Characteristics of light absorption spectra relating to "L-H" recording film in the embodiment . . . . Setting condition for the value of maximum absorption wavelength max write and Ah405

As described in "3-4) Description of characteristics relating to "H-L" recording film in the embodiment, the relative absorbance in an unrecorded area is basically low in the "H-L" recording film, and thus, when reproduction light is irradiated at the time of reproduction, there occurs a little optical characteristic change generated by absorbing energy of the reproduction light. Even if an optical characteristic change (update of recording action) occurs after the energy of the reproduction light is absorbed in a recording mark having high absorbance, a light reflection factor from the recording mark is lowered. Thus, reproduction signal processing is less affected because such a change effects on a direction in which an amplitude (I11≡I11H−I11L) of the reproduction signal increases.

In contrast, the "L-H" recording film has optical characteristics that "a light reflection factor of an unrecorded portion is lower than that in a recording mark". This means that the absorbance of the unrecorded portion is higher than that in the recording mark. Thus, in the "L-H" recording film, signal degradation at the time of reproduction is likely to occur as compared with the "H-L" recording film.

As described in "3-2-B] Basic characteristics common to organic dye recording material in the invention", there is a demand for improving reliability of reproduction information in the case where reproduction signal degradation has occurred due to ϵ] ultraviolet ray or reproduction light irradiation".

As a result of examining the characteristics of an organic dye recording material in detail, it is found that a mechanism of absorbing the energy of reproduction light to cause an optical characteristic change is substantially analogous to that of an optical characteristic change due to ultraviolet ray irradiation. As a result, if there is provided a structure of improving durability relevant to ultraviolet ray irradiation in an unrecorded area, signal degradation at the time of reproduction hardly occurs. Thus, the embodiment is featured in that, in the "L-H" recording film, a value of (max write (maximum absorption wavelength which is the closest to wavelength of recording light) is longer than a wavelength of recording light or reproduction light (close to 405 nm). In this manner, the absorbance relevant to the ultraviolet ray can be reduced, and the durability relevant to ultraviolet ray irradiation can be significantly improved. As is evident from FIG. 9, a difference in absorbance between the recorded portion and the unrecorded portion in the vicinity of max write is small, and a degree of reproduction signal modulation (signal amplitude) is reduced where the light with a wavelength in the vicinity of λmax write is used for reproduction. In view of a wavelength change of a semiconductor laser light source, it is advisable that a sufficiently large degree of reproduction signal modulation (signal amplitude) be taken in the range of 355 nm to 455 nm. Therefore, in the embodiment, the design of recording film 3-2 is made so that the wavelength of λmax write exists out of the range of 355 nm to 455 nm (i.e., at a longer wavelength than 455 nm).

Figure 8:
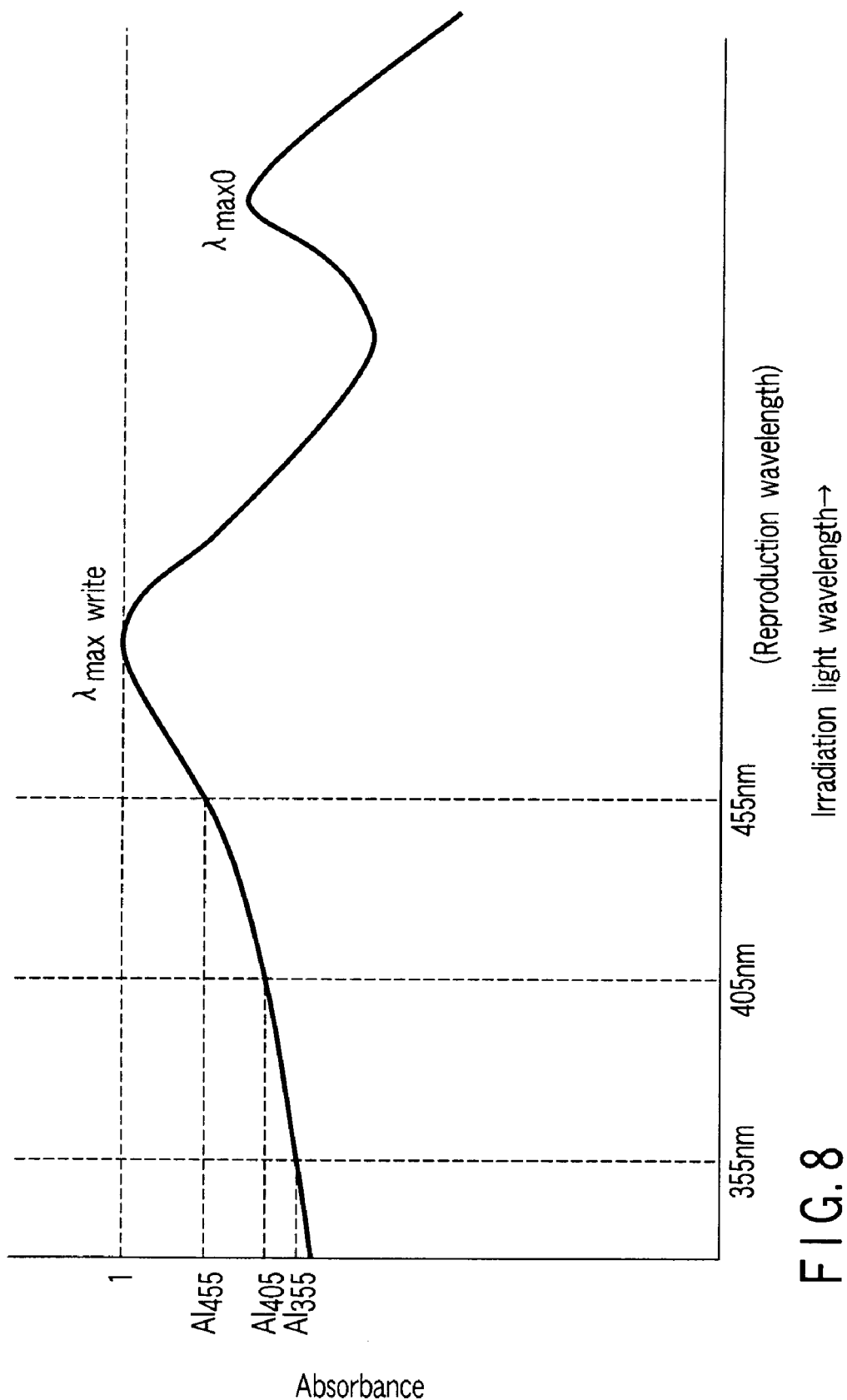
FIG. 8 is an exemplary view showing light absorption spectrum characteristics in an unrecorded state of the "L-H" recording film.

FIG. 8 shows an example of light absorption spectra in the "L-H" recording film in the embodiment. As described in "5-1) Description of feature relating to "L-H" recording film, lower limit value β of a light reflection factor at a non-recording portion ("L" section) of the "L-H" recording film is set to 18%, and upper limit value γ is set to 32% in the embodiment. From 1−0.32=0.68, in order to meet the above condition, it is possible to intuitively understand that value Al405 of the absorbance in an unrecorded area at 405 nm should meet:

$$Al405 \geq 68\% \tag{36}$$

Although the light reflection factor at 405 nm of light reflection or reflective layer 4-2 is slightly lowered than 100%, it is assumed that the factor is almost close to 100% for the sake of simplification. According to this assumption, the light reflection factor when absorbance Al=0 is almost 100%. In FIG. 8, the light reflection factor of the whole recording film at the wavelength of λmax write is designated by Rλmax write. At this time, assuming that the light reflection factor is zero (Rλmax write≅0), formula (36) is derived. However, in actuality, the factor is not set to "0", and thus, it is demanded to derive a severer formula. A severe conditional formula for setting the upper light value γ of the light reflection factor of the non-recording portion ("L" portion) of the "L-H" recording film to 32% is given by:

$$1 - Al405 \times (1 - R\lambda max\ write) \leq 0.32 \tag{37}$$

In a conventional write-once type information storage medium, only the "H-L" recording film is used, and there is no accumulation of information relating to the "L-H" recording film. However, in the case of using the embodiment described in "5-3) Anion portion: azo metal complex+cation portion: dye", the severest condition which meets formula (37) is obtained as:

$$Al405 \geq 80\% \tag{38}$$

In the case of using an organic dye recording material described later in the embodiment, when an optical design of a recording film is made including a margin such as a characteristic variation at the time of manufacture or a thickness change of recording layer 3-2, it is found that a minimum condition, which meet the reflection factor described in the section "Description of feature relating to "L-H" recording film" in the embodiment:

$$Al405 \geq 40\% \tag{39}$$

may be satisfied. Further, by satisfying either of:

$$Al355 \geq 40\% \quad (40)$$

$$Al455 \geq 40\% \quad (41)$$

it is possible to ensure stable recording characteristics or reproduction characteristics even if the wavelength of a light source is changed in the range of 355 nm to 405 nm or in the range of 405 nm to 455 nm (in the range of 355 nm to 455 nm when both of the formulas are met at the same time).

FIG. 9 shows a light absorption spectrum change after recorded in the "L-H" recording film according to the embodiment. It is considered that the value of maximum absorption wavelength Imax in the recording mark deviates from wavelength of max write, and an inter-molecular array change (for example, an array change between azo metal complexes) occurs. Further, it is considered that a discoloring action (cutting of local electron orbit (or local molecular link dissociation)) occurs in parallel to a fact that both of the absorbance in location of λlmax and the absorbance Al405 at 405 nm are lowered and the light absorption spectra spreads itself.

In the "L-H" recording film according to the embodiment as well, by meeting each of formulas (20), (21), (22), and (23), the same signal processor circuit is made available for both of the "L-H" recording film and the "H-L" recording film, thereby promoting simplification and cost reduction of the signal processor circuit. In formula (20), when:

$$I11/I11H \equiv (I11H - I11L)/I11H \geq 0.4 \quad (42)$$

is modified, $$I11H \geq I11L/0.6 \quad (43)$$

is obtained. As described previously, in the embodiment, lower limit value β of the light reflection factor of an unrecorded portion ("L" portion) of the "L-H" recording film is set to 18%, and this value corresponds to I11L. Further, conceptually, the above value corresponds to:

$$I11H \approx 1 - Ah405 \times (1 - R\lambda max\ write) \quad (44).$$

Thus, from formulas (43) and (44), the following formula is established:

$$1 - Ah405 \times (1 - R\lambda max\ write) \geq 0.18/0.6 \quad (45)$$

When $1 - R\lambda max\ write \approx 0$, formula (45) may be obtained as:

$$Ah405 \leq 0.7 \quad (46)$$

In comparison between the above formulas (46) and (36), it is found that the values of Al405 and Ah405 may be seemingly set in the vicinity of 68% to 70% as values of absorbance. Further, in view of a case in which the value of Al405 is obtained in the range of formula (39) and performance stability of a signal processor circuit, a sever condition may be obtained as:

$$Ah405 \leq 0.4 \quad (47)$$

If possible, it is advisable to meet;

$$Ah405 \leq 0.3 \quad (48)$$

An evaluation disc of recordable dual-layered optical disc 100 according to one embodiment can be made as follows. More specifically, on transparent resin substrate 101, a 1.2 wt % TFP solution of an organic dye is applied by spin coating to form L0 recording layer 105. The thickness of the dye after application from the bottom of the groove is set to be 60 nm. Reflecting film 106 of an Ag alloy with 25 nm thick is laminated or stacked on the dye-coated substrate by sputtering, and intermediate layer 104 of 2P (photo polymer) resin with 25 μm thickness is spin-coated. A separately prepared polycarbonate stamper is placed thereon to transfer the groove shape, and the stamper is removed. On the 2P resin intermediate layer 104 thus prepared, a 1.2 wt % TFP solution of an organic dye is applied by spin coating to form L1 recording layer 107. Reflection or reflective film 108 of an Ag alloy is laminated or stacked thereon with a thickness of 100 nm by sputtering, and pasted with 0.59 mm thick transparent resin substrate 102 by using UV hardening resin 103.

Using the information storage medium (a single-sided dual-layer evaluation disc) produced as described above, an experiment for evaluating a reproduction signal is performed.

The apparatus used for evaluation is optical disc evaluation apparatus ODU-1000 manufactured by Pulstec Industrial Co., Ltd. This apparatus has a laser wavelength of 405 nm and NA of 0.65. The linear velocity in recording and reproduction is selected to be 6.61 m/s. A recording signal is 8-12 modulated random data, and information is recorded by using a laser waveform containing a given recording power and two bias powers 1 and 2 as shown in FIG. 34. The recording conditions applied to the evaluation are as follows.

Explanation on Recording Conditions (Information of Write Strategy)

Referring to FIG. 34, a description will be given with respect to a recording waveform (exposure condition at the time of recording) used when the optimal recording power is checked. The exposure levels at the time of recording have four levels of recording power (peak power), bias power 1, bias power 2, and bias power 3. When long (4T or more) recording mark 9 is formed, modulation is carried out in the form of multi-pulses between recording power (peak power) and bias power 3. In the embodiment, in any of the H format and B format systems, a minimum mark length relevant to channel bit length T is obtained as 2T. In the case where the minimum mark of 2T is recorded, one write pulse of the recording power (peak power) level after bias power 1 is used as shown in FIG. 34, and bias power 2 is temporarily obtained immediately after the write pulse. In the case where 3T recording mark 9 is recorded, bias power 2 is temporarily used after exposing two write pulses, a first pulse and a last pulse of recording power (peak power) level that follows bias power 1. In the case where recording mark 9 having a length of 4T or more is recorded, bias power 2 is used after the exposure is made with multi-pulse and write pulse.

The vertical dashed line in FIG. 34 shows a channel clock cycle. When a 2T minimum mark is recorded, the laser power is raised at a position delayed by TSFP from the clock edge, and fallen at a position delayed by TELP from the one-clock passing portion. The just-subsequent cycle during which the laser power is set at bias power 2 is defined as TLC. Values of TSFP, TELP, and TLC are recorded in physical format information PFI contained in control data zone CDZ in the case of the H format.

In the case where a 3T or more long recording mark is formed, the laser power is risen at a position delayed by TSFP from the clock edge, and lastly, ended with a last pulse. Immediately after the last pulse, the laser power is kept at bias power 2 during the period of TLC. Shift times from the clock edge to the rise/fall timing of the last pulse are defined as TSLP, TELP. In addition, a shift time from the clock edge to the fall timing of the last pulse is defined as TEFP, and further, an interval of a single pulse of the multi-pulse is defined as TMP.

Each of intervals TELP-TSFP, TMP, TELP-TSLP, and TLC is defined as a half-value wide relevant to the maximum value. In addition, in the embodiment, the above parameter setting ranges are defined as follows:

$$0.25T \leq TSFP \leq 1.50T \quad \text{(eq. 01)}$$

$$0.00T \leq TELP \leq 1.00T \quad \text{(eq. 02)}$$

$$1.00T \leq TEFP \leq 1.75T \quad \text{(eq. 03)}$$

$$-0.10T \leq TSLP \leq 1.00T \quad \text{(eq. 04)}$$

$$0.00T \leq TLC \leq 1.00T \quad \text{(eq. 05)}$$

$$0.15T \leq TMP \leq 0.75T \quad \text{(eq. 06)}$$

Further, in the embodiment, the values of the above described parameters can be changed or modified according to the recording mark length (Mark Length) and the immediately preceding/immediately succeeding space length (Leading/Trailing space length).

For the recordable information recording medium whose recording is to be performed based on the recording theory of the embodiment, parameters of the optimum recording power are investigated. The result is that the values of bias power 1, bias power 2, and bias power 3 are 2.6 mW, 1.7 mW, and 1.7 mW, respectively, and reproduction power is 0.4 mW.

Optimum recording conditions (information of Write Strategy) can be determined with an apparatus (disc drive) by which a test writing has been done at a drive test zone according to the respective parameter values as mentioned above.

As data of the recording signal, repetitive patterns of 11T mark and 11T space are also used. The physical format existing in the recording layers (L0, L1) on transparent resin substrate 101 and photo polymer resin 104 used in the following examples is explained with reference to FIGS. 26-34.

Example 1

Figure 4:
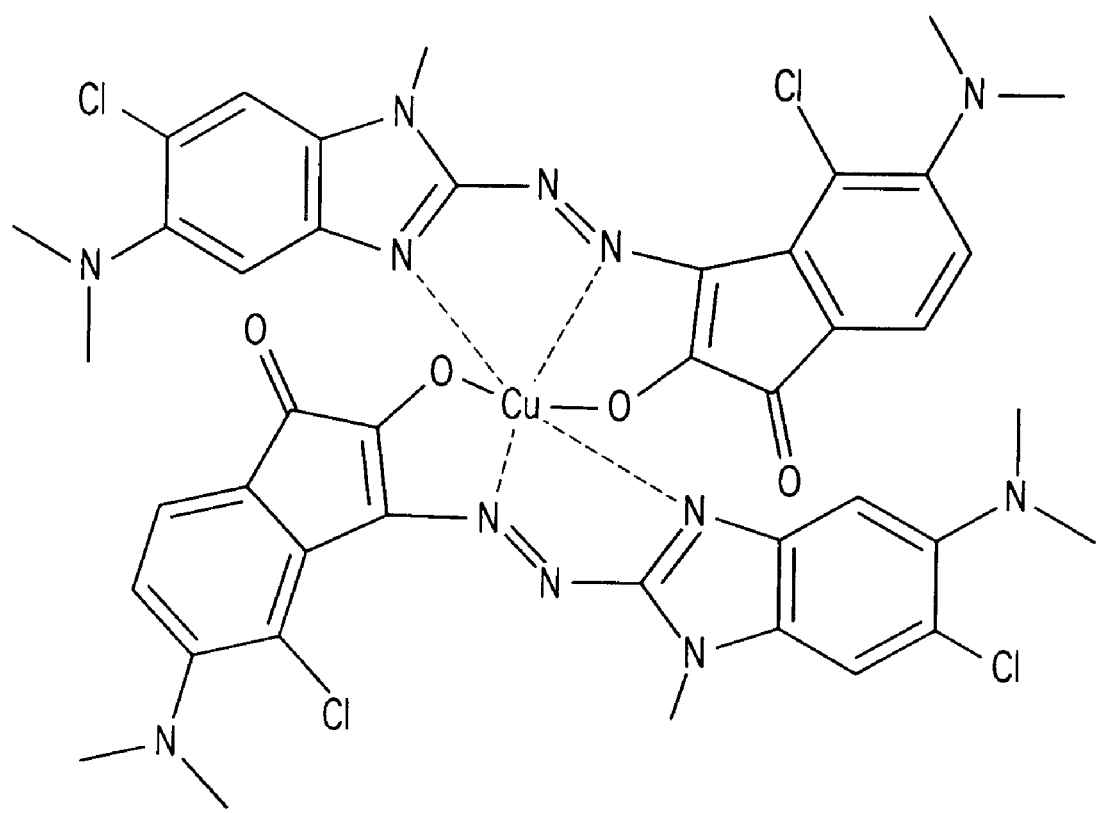
FIG. 4 is an exemplary view showing another organic dye recording material.

Optical disc 100 is prepared using a dye corresponding to the chemical formula of FIG. 4. Information recording is made on this disc using random data. Error rate SbER of the L0 layer is measured. The obtained result shows a good value of 5.4 e-6 which is sufficiently lower that the target value 5.0 e-5 (even though this value may be a higher hurdle than a practical level). When the repetitive patterns of 11T mark and 11T space are recorded and reproduced, almost no waveform distortion is seen. The difference ([I11Lmax−I11Lmin]/I11Lmin) between the maximum and minimum values of I11L, which is a space level obtained when the 11T space is reproduced, is 2%. Here, the 11T mark length is sufficiently long as 1.12 μm, and 1.2*Na/λ is 0.74 μm. Using IR, MS, and NMR, analyses are made for the dye before recording and after recording, but no difference is found between the before and after recordings.

COMPARISON EXAMPLE

Figure 3:
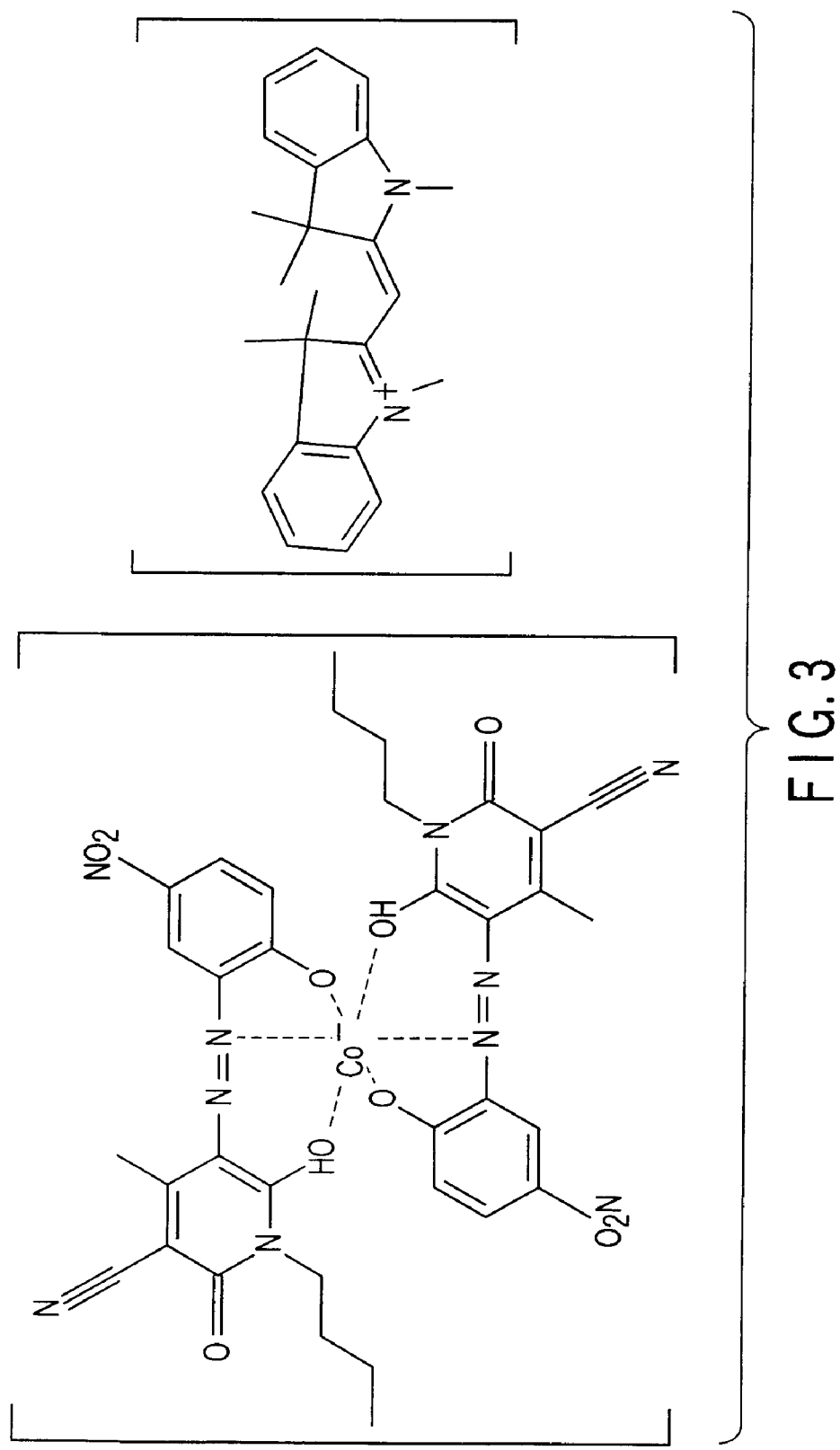
FIG. 3 is an exemplary view showing an organic dye recording material.

An optical disc is prepared using a dye corresponding to the chemical formula of FIG. 3, and information recording is made thereon. The resultant error rate SbER of the L0 layer is 6.3 e-4 which is larger than the target value 5.0 e-5. This value may cause a difficulty in information reading by a disc drive. When the repetitive patterns of 11T mark and 11T space are recorded and reproduced, a large waveform distortion is seen, and the difference ([I11Lmax−I11Lmin]/I11Lmin) between the maximum and minimum values of space level I11L is 14%.

Figure 23:
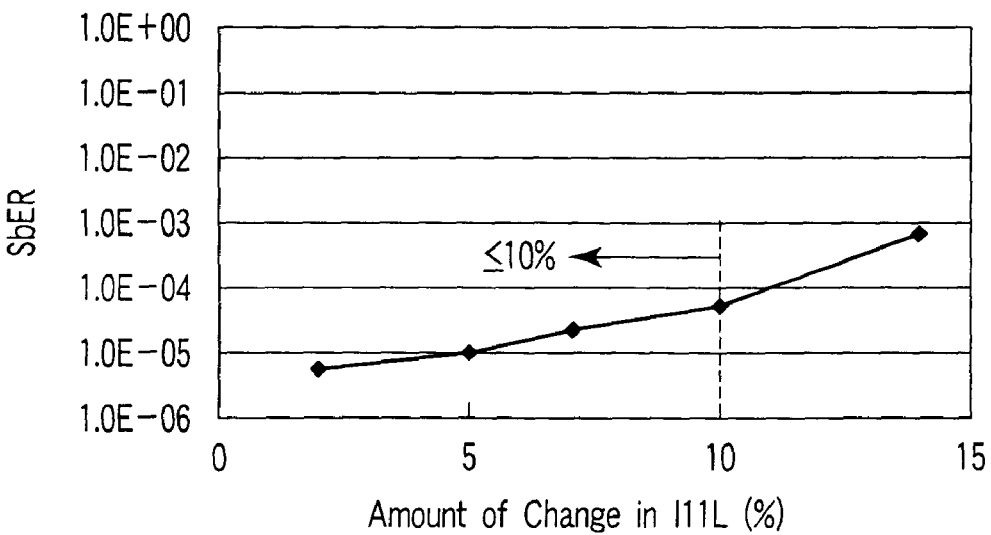
FIG. 23 is an exemplary view showing a relation between the error rate SbER and the amount of change in the level of a reproduction signal derived from the space between marks recorded on an optical disc according to one embodiment of the invention.

From the above result and the "Relation between SbER and Change Amount of I11L" shown in FIG. 23, it is found that a barometer or an index for reducing the invention to practice may be based on a selection of dye material which ensures 10% or less of the difference ([I11Lmax−I11Lmin]/I11Lmin) between the maximum and minimum values of I11L.

Example 2

Figure 10:
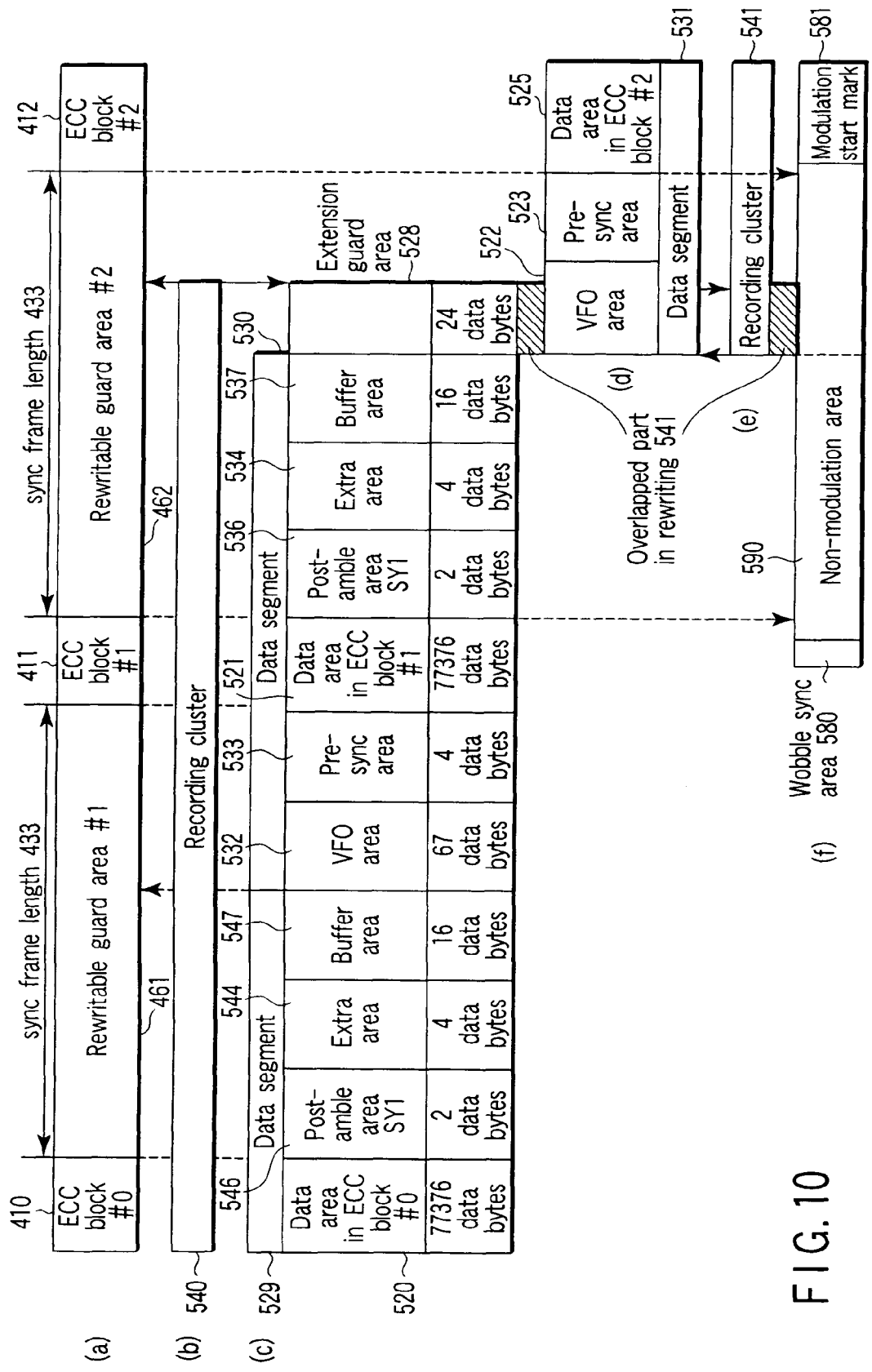
FIG. 10 is an exemplary view showing a data recording method for rewritable data recorded on a rewritable information storage medium.

FIG. 10 shows a method of recording rewritable data onto a rewritable information storage medium. As shown in FIG. 10, in this embodiment, part of the guard areas 442, 443 are added in front of and behind one ECC block data 412, thereby constructing data segment 490. Extended guard fields 258, 259 are added to one or more (an n number of) data segments, thereby constructing recording clusters 540, 542, which are recording (re-recording) units or rewriting units. When recording management data RMD is recorded, recording management data RMD is added sequentially as recording clusters 540, 542 including only one data segment (one ECC block) in recording management zone RMZ. Although not shown, the length of a place in which one data segment 531 is recorded coincides with the length of one physical segment block composed of seven physical segments 550 to 556.

Figure 11:
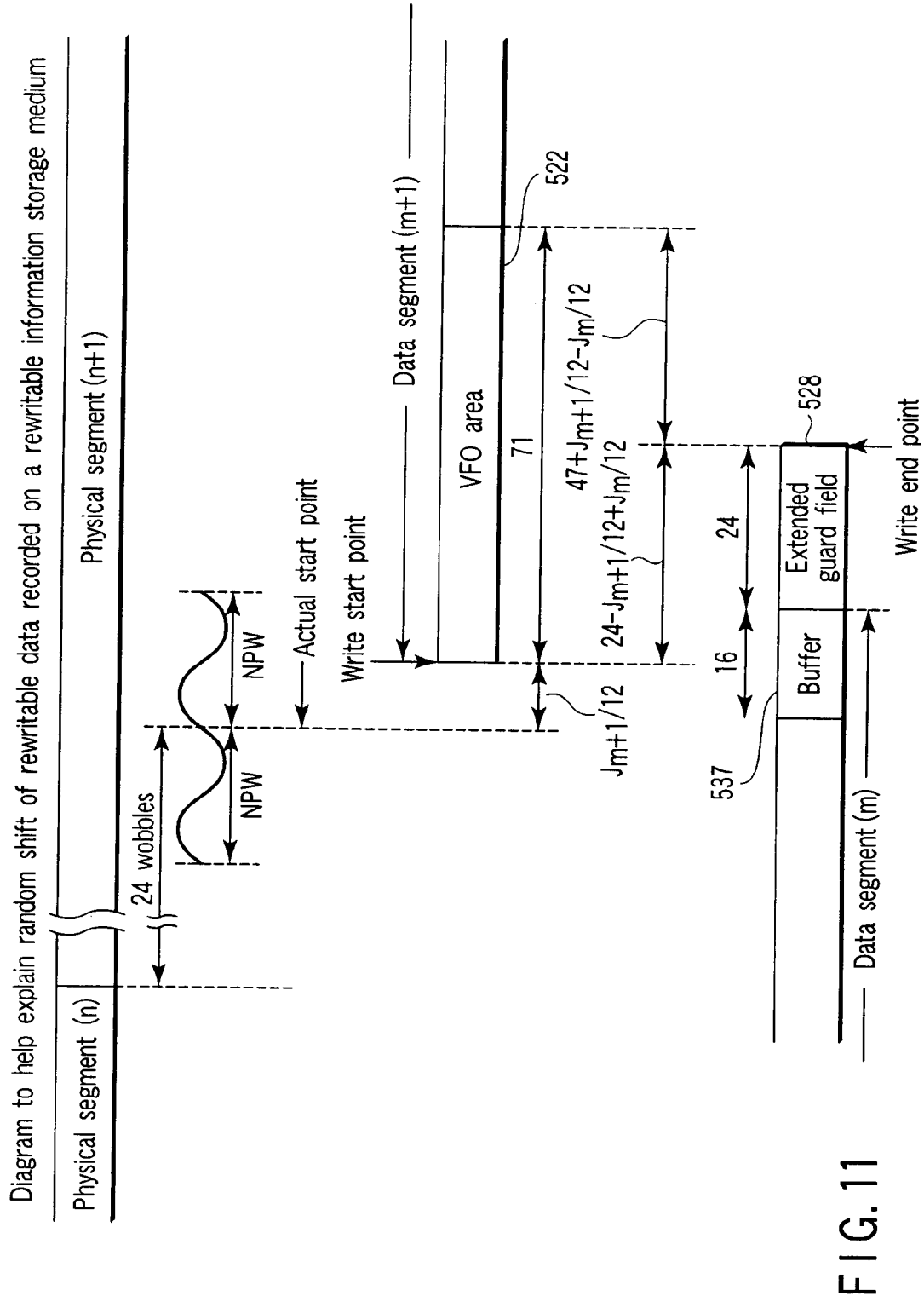
FIG. 11 is an exemplary view for explaining a data random shift of rewritable data recorded on a rewritable information storage medium.

FIG. 11 is a diagram to explain a data random shift of rewritable data recorded on a rewritable information storage medium. As shown in FIG. 11, the part where next VFO area 522 and extended guard field 528 overlap with each other lies 24 wobbles or more from the start position of a physical segment. Although not shown, 16 wobbles from the head of physical segment 550 constitute wobble sync area 580 and the following 68 wobbles constitute unmodulated area 590. Therefore, the part where next VFO area 522 and extended guard field 528 overlap with each other from 24 wobbles or more from the head of physical segment 550 is in unmodulated area 590. As described above, locating the start position of the data segment 24 wobbles or more from the start position of the physical segment, not only causes the overlapping place to lie in unmodulated area 590 but also secures the detection time for wobble sync area 580 and the preparation time for a recording process suitably. From this, a stable, high-accuracy recording process can be assured.

In the embodiment, the recording film of the rewritable information storage medium uses a phase-change recording film. In a phase-change recording film, since the recording film begins to deteriorate near the rewrite starting and end positions, repeating the recording start and end in the same position limits the number of rewrites due to the deterioration of the recording film. In the embodiment, to alleviate this problem, a shift of (Jm+1/12) data bytes is made in rewriting as shown in FIG. 11, thereby shifting the recording start position at random.

In the diagrams (c) and (d) of FIG. 10, to explain the basic concept, the start position of extended guard field 528 coincides with the start position of VFO area 522. Strictly speaking, however, the start position of VFO area 522 is shifted at random as shown in FIG. 11 in the embodiment.

A DVD-RAM disc, an existing rewritable information storage medium, also uses a phase-change recording film and shifts the recording start and end positions at random to increase the number of rewrites. The maximum amount of shift in making a random shift on an existing DVD-RAM disc is set to eight data bytes. The channel bit length (of modulated data recorded on the disc) in an existing DVD-RAM disc is set to 0.143 μm on average. In the rewritable information storage medium of the embodiment, the average length of a channel bit is:

$$(0.087+0.093) \div 2 = 0.090 \, \mu m \qquad (6)$$

When the length of the physical shift range is adapted to the existing DVD-RAM disc, the required minimum length as the random shift range in the embodiment is calculated using the above value as follows:

$$8 \text{ bytes} \times (0.143 \, \mu m + 0.090 \, \mu m) = 12.7 \text{ byte} \qquad (7)$$

In the embodiment, to facilitate the reproduction signal detecting process, the unit of the amount of random shift is adapted to a "channel bit" after modulation. In the embodiment, since ETM modulation (Eight to Twelve modulation) that converts 8 bits into 12 bits is used, the amount of random shift is expressed using a mathematical formula with a date byte as a reference:

$$Jm/12 \text{ data bytes} \qquad (8)$$

It follows from equation (7) that:

$$12.7 \times 12 = 152.4 \qquad (9)$$

Therefore, the values Jm can take are from 0 to 152. For the above reasons, in the range satisfying equation (9), the length of the random shift range agrees with the existing DVD-RAM disc, which assures the same number of rewrites as that of the existing DVD-RAM disc. In the embodiment, to secure the number of rewrites larger than that of the existing DVD-RAM disc, a small margin is allowed for the value of equation (7) as follows:

$$\text{The length of the random shift range is set to 14 data bytes} \qquad (10)$$

Substituting the value of equation (10) into equation (8) gives 14×12=168. Therefore, it follows that:

$$\text{Values Jm can take from 0 to 167} \qquad (11)$$

As described above, the amount of random shift is set to a larger range than Jm/12 ($0 \leq Jm \leq 154$), thereby satisfying equation (9) and causing the length of the physical range for the amount of random shift to agree with the existing DVD-RAM, which produces the effect of assuring the same number of repeated recordings as that of the existing DVD-RAM.

In FIG. 10, the length of buffer area 547 and that of VFO area 532 are constant in recording cluster 540. Amount Jm of random shift of each of data segments 529, 530 has the same value throughout the same recording cluster 540. When recording cluster 540 including many data segments is recorded consecutively, the recording positions are monitored using wobbles. Specifically, the position of wobble sync area 580 is detected and the number of wobbles in unmodulated areas 590, 591 are counted, thereby checking the recording positions on the information storage medium and recording data at the same time. At this time, there may be rare occasions when a wobble slip (recording done in a position shifted by one wobble period) will occur due to the miscounting of wobbles or uneven rotation of the rotating motor (e.g., a spindle motor; not shown) that rotates the information storage medium and therefore the recording position will shift on the information storage medium. The information storage medium of the embodiment is characterized in that, if a shift in the recoding position has been detected, adjustment is made in rewritable guard area 461 of FIG. 10 or in recordable guard area 452 (not shown here), thereby correcting the recording timing. In FIG. 10, important information that permits neither the omission of bits nor the redundancy of bits is recorded in postamble area 546, extra area 544, and pre-sync area 533. However, in buffer area 547 and VFO area 532, a specific pattern is repeated. Then, the omission and/or redundancy of only one pattern may be permitted, as long as the repeated boundary positions are secured. Therefore, in guard area 461, particularly in buffer area 547 or VFO area 532, adjustment is made to correct the recording timing according to the embodiment.

In this embodiment, as shown in FIG. 11, the actual start point position serving as a reference of position setting is set so as to coincide with the position of the wobble amplitude "0" (the center of wobble). However, since the wobble position detecting accuracy is low, the embodiment, as written as "±1 max" in FIG. 11, permits the actual start point position to have up to $$\text{a shift of} \pm 1 \text{ data byte} \qquad (12)$$

In FIGS. 10 and 11, the amount of random shift in data segment 530 is set to Jm (as described above, the amount of random shift is the same in all of data segments 529 in recording cluster 540). Thereafter, the amount of random shift in data segment 531 in which additional recording is done is set to Jm+1. A value Jm in equation (11) and Jm+1 can take is, for example, the intermediate value: Jm=Jm+1=84. When the position accuracy of the actual start point is sufficiently high, the starting position of extended guard field 528 coincides with the starting position of VFO area 522 as shown in FIG. 10.

In contrast, when data segment 530 is recorded in the rearmost position and data segment 531 to be rewritten or additionally recorded later is recorded in the very front position, the start position of VFO area 522 may go into buffer area 537 by up to 15 data bytes because of equations (10) and (12). In extra area 534 just in front of buffer area 537, specific important information is recorded. Therefore, in the embodiment, the following is to be met:

$$\text{the length of buffer area 537 has to be 15 data bytes or more} \qquad (13)$$

In the embodiment of FIG. 10, a margin of 1 data byte is added, and the data size of buffer area 537 is set to 16 data bytes.

If a gap occurs between extended guard area 528 and VFO area 522 as a result of a random shift, when a single-sided dual-recording-layer structure is used, interlayer crosstalk is caused by the gap during reproduction. To overcome this problem, extended guard field 528 and VFO area 522 are caused to always partially overlap with each other even when a random shift is made, thereby preventing a gap from occurring. Therefore, in the embodiment, from equation (13), the length of extended guard field 528 is to be set to 15 data bytes or more. Since subsequent VFO 522 is made as long as 71 data bytes, even if the overlapping area of extended guard field 528 and VFO area 522 becomes a little wider, this has no adverse effect in reproducing a signal (because the time demanded to synchronize the reproduction reference clock in unoverlapped VFO area 522 is secured sufficiently). For this reason, extended guard field 528 can be set to a larger value than 15 data bytes. As explained above, there may be occasions when a wobble slip will occur in continuous recording and the recording position will shift by one wobble period. As seen from equation (5), a wobble period corresponds to 7.75 (about 8) data bytes. Thus, taking this into account, equation (13) is modified as follows in the embodiment:

$$\text{The length of extended guard field 528 is set to } (15+8)=23 \text{ data bytes or more} \qquad (14)$$

In the embodiment of FIG. 10, a margin of one data byte is given as in buffer area 537 and the length of extended guard field 528 is set to 24 data bytes.

In the diagram (e) of FIG. 10, the recording start position of recording cluster 541 has to be set accurately. The information recording and reproducing apparatus of the embodiment detects the recording start position by using the wobble signal previously recorded on a rewritable or a recordable information storage medium. All of the areas excluding the wobble sync area 580 are changed in pattern from NPW to IPW in units of 4 wobbles. In contrast, in wobble sync area 580, since the wobble switching unit partially shifts from 4 wobbles, wobble sync area 580 is easiest to detect. Therefore, the information recording and reproducing apparatus of the embodiment detects the position of wobble sync area 580 and then prepares for a recording process and starts recording. Thus, the starting position of the recording cluster has to lie in unmodulated area 590 just behind the wobble sync area 580. FIG. 11 shows its contents. Wobble sync area 580 is provided immediately after the switching of physical segments. The length of wobble sync area 580 is equivalent to 16 wobble periods. After wobble sync area 580 is detected, 8 wobble periods are provided, allowing a margin for preparation for a recording process. Thus, as shown in FIG. 11, the start position of VFO area 522 existing at the start position of recording cluster 541 has to be placed 24 wobbles or more behind a physical segment switching position, even taking random shift into account.

As shown in FIG. 10, a recording process is carried out many times in overlapping place 541 in rewriting. When rewriting is repeated, the physical shape of a wobble groove or a wobble land changes or deformed (or deteriorates), resulting in a decrease in the quality of the wobble reproduction signal. In the embodiment, as shown in the diagram (f) of FIG. 10, overlapping place 541 is prevented from lying in wobble sync area 580 or wobble address area 586 in rewriting or additional recording and then is recorded in unmodulated area 590. Since a specific wobble pattern (NPW) is just repeated in unmodulated area 590, even if the quality of the wobble reproduction signal has partially deteriorated, the signal can be supplemented or interpolated with the preceding and following wobble reproduction signals. As described above, setting is done so that the position of overlapping place 541 may lie in unmodulated area 590 in rewriting or additional recording, making it possible to prevent the quality of the wobble reproduction signal from deteriorating due to the deterioration of the shape in wobble sync area 580 or wobble address area 586, which produces the effect of assuring a stable wobble detection signal from wobble address information 610.

Figure 12:
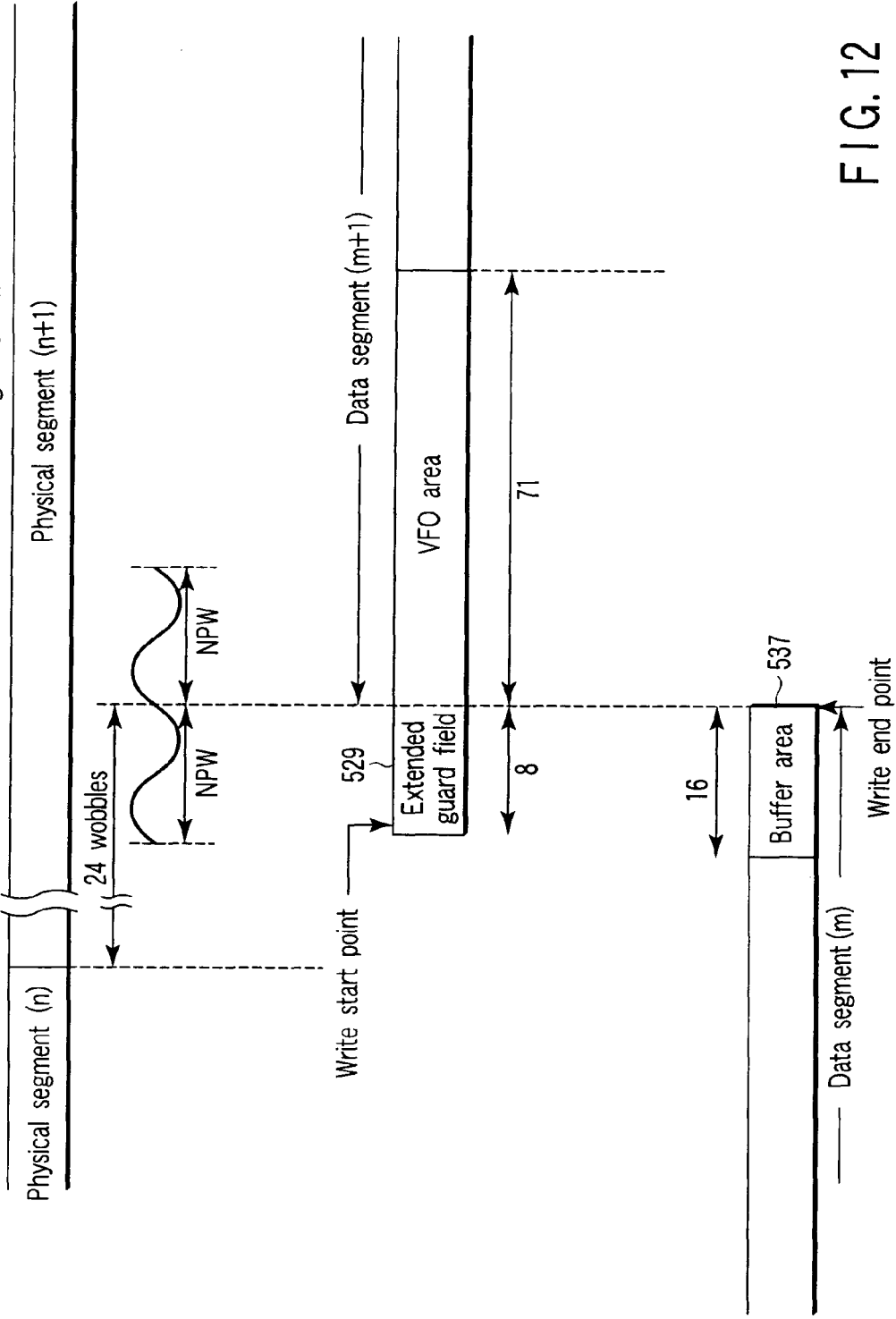
FIG. 12 is an exemplary view for explaining a recording method of additional recording onto a recordable information storage medium.

FIG. 12 is a diagram to explain a method for recording additional data onto a recordable information storage medium. Since recording is done only once on a recordable information storage medium, the above-described random shift is not needed. In a recordable information storage medium, too, as shown in FIG. 11, setting is done so that the start position of a data segment may lie 24 wobbles or more from the start position of a physical segment. Then, an overlapping place lies in the unmodulated area of a wobble.

Figure 13:
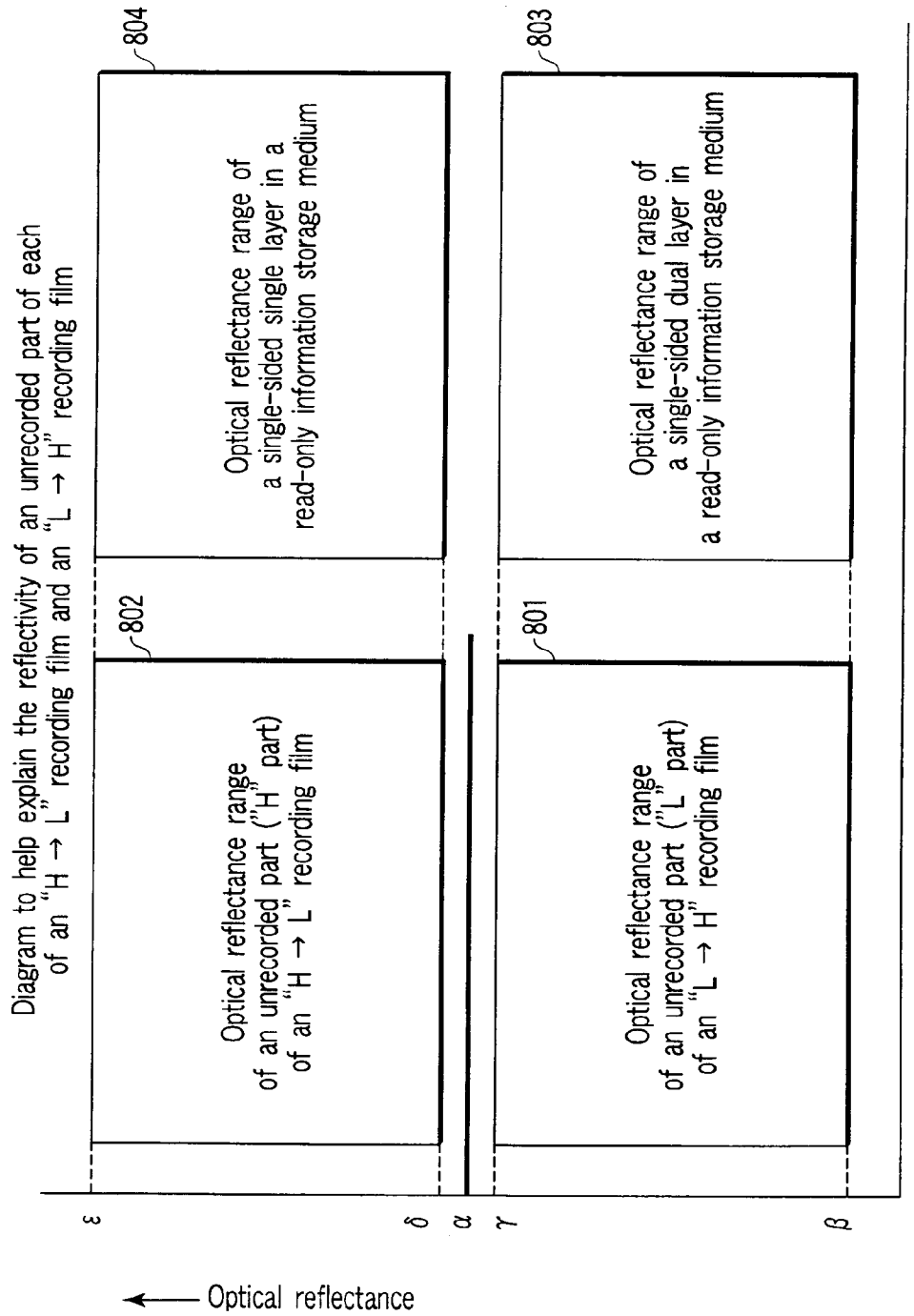
FIG. 13 is an exemplary view showing an optical reflectance range of each of a High-to-Low ("H-L") recording film and a Low-to-High ("L-H") recording film.

Use of both of a "H-L" (High-to-Low) recording film and a "L-H" (Low-to-High) recording film is permitted in the embodiment. FIG. 13 shows the reflectivity ranges of a "H-L" recording film and a "L-H" recording film determined in the embodiment. This embodiment is characterized in that the lower limit of reflectivity at an unrecorded part of the "H-L" recording film is set higher than the upper limit of reflectivity at an unrecorded part of the "L-H" recording film. When the information storage medium is installed in the information recording and reproducing apparatus or information reproducing apparatus, slice level detecting section 132 or PR equalizing circuit 130 (not shown) can measure the reflectivity of an unrecorded part and determine whether the film is a "H-L" recording film or a "L-H" recording film, which makes it very easy to determine the type of recording film. As a result of forming and measuring "H-L" recording films and "L-H" recording films by changing many manufacturing conditions, it is found that, when the reflectivity a between the lower limit of reflectivity at an unrecorded part of the "H-L" recording film and the upper limit of reflectivity at an unrecorded part of the "L-H" recording film is set to 36%, the productivity of the recording film is high and the cost of the recording medium is easy to reduce. When reflectivity range 801 of an unrecorded part ("L" part) of the "L-H" recording film is caused to coincide with reflectivity range 803 of the single-sided dual-layer of a read-only information storage medium and reflectivity range 802 of an unrecorded part ("H" part) of the "H-L" recording film is caused to coincide with reflectivity range 804 of the single-sided single layer of a read-only information storage medium, the interchangeability or compatibility with the read-only information storage medium and a recordable information storage medium is good and the reproducing circuit of a reproduction-only apparatus and that of an information recording and reproducing apparatus can be shared, which enables the information reproducing apparatus to be produced at low cost. As a result of forming and measuring "H-L" recording films and "L-H" recording films by changing many manufacturing conditions, to increase the productivity of the recording film and make it easier to reduce the cost of the recording medium, the lower limit P of the reflectivity of an unrecorded part ("L" part) of the "L-H" recording film is set to 18%, its upper limit γ is set to 32%, the lower limit δ of the reflectivity of an unrecorded part ("H" part) of the "H-L" recording film is set to 40%, and its upper limit ε is set to 70% in this embodiment.

FIG. 13 shows the reflectivity ranges of a "H-L" recording film and a "L-H" recording film. When the reflectivity range at an unrecorded portion is determined as shown in FIG. 13, a signal appears in the same direction in emboss areas (including system lead-in SYLDI, etc.) and in recording mark areas (data lead-in/-out DTLDI, DTLDO and/or data area DTA) in the "L-H" recording film, with the groove level as a reference. Similarly, a signal appears in the opposite direction in emboss areas (including system lead-in SYLDI, etc.) and in recording mark areas (data lead-in/-out DTLDI, DTLDO and/or data area DTA) in the "H-L" recording film, with the groove level as a reference. Use of this phenomenon not only helps identify whether the recording film is a "L-H" recording film or a "H-L" recording film but also makes it easier to design a detecting circuit compatible with both of a "L-H" recording film and a "H-L" recording film.

Figure 14:
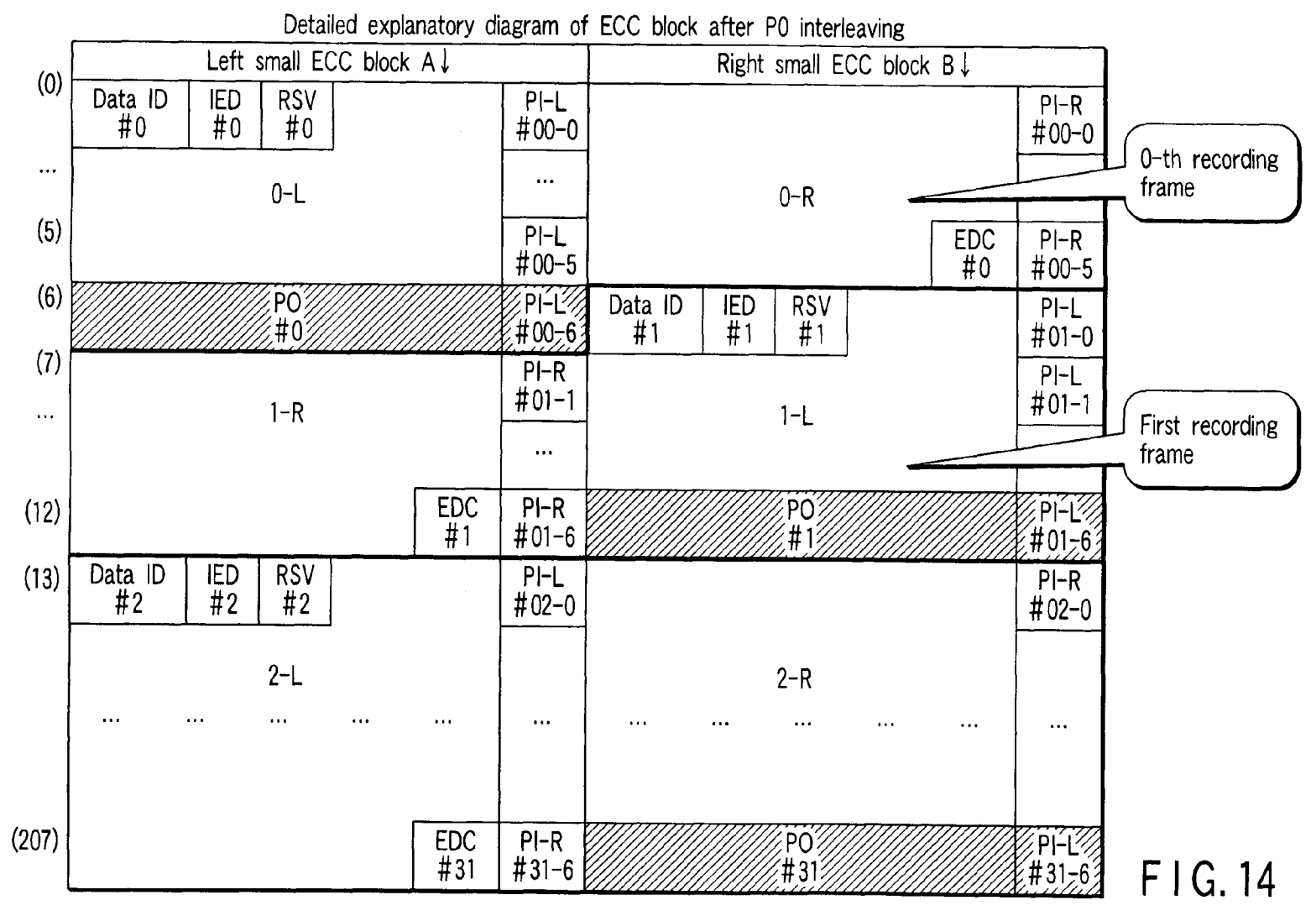

FIG. 14 shows a detailed structure of an ECC block after PO interleaving. As shown in FIG. 14, in this embodiment, to create one ECC block using 64 KB of data, the data size of recording management data RMD is made equal to one ECC block size, thereby simplifying the additional recording process.

The embodiment is characterized in that the same data frame is distributed over a plurality of small ECC blocks. Specifically, in the embodiment, two small ECC blocks constitute a large ECC block. The same data frame is distributed over the two small ECC blocks alternately. PI of a 10-byte size written in the middle is added to 172 bytes provided on its right side and PI of a 10-byte size written at the right end is added to 172 bytes provided on its left side and in the middle.

That is, 172 bytes from the left end and PT of consecutive 10 bytes constitute a left small ECC block and 172 bytes in the middle and PI of 10 bytes at the right end constitute a right small ECC block.

According to this, the symbols in each frame are set. For example, "2-R" indicates which of data frame number and right and left small blocks it belongs to (e.g., it belongs to the right small ECC block in the second data frame). In addition, the data in the same physical sector is also distributed over the right and left small ECC blocks alternately in each physical sector finally configured. Here, the left-half column is included in the left small ECC block (the left small ECC block A shown in FIG. 14) and the right-half column is included in the right small ECC block (the right small ECC block B shown in FIG. 14).

As described above, distributing the same data frame over a plurality of small ECC blocks improves the error correcting capability of the data in the physical sector, which increases the reliability of the recorded data. For example, suppose the optical head has come off the track and overwritten the recorded data, with the result that one physical sector of data has been destroyed. In this embodiment, since destructed data of one sector is subjected to error correction using two small ECC blocks, the burden of correcting errors in one ECC block is alleviated, which assures higher-performance error correction. Moreover, in the embodiment, since data ID is provided at the start position of each sector even after an ECC block is formed, the data position in access is checked at high speed.

FIG. 15 shows a data structure of recording management data RMD. In this embodiment, since the border-in area BRDI for the first bordered area BRDA#1 is partly shared with the data lead-in area DTLDI, recording management data RMD#1 to RMD#3 corresponding to the first bordered area are recorded in the recording management zone RMZ in the data lead-in area DTLDI. When no data is recorded in the data area DTA, the recording management zone RMZ is reserved area 273, which is an unrecorded state. Each time data is recorded additionally into the data area DTA, updated recording management data RMD is recorded in the beginning place of reserved area 273. Recording management data RMD corresponding to the first bordered area in recording management zone RMZ is added one after another. The size of recording management data RMD recorded additionally each time in the recording management zone RMZ is set to 64 Kbytes.

The diagram (c) of FIG. 15 shows a data structure of recording management data RMD#1. In the diagram (c) of FIG. 15, the data structure of recording management data RMD#1 in the data lead-in area DTLDI is shown. Recording management data RMD#A, RMD#B recorded in the RMD duplication zone RDZ, (extended) recording management data RMD (the diagram (d) of FIG. 16) recorded in border-in area BRDI explained later, (extended) recording management data RMD recorded in the R zone, and/or RMD copy CRMD (the diagram (d) of FIG. 16) recorded in the border-out area BRDO may also have the same structure. As shown in the diagram (c) of FIG. 15, an item of recording management data RMD is configured to include a reserved area and "0" to "21" RMD fields. In the embodiment, one ECC block composed of 64 KB of user data contains 32 physical sectors. In one physical sector, 2 KB (to be exact, 2048 bytes) of user data are recorded. According to the user data size recorded in one physical sector, the individual RMD fields are divided in units of 2048 bytes and are assigned with relative physical sector numbers. RMD fields are recorded on a recordable information storage medium in the order of the relative physical sector numbers. The outline of data content recorded in each RMD field is as follows:

RMD field 0 . . . Information on the disc state and data area allocation (information on the location of various data in the data area);

RMD field 1 . . . Information on the test zone used and recommended recording waveforms;

RMD field 2 . . . Area available to the user;

RMD field 3 . . . Information on the starting position of the border area and the position of extended RMZ; and RMD fields 4 to 21 . . . Information on the position of R zone.

Incidentally, in a recordable (or re-recordable) information storage medium, an RMD duplication zone RDZ, a recording management zone RMZ, an R physical information zone R-FIZ are provided separately. In the recording management zone RMZ, recording management data RMD, which is management information on the recording position of data updated by an additional recording process of data, is recorded. In this embodiment, a recording management zone RMZ is set in each bordered area BRDA, which enables the area of the recording management zone RMZ to be extended. Even if the frequency of additional recording is increased and therefore the recording management data RMD area is to be increases, the recording management data RMD can be recorded by extending the recording management zone RMZ. As a result, the effect of increasing the number of times of additional recording remarkably is obtained. In this case, in the embodiment, the recording management zone RMZ is provided in the border-in area BRDI corresponding to each bordered area BRDA (or provided just in front of each bordered area BRDA). In the embodiment, the border-in area BRDI corresponding to the first bordered area BRDA#1 and the data lead-in area DTLDI share an area, eliminating the formation of the first border-in area BRDI in the data area DTA, which enables the data area DTA to be used effectively. That is, the recording management zone RMD in the data lead-in area DTLDI is used as the recording place of the recording management data RMD corresponding to the first bordered area BRDA#1.

An RMD duplication zone RDZ is a place in which recording management data RMD satisfying the following condition is recorded. As in the embodiment, having the recording management data RMD redundantly increases the reliability of the recording management data RMD. Specifically, even when the recording management data RMD in the recording management zone RMD cannot be read because of the influence of dust on and/or flaws or scratches in the surface of a recordable information storage medium, the recording management data RMD recorded in the RMD duplication zone RDZ may be reproduced and further the remaining demanded information may be acquired by tracing, which enables the latest recording management data RMD to be reproduced or recovered.

In the RMD duplication zone RDZ, the recording management data RMD at the time of closing a border (or a plurality of borders) is recorded. Since one border is closed and a new recording management zone RMZ is defined each time a subsequent new bordered area is set, it may be said that, each time a new recording management zone RMZ is created, the last recording management data RMD related to the preceding bordered area is recorded in the RMD duplication zone RDZ. If the same information is recorded in the RMD duplication zone RDZ each time the recording management data RMD is additionally recorded on the recordable information storage medium, the RMD duplication zone RMD is filled up with a relatively small number of times of additional recording, with the result that the upper limit of the number of times of additional recording is small. In contrast, as in the embodiment, if a new recording management zone RMZ is created when a border is closed or when the recording management zone RMZ in the border-in area BRDI has got full and a new recording management zone RMZ is created using an R zone, only the last recording management data RMD in the current recording management zone RMZ is recorded in the RMD duplication zone RDZ, which enables the RMD duplication zone RDZ to be used effectively and increases the number of times of additional recording.

For instance, when the recording management data RMD in the recording management zone RMZ corresponding to the bordered area BRDA in the middle of additional recording (before border closing is done) cannot be reproduced due to dust on or flaws/scratches in the surface of the recordable information storage medium, the recording management data RMD recorded at the end of the RMD duplication zone RDZ, which enables the position of the already closed bordered area to be known, is reproduced. Therefore, tracing the remaining part of the data area DTA of the information storage medium makes it possible to acquire the place of the bordered area BRDA in the middle of additional recording (before border closing is done) and the contents of the information recorded there, which enables the latest recording management data RMD to be reproduced or recovered.

Figure 16:
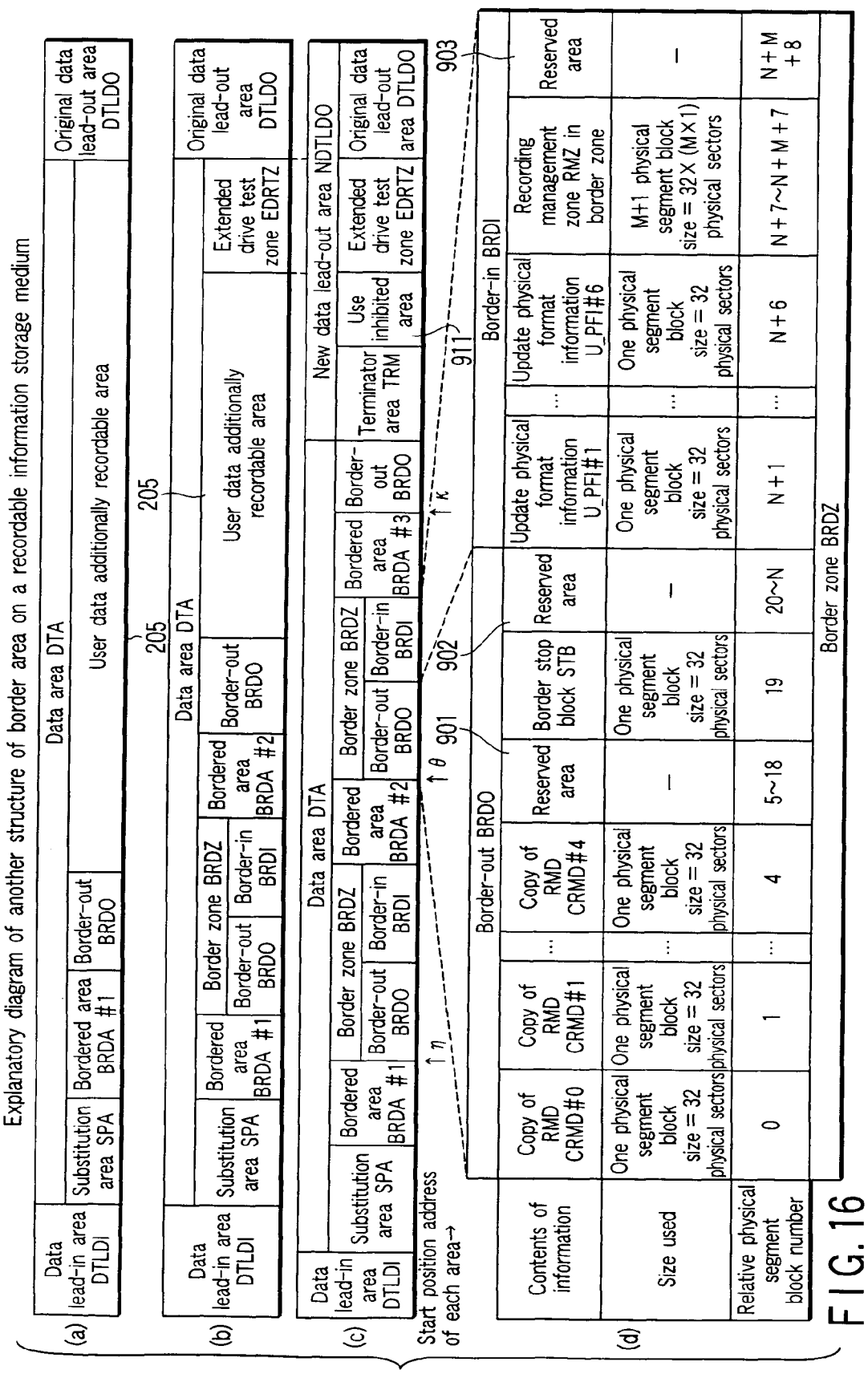
FIG. 16 is an exemplary view for explaining the structure of the border area in a recordable information storage medium.

FIG. 16 is an exemplary view for explaining the structure of the border area in a recordable or re-recordable information storage medium. This embodiment is characterized in that each of the size of the area of RDZ lead-in area RDZLI and the size of an item of the recording management data RMD is 64 KB, that is, an integral multiple of the user data size in a single ECC block. In the case of a recordable or re-recordable information storage medium, after a part of the data in one ECC block are changed, the changed data in the ECC block cannot be rewritten on the information storage medium. Therefore, particularly in the case of the recordable or re-recordable information storage medium, the data is recorded in units of a recording cluster (b) composed of an integral multiple of a data segment including one ECC block. Thus, if the size of the area of RDZ lead-in area RDZLI and the size of one item of the recording management data RMD differ from the user data size in the ECC block, a padding area or a stuffing area to match with the recording cluster unit is demanded, which practically lowers the recording efficiency. In the embodiment, the size of the area of RDZ lead-in area RDZLI and the size of one item of the recording management data RMD are set to an integral multiple of 64 KB, thereby preventing the recording efficiency from decreasing.

The corresponding RMZ last recording management data RMD recording area 271 will be explained. There is a method of recording intermediate information during the interruption of recording in the lead-in area. In this case, each time recording is interrupted or each time additional recording is done, intermediate information (in the embodiment, recording management data RMD) has to be additionally recording one after another. Therefore, if recording is interrupted frequently or if additional recording is done frequently, a problem arises: the area is soon filled and therefore, an additional recording cannot be done. To solve this problem, the present invention is characterized in that an RMD duplication zone RDZ is set as an area in which the updated recording management data RMD can be recorded only when special conditions are fulfilled and the recording management data RMD sampled out or decimated under the special conditions are recorded. In this way, the frequency of addition of recording management data RMD to the RMD duplication zone RDZ is lowered, which prevents the RMD duplication zone RDZ from being filled-up and increases the number of times of additional recording into the recordable information storage medium remarkably.

In parallel with this, recording management data RMD updated every additional recording is recorded additionally into the recording management zone RMZ in the border-in area BRDI of FIG. 16 (or into the data lead-in area DTLI in the first bordered area BRDA#1) or into the recording management zone using an R zone. Then, when a new recording management zone RMZ is created, such as when the next area BRDA in the border is created (or a new border-in BRDI is set) or a new recording management zone RMZ is created in the R zone, the last recording management data RMD (or the latest one immediately before a new recording management zone RMZ is formed) is recorded in (the corresponding RMZ last recording management data RMD recording area 271 in) the RMD duplication zone RDZ. As a result, the number of times of additional recording into a recordable information storage medium increases remarkably. Use of this area makes it easier to search for the position of the latest RMD.

FIG. 17 shows a comparison between the embodiment and a current DVD-R. FIG. 17 compares the embodiment with the current DVD-R. In this embodiment, to shorten the border closing time, the recording width of the minimum recording capacity (in border closing) is made narrower (from 1.65 mm to 1.0 mm) than that of a current DVD-R. As a result, useless recording information is reduced and finalize time can be made shorter. Since the recoding capacity of this embodiment is much larger (4.7 GB to 15 GB) than that of the current DVD-R, the maximum number of R zones is almost doubled (2302 to 4606). While the recording unit of the existing DVD-R is one ECC block, the recording unit of the embodiment is one physical segment. In a physical segment block, redundant areas, including a VFO area, a pre-sync area, a postamble area, an extra area, and a buffer area, are added in front of and behind an ECC block, thereby forming a data segment 531. These data segments are combined to form a physical segment, a unit in data recoding.

Since redundant areas (guard areas) are added in front of and behind one ECC block, data cannot be recorded continuously from the end of the ECC block at the time of additional recording. The reason is that, even if an attempt is made to record data from the end of the ECC block, the recoding position may shift slightly due to rotation irregularity of the disc or the like. If the recording position shifts forward, the last part of the recorded data disappears due to overwriting. Since the lost data can be reproduced by error correction, there is almost no problem. If the recording position shifts backward, an unrecorded part appears on the disc, resulting in preventing the reproduction by a player, which is a serious problem. Therefore, at present, when additional recording is to be done, the recording position is shifted slightly forward and data is written over the last part of the recorded data, thereby destroying the last data. In this embodiment, since a guard area is provided in front of and behind an ECC block, overwriting is done in the guard area and therefore the user data can be additionally recorded stably without destroying the data. Accordingly, the data structure of the embodiment can increase the reliability of the recorded data.

When border closing is done, the unrecorded part of first and second R zones (open R zone) (the zones are called first, second, and third zones, starting from the inner periphery) is filled with "00h and border-out area is recorded outside the recorded data in the third zone (incomplete R zone). Border-in area is recorded outside the border-out area. In the border-in area, extended recording management zone EX.RMZ is recorded. As shown in FIG. 17, recording management data RMD can be updated 392 or more times (16384 times) using the extended recording management zone EX.RMZ in the border-in area. However, before extended recording management zone EX.RMZ in the border-in area is used, the border has to be closed, which takes time.

Figure 18:
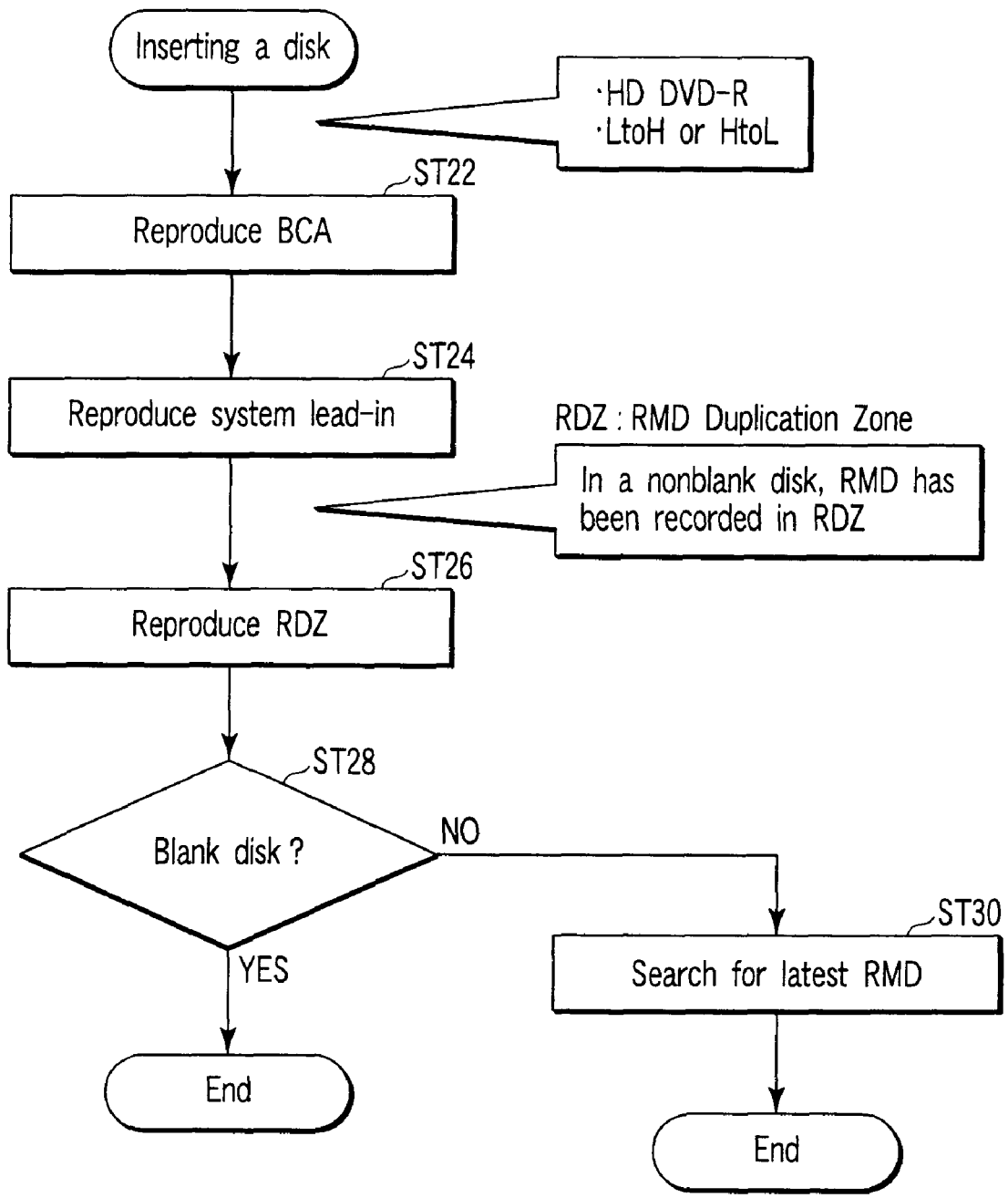
FIG. 18 is an exemplary flowchart for explaining the processing procedure immediately after an information storage medium is installed in an information reproducing apparatus or an information recording and reproducing apparatus.

FIG. 18 is a flowchart for explaining the processing procedure immediately after an information storage medium is installed in an information reproducing apparatus or information recording and reproducing apparatus. When the disc is installed in or loaded into the apparatus, burst cutting area BCA is reproduced (ST22). This embodiment supports an HD DVD-R disc. It further supports both of the recording film polarities, "L-H" (Low to High) and "H-L" (High to Low). In ST24, the system lead-in area is reproduced. In ST26, RMD duplication RDZ is reproduced. In the case of a nonblank disc, recording management data RMD has been recorded in RMD duplication zone RDZ. According to the presence or absence of the recording of recording management data RMD, it is determined in ST28 whether the disc is a blank one. If the disc is a blank one (yes at ST28), the present process is ended. If the disc is not a blank disc (no at ST28), the latest recording management data RMD is searched for (ST30). Then, the number of the additionally recordable R zone now in use, the start physical segment number of the R zone, and the last recorded address LRA are found. Up to three additionally recordable R zones can be set. When a nonblank disc is discharged or unloaded, border closing or finalizing is done.

Figure 19:
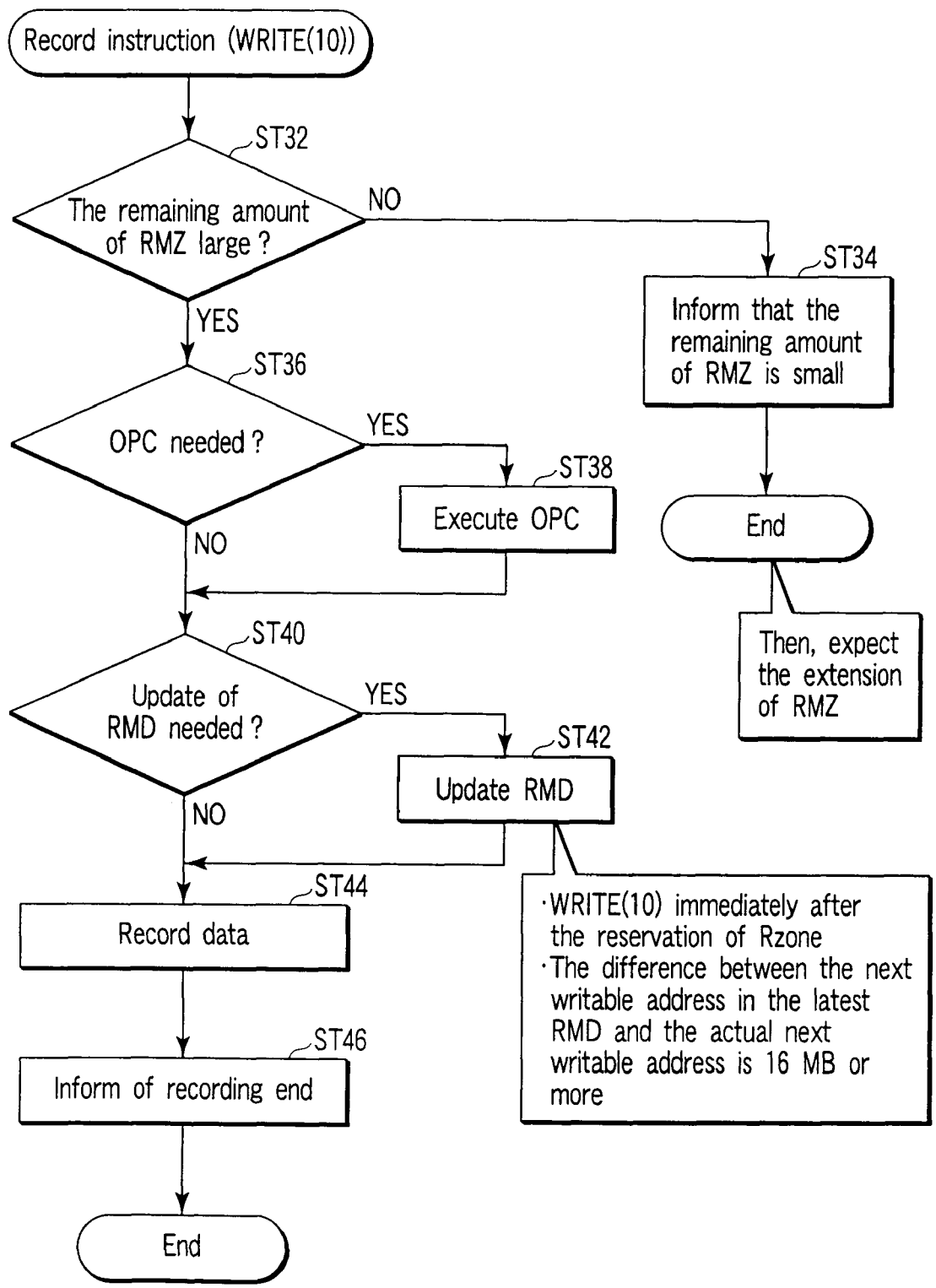
FIG. 19 is an exemplary flowchart for explaining a method of recording additional information onto a recordable information storage medium in an information recording and reproducing apparatus.

FIG. 19 is a flowchart for explaining a method of recording additional information onto a recordable information storage medium in the information recording and reproducing apparatus. When a host gives a record instruction (write (10)), it is determined in ST32 whether the remaining amount of recording management zone RMZ in which recording management data RMD is to be recorded is sufficient. If the remaining amount is not sufficient (no at ST32), the host is informed in ST34 that "the remaining amount of RMZ is small". In this case, an extension of recording management zone RMZ is expected.

If the remaining amount is sufficient (yes at ST32), it is determined in ST36 whether OPC (the process of recording how much test recording has been done) is demanded. If OPC is demanded (yes at ST36), OPC is executed in ST38. In ST40, it is determined whether the update of recording management data RMD is demanded. The update is demanded when (yes at ST40) a record instruction is given immediately after the reservation of an R zone or when the difference between the last writable address NWA in the latest RMD and the actual last writable address NWA is 16 MB or more. In ST42, recording management data RMD is updated. In ST44, the data is recorded. In ST46, the host is informed of the recording end and the process is completed.

Figure 20:
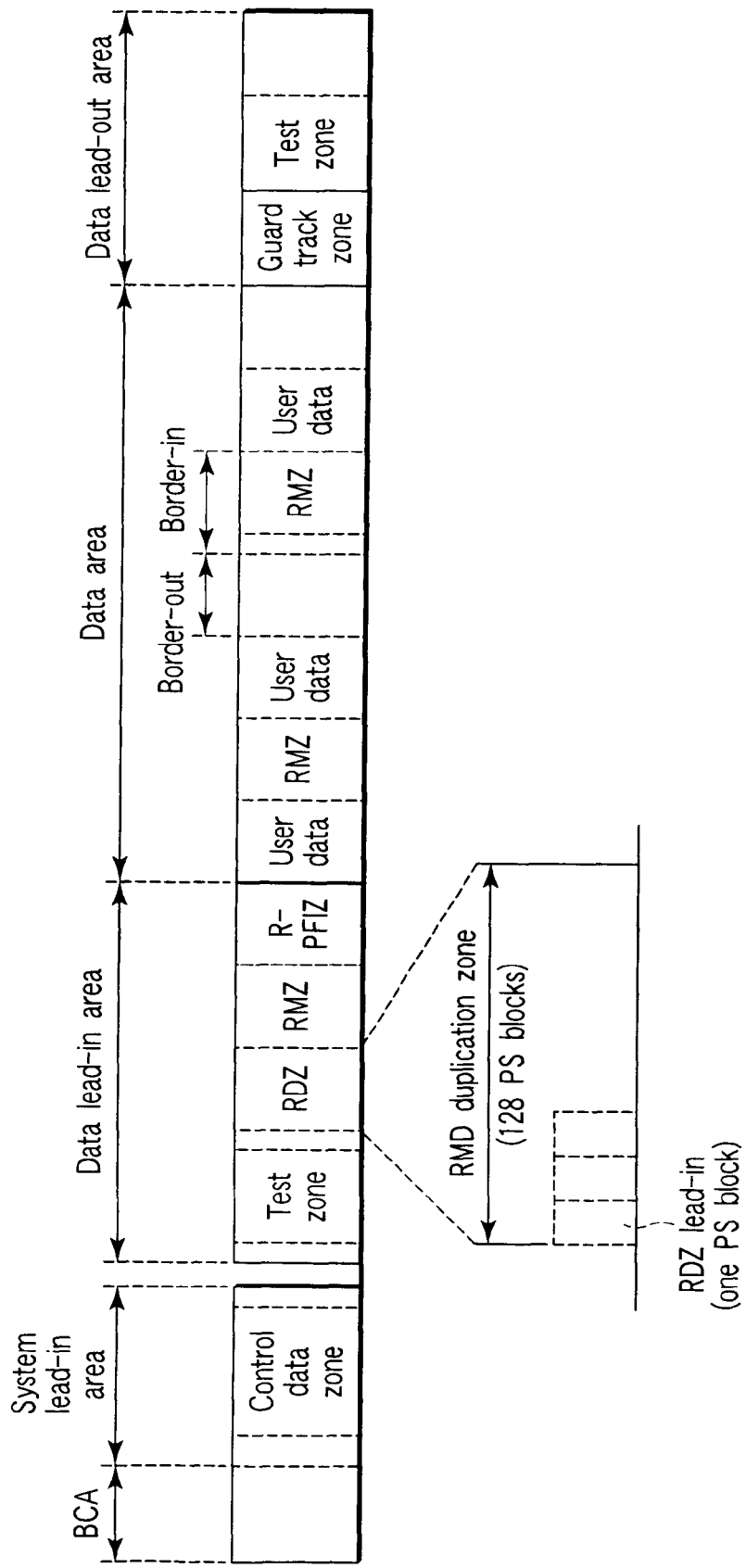
FIG. 20 is an exemplary diagram for explaining the concept of a method of setting an extendable recording location management zone RMZ.

FIG. 20 is a diagram for explaining the concept of a setting method of extendable recording management zone RMZ. At the beginning, recording management zone RMZ for storing recording management data RMD has been set in the data lead-in area. When recording management zone RMZ is used up, the data cannot be recorded onto the disc even if the data area includes an empty portion. Therefore, if the remaining amount of recording management zone RMZ becomes small, extended recording management zone EX.RMZ is set. Extended recording management zone EX.RMZ may be set in a bordered area BRDA in which user data is recorded or in a border zone (made up of adjacent border-out area and border-in area). That is, the extended recording management zone EX.RMZ in the bordered area and the extended recording management zone EX.RMZ in the border-in area can be mixed on the disc. When extended recording management zone EX.RMZ is set, the latest recording management data RMD is copied into RMD duplication zone RDZ in the form of a physical segment block. RMD duplication zone RDZ is used to manage the position of extended recording management zone EX.RMZ. Since the RMD duplication zone RDZ is composed of 128 physical segments, recording management zone RMZ can be extended 127 times on the disc. The maximum number of border zones on the disc is 128. Using 127 extended recording management zones EX.RMZ, recording management data RMD can be extended 16348 times.

Figure 21:
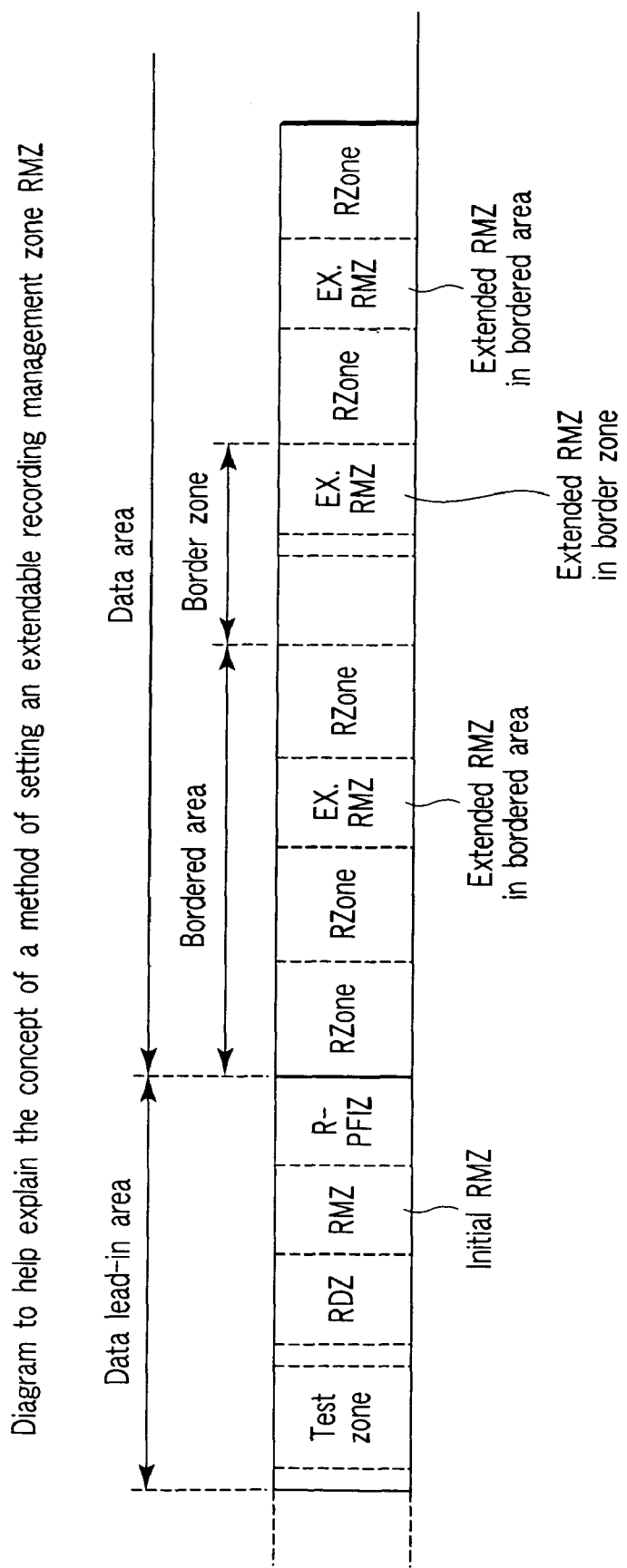
FIG. 21 is an exemplary view showing details of FIG. 20.

FIG. 21 is a detailed diagram of FIG. 20. Specifically, extended recording management zone EX.RMZ in the bordered area is set between adjacent R zones. When it is extended to the border zone, it is normally added to the end of the border-in area.

An information recording medium based on the above-mentioned format is prepared, and information recording of random data is performed. The result is that the jitter of L0 is 6.2% which is a very good performance. When the repetitive patterns of 7T marks and 7T space are recorded and reproduced, the waveform distortion is very low and the difference ([I11Lmax−I11Lmin]/I11Lmin) between the maximum and minimum values of I11L (which is the space level of a reproduction signal) is 3%. When the difference is equal to or less than 10%, the error rate (SbER) becomes not more than 1.0 e-04 as will be seen from FIG. 23, resulting in ensuring a sufficient practicability. Further, when the recording layer uses an organic dye material with which the physical deformation (change in the volume or change in the surface condition between the mark and its peripheral) at the recorded mark portion is equal to or less than 10%, as exemplified by FIG. 22, the error rate (SbER) becomes equal to or less than 1.0 e-04, thereby confirming the actual practicability.

Figure 24:
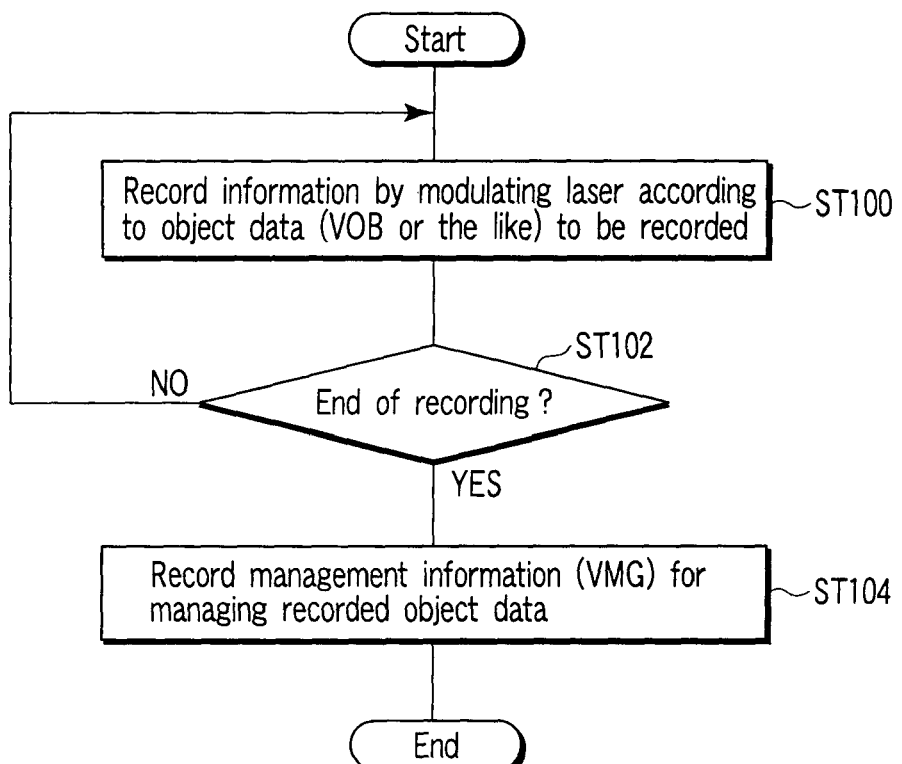
FIG. 24 is an exemplary flowchart for explaining a recording method using an optical disc according to one embodiment of the invention.

FIG. 24 is an exemplary flowchart explaining a recording method using optical disc 100 according to one embodiment of the invention. (This disc uses an organic dye material for the recording layer by which no modification or no change will occur in recorded marks.) An optical pickup of a disc drive (not shown) generates or provides a modulated laser with a wavelength of, e.g., 405 nm. This laser is irradiated to the target recording layer (L0 or L1) of disc 100, so that object data (such as VOB of DVD or VOB/SOB of HD_DVD) is recorded thereon (ST100). When the recording is ended (yes at ST102), management information (such as VMG of DVD or HD_DVD) regarding the recorded object data is written in disc 100, to thereby complete one recording.

Figure 25:
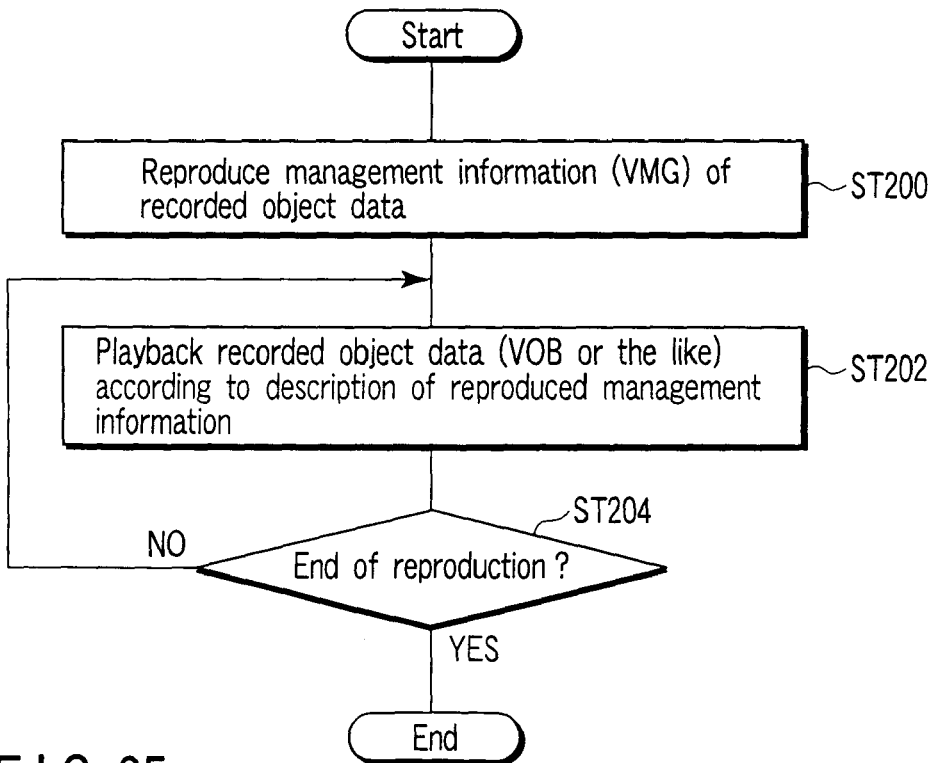
FIG. 25 is an exemplary flowchart for explaining a reproducing method using an optical disc according to one embodiment of the invention.

FIG. 25 is an exemplary flowchart explaining a reproducing method using optical disc 100 according to one embodiment of the invention. (This disc uses an organic dye material for the recording layer by which no modification or no change will occur in recorded marks.) From disc 100 on which object data and management information are recorded according to the method of FIG. 24, the management information is read using a laser with a wavelength of, e.g., 405 nm (ST200). The read management information is temporarily stored in a work memory of a reproduction apparatus (or a player; not shown). In the reproduction apparatus, reproduction sequence information or the like is referred to and the recorded object data (video object VOB or stream object SOB) is reproduced or played back (ST202). When a user stops the reproduction, or when the reproduction reaches the position indicated as a reproduction end by reproduction sequence information in the management information (yes at ST204), the reproduction process ends.

Figure 26:
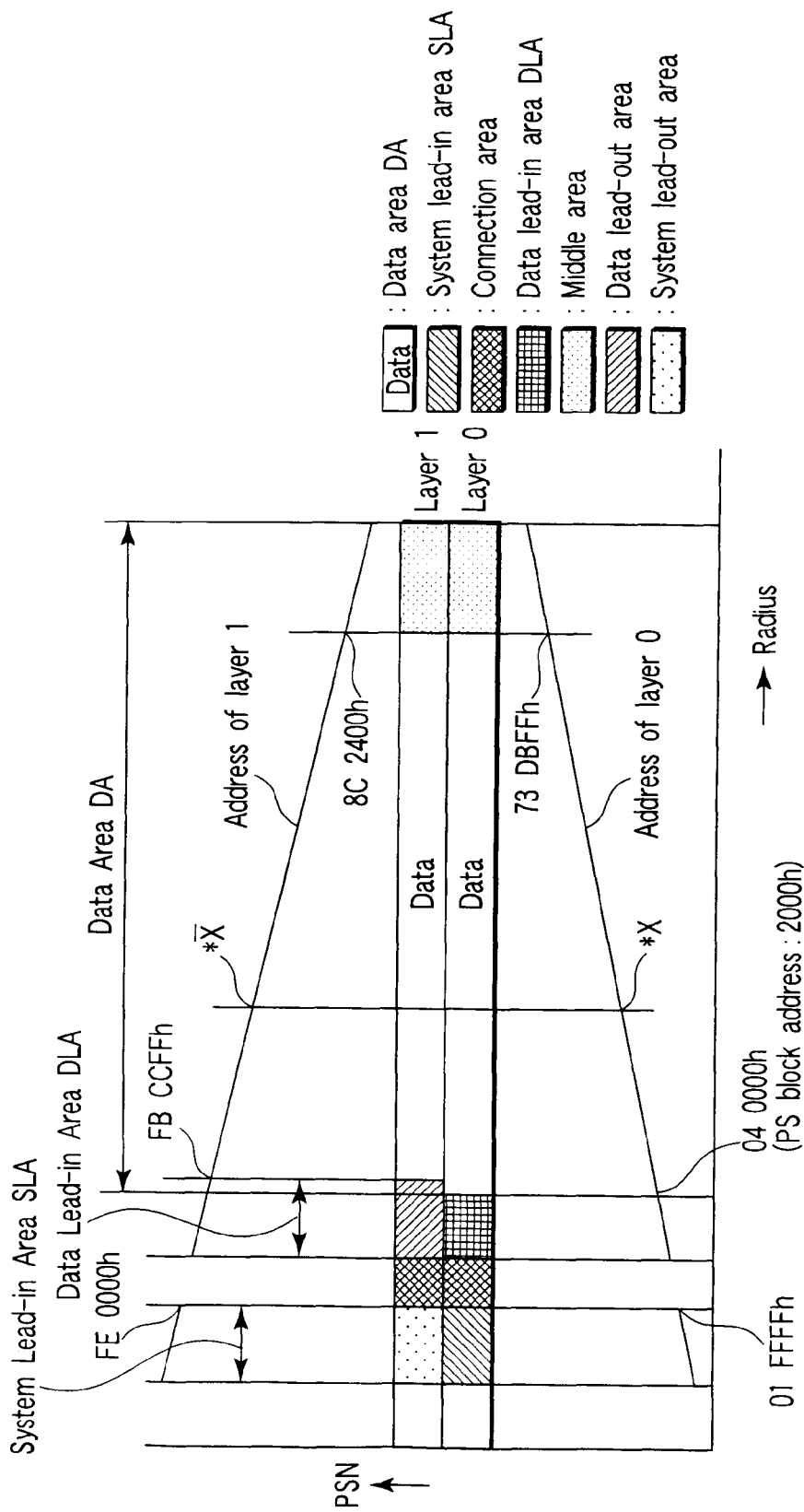
FIG. 26 is an exemplary view showing a physical sector layout of the optical disc shown in FIG. 1.

FIG. 26 is an exemplary view showing a physical sector layout of optical disc 100 shown in FIG. 1. As exemplified in FIG. 26, the information area provided throughout the dual layers includes seven areas: the System Lead-in area, Connection area, Data Lead-in area, Data area, Data Lead-out area, System Lead-out area, and Middle area. The Middle area on each layer allows the read-out beam to move from Layer 0 (L0) to Layer 1 (L1). Data area DA is intended for recording of the main data (such as management information VMG, object data VOB, etc. in the example of FIG. 1(e)). System Lead-in area SLA contains the Control data and Reference code. The Data Lead-out area allows for a continuous smooth read-out.

<<Lead-out Area>>

The System Lead-in area and System Lead-out area contain tracks which consist of a series of embossed pits. The Data Lead-in area, Data area and Middle area on Layer 0 (L0), and the Middle area, Data area and Data Lead-out area on Layer 1 (L1) include a series of groove tracks. The groove tracks are continuous from the start of the Data Lead-in area to the end of the Middle area on Layer 0 and from the start of the Middle area to the end of the Data Lead-out area on Layer 1. When two single-sided dual-layer discs are pasted on each other, a double-sided quadruplex-layer disc having two read-out surfaces is manufactured.

Figure 27:
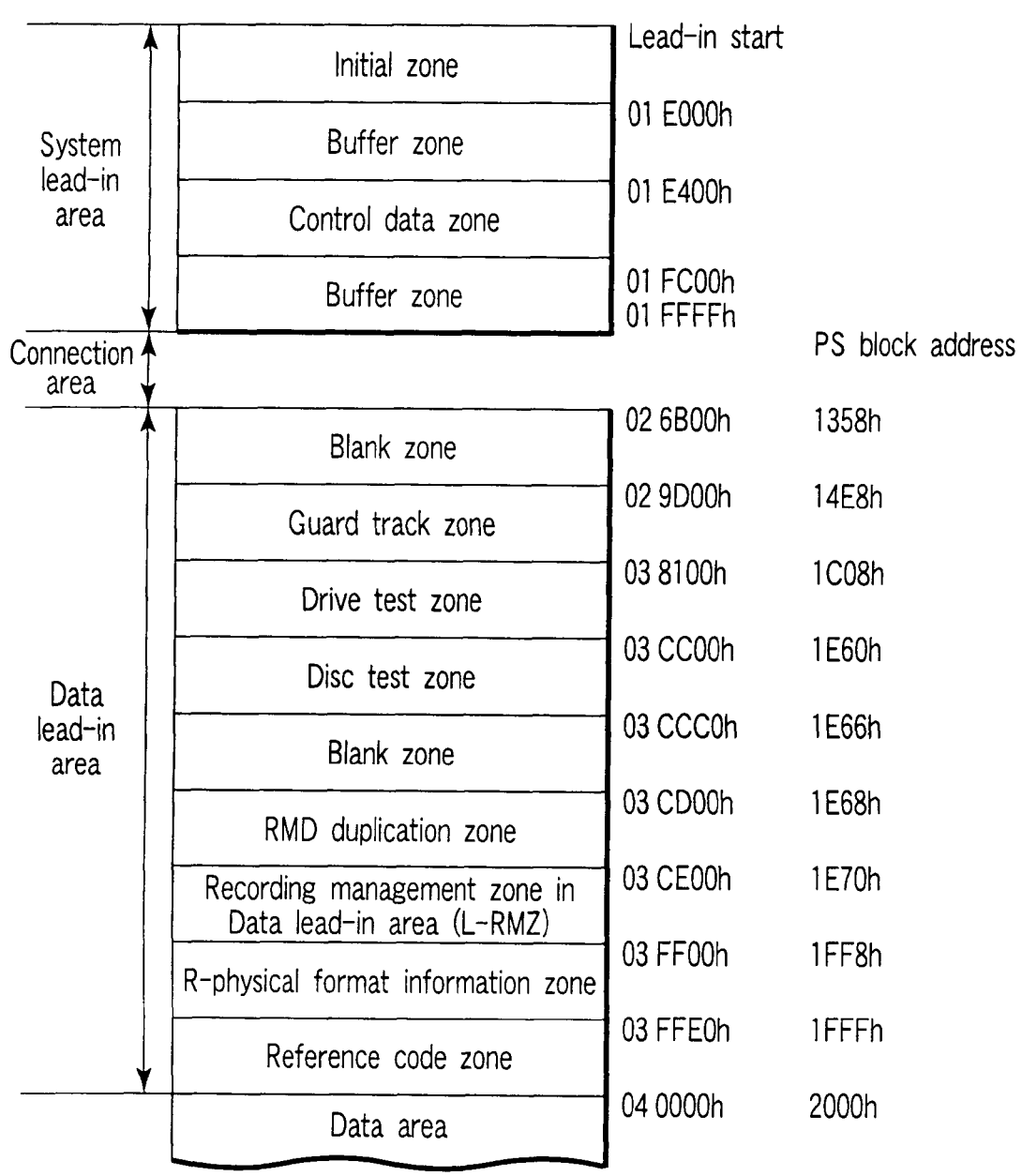
FIG. 27 is an exemplary view showing a configuration of the lead-in area of the optical disc shown in FIG. 1.

FIG. 27 is an exemplary view showing a configuration of the lead-in area of the optical disc shown in FIG. 1. As exemplified in FIG. 27, system lead-in area SLA of Layer 0 is composed of an initial zone, a buffer zone, a control data zone, and a buffer zone in sequence from the inner peripheral side. The data lead-in area of Layer 0 is composed of a blank zone, a guard track zone, a drive test zone, a disc test zone, a blank zone, an RMD duplication zone, an L-RMD (recording management zone in the Data Lead-in area), an R-physical format information zone, and a reference code zone in sequence from the inner peripheral side. A starting address (inner peripheral side) of the data area of Layer 0 (L0) and an ending address (inner peripheral side) of the data area of Layer 1 (L1) are shifted by a distance of a clearance, and the ending address (inner peripheral side) of the data area of Layer 1 is at a side outer than the starting address (inner peripheral side) of the data area of Layer 0.

<<Structure of Lead-In Area>>

FIG. 27 exemplifies a configuration of the lead-in area of Layer 0 (L0). The system lead-in area is composed of an initial zone, a buffer zone, a control data zone, and a buffer zone in sequence from the inner peripheral side. The data lead-in area is composed of a blank zone, a guard track zone, a drive test zone, a disc test zone, a blank zone, an RMD duplication zone, a recording management zone in the data lead-in area (L-RMD), an R-physical format information zone, and the reference code zone in sequence from the inner peripheral side.

<<Details of System Lead-In Area>>

The initial zone contains embossed data segments. The main data of the data frame recorded as the data segment of the initial zone is set to "00h". The buffer zone is formed of 1024 Physical sectors from 32 Data segments. The Main data of the Data frames eventually recorded as Data segments in this zone is set to "00h". The Control data zone contains embossed Data segments. The Data segments contain embossed Control data. The Control data is comprised of 192 Data segments starting from PSN 123904 (01E400h).

Figure 28:
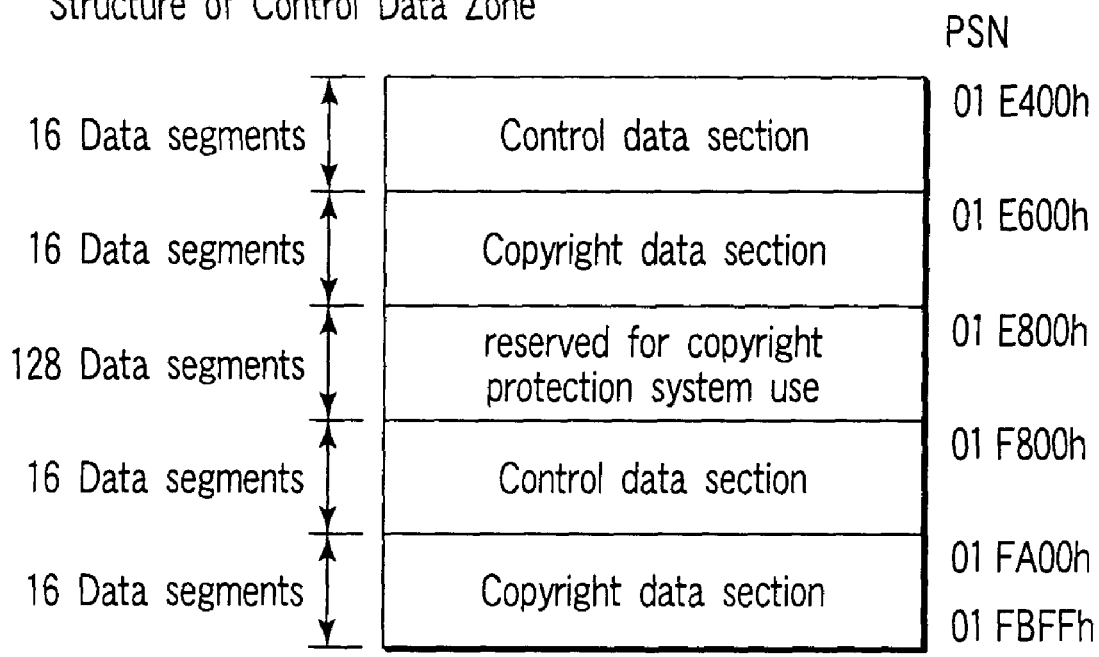
FIG. 28 is an exemplary view showing a configuration of the control data zone shown in FIG. 27.
Figure 29:
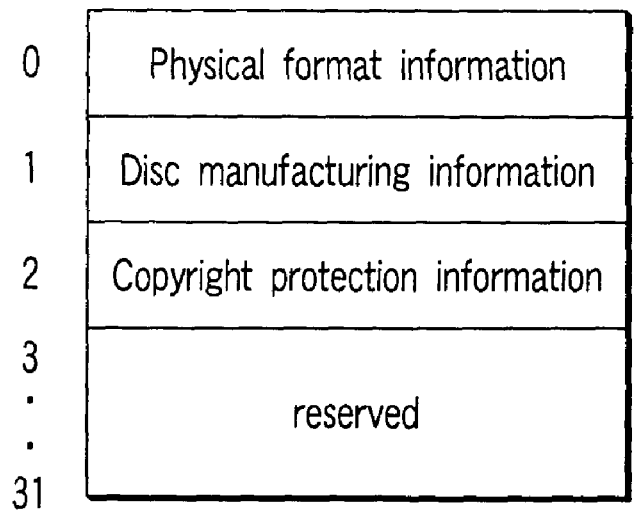
FIG. 29 is an exemplary view showing a structure of one of the data segments shown in FIG. 28.

FIG. 28 exemplifies a configuration of the control data zone, and FIG. 29 exemplifies a structure of the data segment of the control data section. The contents of the first Data segment in a Control data section is repeated 16 times. The first Physical sector in each Data segment contains the physical format information. The second Physical sector in each Data segment contains the disc manufacturing information. The third Physical sector in each Data segment contains the copyright protection information. The contents of the other Physical sectors in each Data segment are reserved for system use.

FIG. 30 exemplifies the physical format information in the control data section, and FIG. 31 exemplifies the data area allocation of the physical format information. The contents of description of respective bite positions (BP) for the physical format information are as follows. The values specified for the Read power, Recording speeds, Reflectivity of Data area, Push-pull signal, and On-track signal given in BP 132-154 are only for example. Their actual values may be determined by a disc manufacture provided that the values are chosen within the values satisfying the emboss condition and the recorded user data characteristics. The details of the data area allocation given in BP 4-15 are shown in FIG. 31, for example.

BP149 and BP152 specify reflectance ratios of the data areas of Layer 0 and Layer 1. For example, 0000 1010b denotes 5%. An actual reflectance ratio can be specified by the following formula:

Actual reflectance ratio=value×(½).

BP150 and BP153 specify push-pull signals of Layer 0 and Layer 1. In respective BP's, bit b7 (not shown) specifies a track shape of the disc of each layer, and bits b6 to b0 (not shown) specify amplitudes of the push-pull signals as:

Track shape: 0b (track on a groove)
1b (track on a land)
Push-pull signal: 010 1000b denotes 0.40, for example.

An actual amplitude of a push-pull signal is specified by the following formula:

Actual amplitude of push-pull signal=value×(1/100).

BP151 and BP154 specify amplitudes of on-track signals of Layer 0 and Layer 1:

On-track signal: 0100 0110b denotes 0.70, for example.

An actual amplitude of an on-track signal is specified by the following formula:

Actual amplitude of on-track signal=value×(1/100).

Incidentally, recording-related parameters for L0 as exemplified by FIG. 32 may be described at BP512 to BP543 of the physical format information. Information of the initial peak power and/or bias power, etc. for the L0 layer recording can be obtained from the description of FIG. 32. Further, recording-related parameters for L1 as exemplified by FIG. 33 may be described at BP544 to BP2047 of the physical format information. Information of the initial peak power and/or bias power, etc. for the L1 layer recording can be obtained from the description of FIG. 33.

<Summary>

(1) The optical disc according to the embodiment has a recording layer (L0, L1, etc.) on which a plurality of marks are recorded with spaces sandwiched between the marks, using a modulated laser power. The recording layer uses an organic dye material (cf. FIGS. 2 to 4) with which no physical modification or change (changes in the volume or in the sectional area) occurs substantially in the recording layer at the recorded mark area (for instance, the modification or change is equal to or less than 10%).

Figure 22:
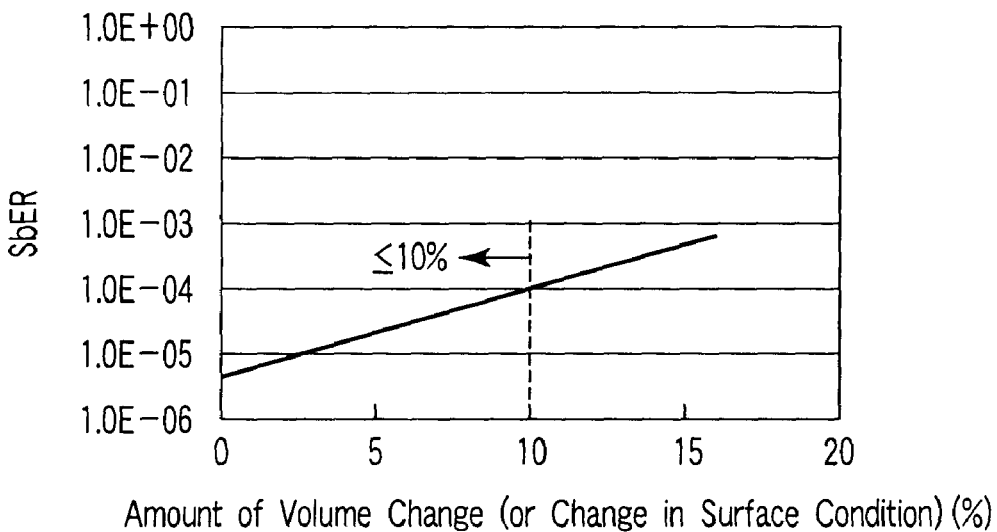
FIG. 22 is an exemplary view showing a relation between the error rate SbER and the amount of change in the volume of a mark (or a change in the surface condition between the mark and its periphery) recorded on an optical disc according to one embodiment of the invention.

(2) The condition that no physical modification or change occurs substantially in the recording layer corresponds to a fact that a change in the volume of the recording layer at the mark area is equal to or less than 10% (cf. FIG. 22, etc.).

(3) Or, the condition that no physical modification or change occurs substantially in the recording layer may correspond to a fact that a change in the surface condition or in the sectional area of the recording layer at the mark area is equal to or less than 10% (cf. FIG. 22, etc.).

(4) An organic dye material (e.g., the dye of FIG. 4) in which no chemical change occurs when the mark is recorded may be used for the recording layer.

(5) At least a part of the organic dye material to be used for the recording layer may include an azo metal complex (cf. FIGS. 2 to 4) comprising copper (Cu) or cobalt (Co) as its center metal.

(6) The organic dye material (such as azo metal complex) may include a substituent (as a bulky substituent) comprising three or more carbons being substituted for the aromatic ring in the dye molecule.

(7) Assume that the recording laser wavelength is represented by $\lambda$, the numerical aperture of an objective lens for condensing the laser to the recording layer is represented by NA, the length of recorded patterns of marks and space is larger than $1.2*\lambda/NA$, the maximum value of the reproduction signal level from the space is denoted by I11Lmax, and the minimum value thereof is denoted by I11Lmin. Under this assumption, the difference ([I11Lmax−I11Lmin]/I11Lmin) between the maximum and minimum values of the reproduction signal level from the space may be configured to be equal to or less than 10% (cf. FIG. 23).

(8) A recording method may be applied to an optical disc having one or more recording layers (L0, L1, etc.) on which marks are to be recorded with a space formed therebetween, wherein the one or more recording layers may include an organic dye material configured to substantially avoid a physical modification (deformation) or a physical change in an area of the recorded mark. The recording method may comprise:

recording (ST100) object data (video object VOB or stream object SOB) on the recording layer using a modulated laser power; and recording (ST104) management information (VMG) for managing the recorded object data on the recording layer using a modulated laser power.

(9) In the recording method, when a wavelength of the laser for recording is represented by $\lambda$, a numerical aperture of an objective lens for condensing the laser to the recording layer is represented by NA, and a length of recorded patterns of the marks and the space is larger than $1.2*\lambda/NA$, a difference ([I11Lmax−I11Lmin]/I11Lmin) between maximum and minimum values of a reproduction signal level from the space may be configured to be equal to or less than 10%.

(10) A reproducing method may be applied to an optical disc having one or more recording layers (L0, L1, etc.) on which marks are recorded with a space formed therebetween, wherein the one or more recording layers may include an organic dye material configured to substantially avoid a physical modification (deformation) or a physical change in an area of the recorded mark. The reproducing method may comprise:

reproducing (ST200) management information (VMG) from the recording layer using a laser with a given wavelength (e.g., 405 nm); and reproducing (ST202) object data (VOB or SOB) from the recording layer using the laser, based on the reproduced management information.

While certain embodiments of the inventions have been described, these embodiments have been presented by way of example only, and are not intended to limit the scope of the inventions. Indeed, the novel methods and systems described herein may be embodied in a variety of other forms. For instance, the invention can be reduced to practice not only in a single/dual-layer disc, but in a future available optical disc with three or more recording layers, Furthermore, various omissions, substitutions and changes in the form of the methods and systems described herein may be made without departing from the spirit of the inventions. The accompanying claims and their equivalents are intended to cover such forms or modification as would fall within the scope and spirit of the inventions.

What is claimed is:

1. An information recording method using a multi-layered optical disc comprising first and second recording layers configured to record or reproduce information by light with a predetermined wavelength, the information configured to be recorded on the first or second recording layer using a mark and a space, wherein a channel clock period is represented by T, the channel clock period T being provided for recording the mark on the first or second recording layer where the mark regarding 3T can be recorded, a plurality of pulses including a last pulse arranged at an end of the pulses are used for recording the mark regarding 3T, in which a first subsequent level lower than a peak power level of the last pulse is arranged next to the last pulse, and a second subsequent level lower than the peak power level but higher than the first subsequent level is arranged next to the first subsequent level, and the optical disc is configured to store first power-related information relating to the peak power level and the first subsequent level for the first recording layer, the first power-related information relating to the recording mark regarding the length of 3T, and second power-related information relating to the peak power level and the first subsequent level for the second recording layer, the second power-related information relating to the recording mark regarding the length of 3T, contents of the second power-related information being allowed to be different from those of the first power-related information, and the second power-related information being arranged separately from the first power-related information, the information recording method comprising:

recording the information on the first or second recording layer using the light.

2. An information reproducing method using a multi-layered optical disc comprising first and second recording layers configured to record or reproduce information by light with a predetermined wavelength, the information configured to be recorded on the first or second recording layer using a mark and a space, wherein a channel clock period is represented by T, the channel clock period T being provided for recording the mark on the first or second recording layer where the mark regarding 3T can be recorded, a plurality of pulses including a last pulse arranged at an end of the pulses are used for recording the mark regarding 3T, in which a first subsequent level lower than a peak power level of the last pulse is arranged next to the last pulse, and a second subsequent level lower than the peak power level but higher than the first subsequent level is arranged next to the first subsequent level, and the optical disc is configured to store first power-related information relating to the peak power level and the first subsequent level for the first recording layer, the first power-related information relating to the recording mark regarding the length of 3T, and second power-related information relating to the peak power level and the first subsequent level for the second recording layer, the second power-related information relating to the recording mark regarding the length of 3T, contents of the second power-related information being allowed to be different from those of the first power-related information, and the second power-related information being arranged separately from the first power-related information, the information reproducing method comprising:

reproducing the information from the first or second recording layer using the light.

* * * * *